(12) United States Patent
Huff et al.

(10) Patent No.: US 10,974,614 B2
(45) Date of Patent: Apr. 13, 2021

(54) METHOD AND SYSTEM FOR MOUNTING AND DISMOUNTING BATTERIES IN A VEHICLE

(71) Applicant: Artisan Vehicle Systems Inc., Camarillo, CA (US)

(72) Inventors: Brian R. Huff, Newbury Park, CA (US); Kyle Hickey, Moorpark, CA (US)

(73) Assignee: Artisan Vehicle Systems Inc., Camarillo, CA (US)

( * ) Notice: Subject to any disclaimer, the term of this patent is extended or adjusted under 35 U.S.C. 154(b) by 0 days.

(21) Appl. No.: 16/842,527

(22) Filed: Apr. 7, 2020

(65) Prior Publication Data
US 2020/0324668 A1   Oct. 15, 2020

Related U.S. Application Data

(63) Continuation of application No. 15/908,802, filed on Feb. 28, 2018, now Pat. No. 10,668,830.

(51) Int. Cl.
*B60L 53/80*   (2019.01)
*B60K 1/04*   (2019.01)
*B60L 58/21*   (2019.01)

(52) U.S. Cl.
CPC .............. *B60L 53/80* (2019.02); *B60K 1/04* (2013.01); *B60L 58/21* (2019.02); *B60K 2001/0411* (2013.01); *B60K 2001/0483* (2013.01); *B60L 2200/40* (2013.01)

(58) Field of Classification Search
CPC ...... B60L 53/80; B60L 2200/36; B60L 50/66; B60L 58/21; B60K 2001/0455; B60K 2001/0483; B60K 2001/0411; B60K 1/04; B60S 5/06

USPC ............................................... 180/65.1, 68.5
See application file for complete search history.

(56) References Cited

U.S. PATENT DOCUMENTS

| | | |
|---|---|---|
| 3,799,063 A | 3/1974 | Reed |
| 3,834,563 A | 9/1974 | Teti |
| 5,598,083 A | 1/1997 | Gaskins |
| 5,664,932 A | 9/1997 | Clonch et al. |
| 5,820,331 A | 10/1998 | Odell |

(Continued)

FOREIGN PATENT DOCUMENTS

| | | |
|---|---|---|
| JP | 2001088563 A | 4/2001 |
| WO | 2019/168900 A1 | 9/2019 |

OTHER PUBLICATIONS

International Search Report and Written Opinion dated Jun. 12, 2019 for PCT Application No. PCT/US2019/019727.

*Primary Examiner* — James A Shriver, II
*Assistant Examiner* — Hilary L Johns
(74) *Attorney, Agent, or Firm* — Plumsea Law Group, LLC

(57) ABSTRACT

A method and system for swapping batteries in an electric vehicle is disclosed. The method includes dismounting a first battery assembly, moving to a second battery assembly and mounting the second battery assembly onto the vehicle. Mounting and dismounting are accomplished by an onboard mounting and dismounting system. The method can be used in a zero infrastructure environment such as an underground mine since mounting and dismounting are accomplished by components on the vehicle itself. An auxiliary battery pack powers the vehicle during between dismounting a battery pack and mounting another battery pack.

20 Claims, 46 Drawing Sheets

(56) References Cited

U.S. PATENT DOCUMENTS

| | | | |
|---|---|---|---|
| 6,494,279 B1* | 12/2002 | Hutchens | B60R 16/04 |
| | | | 180/68.5 |
| 7,770,673 B2 | 8/2010 | Allen et al. | |
| 7,993,155 B2 | 8/2011 | Heichal et al. | |
| 2002/0066610 A1* | 6/2002 | Tsai | B62K 15/006 |
| | | | 180/220 |
| 2004/0144580 A1* | 7/2004 | Wu | H01M 10/48 |
| | | | 180/68.5 |
| 2010/0187035 A1* | 7/2010 | Lin | B62B 3/001 |
| | | | 180/211 |
| 2012/0018235 A1* | 1/2012 | O'Quinn | B60L 50/66 |
| | | | 180/65.1 |
| 2012/0018237 A1* | 1/2012 | Kovach | H01M 2/1083 |
| | | | 180/68.5 |
| 2013/0020140 A1* | 1/2013 | Auer | H01M 2/1083 |
| | | | 180/68.5 |
| 2015/0033537 A1* | 2/2015 | Poillot | H01M 2/1083 |
| | | | 29/428 |
| 2015/0071747 A1* | 3/2015 | Deahl | B60L 53/80 |
| | | | 414/469 |
| 2017/0263914 A1 | 9/2017 | Ito et al. | |

\* cited by examiner

METHOD AND SYSTEM FOR MOUNTING AND DISMOUNTING BATTERIES IN A VEHICLE

CROSS-REFERENCE TO RELATED APPLICATION

This application is a continuation of and claims benefit to U.S. patent application Ser. No. 15/908,802, filed on Feb. 28, 2018 and titled "Method and System for Mounting and Dismounting Batteries in a Vehicle", the disclosure of which application is incorporated by reference herein in its entirety.

BACKGROUND OF THE INVENTION

The present invention relates generally to mining vehicles.

Various types of mining vehicles may be used to remove and transport material in a mining operation. One type of vehicle, a haul truck, may be used. Traditional haul trucks may operate with diesel-powered engines.

Diesel powered haul trucks can have different hauling capacities. Some trucks may have a 35 metric ton hauling or greater hauling capacity.

Electric vehicles may operate with one or more electric motors powered by batteries. Batteries in electric vehicles, such as cars and other kinds of vehicles, may be large and heavy. Removing batteries may require external infrastructure such as cranes, lifts or other systems.

SUMMARY OF THE INVENTION

Various embodiments of a mining vehicle are disclosed. The embodiments provide mining vehicles that are battery powered rather than diesel powered.

In one aspect, an electric vehicle includes an electric motor, a primary battery assembly comprising a battery pack used to power the electric motor, where the primary battery assembly can be mounted and dismounted from the electric vehicle. The vehicle also includes a mounting and dismounting system capable of mounting and dismounting the primary battery assembly from the electric vehicle.

In another aspect, an electric vehicle includes an electric motor and a primary battery assembly comprising a battery pack used to power the electric motor, where the primary battery assembly can be mounted and dismounted from the electric vehicle. The vehicle also includes an auxiliary battery pack. The auxiliary battery pack powers the electric vehicle when the battery pack in the primary battery assembly is disconnected.

In another aspect, a method of replacing a first battery pack with a second battery pack in an electric vehicle includes moving the electric vehicle to a first location adjacent to the second battery pack. The second battery pack is located at a second location. The method also includes disconnecting the first battery from an electrical circuit of the electric vehicle. The method also includes dismounting the first battery pack from electric vehicle using a mounting and dismounting system, where the mounting and dismounting system is disposed on the electric vehicle. The method further includes moving the electric vehicle to a second location, mounting the second battery pack to the electric vehicle using the mounting and dismounting system and connecting the second battery to the electrical circuit of the electric vehicle.

Other systems, methods, features, and advantages of the invention will be, or will become, apparent to one of ordinary skill in the art upon examination of the following figures and detailed description. It is intended that all such additional systems, methods, features, and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Overview of Mining Vehicle

The embodiments are directed to a vehicle. The vehicle is zero emissions electric vehicle and uses only a battery to power the vehicle in place of a conventional diesel engine. The vehicle may be used in mining operations. The embodiments include various provisions that make it possible to power a haul truck with at least 40 metric tons of hauling capacity using only electric power.

The vehicle described herein is a heavy duty industrial electric vehicle designed to operate in a continuous work environment such as a sub-surface mine. An overview of a sub-surface mine environment and general description of electric vehicles and electric power systems for sub-surface mining are described in co-pending application Ser. No. 15/133,478 filed on Apr. 20, 2016, titled "System And Method For Providing Power To A Mining Operation," the entire contents of which are hereby incorporated by reference. Electric mining vehicles are powered by at least one heavy-duty, high-powered battery pack which is comprised of multiple battery modules contained in a pack housing. Each module is comprised of multiple cells. The modules may be equipped with an array of operational sensors and may be provided with electronic components to provide data from the sensors to a separate maintenance network. Sensors can include temperature sensors, timing devices, charge level detection devices, and other monitoring devices which can be employed to provide an operations center with accurate, real-time data regarding the performance of the module and its performance history. Details of these types of battery packs and the associated data generation and monitoring can be found in co-pending application Ser. No. 14/494,138 filed on Sep. 23, 2014, titled "Module Backbone System;" application Ser. No. 14/529,853 filed Oct. 31, 2014, titled "System and Method for Battery Pack Charging and Remote Access;" and application Ser. No. 14/721,726 filed May 26, 2015, titled "Module Maintenance System;" the entire contents of which are hereby incorporated by reference.

For purposes of clarity the following terms may be used in the detailed description and the specification. The term "hauling capacity," or simply capacity, is used to characterize the amount of material that can be held in the bed of a vehicle and transported. The hauling capacity may also be referred to as the "tramming capacity."

Figure 1:
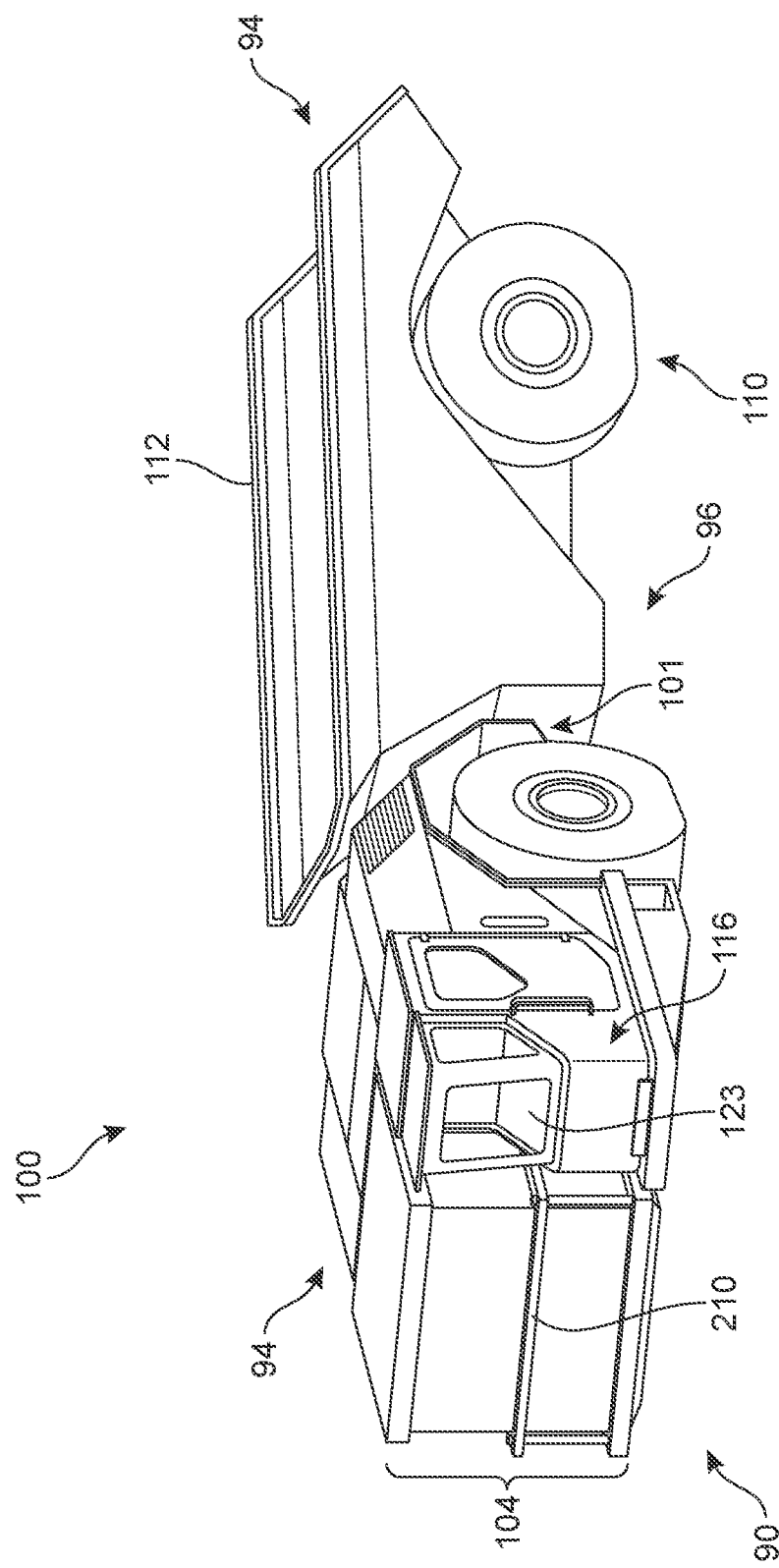
FIG. 1 shows a schematic view of an embodiment of a mining vehicle.
Figure 2:
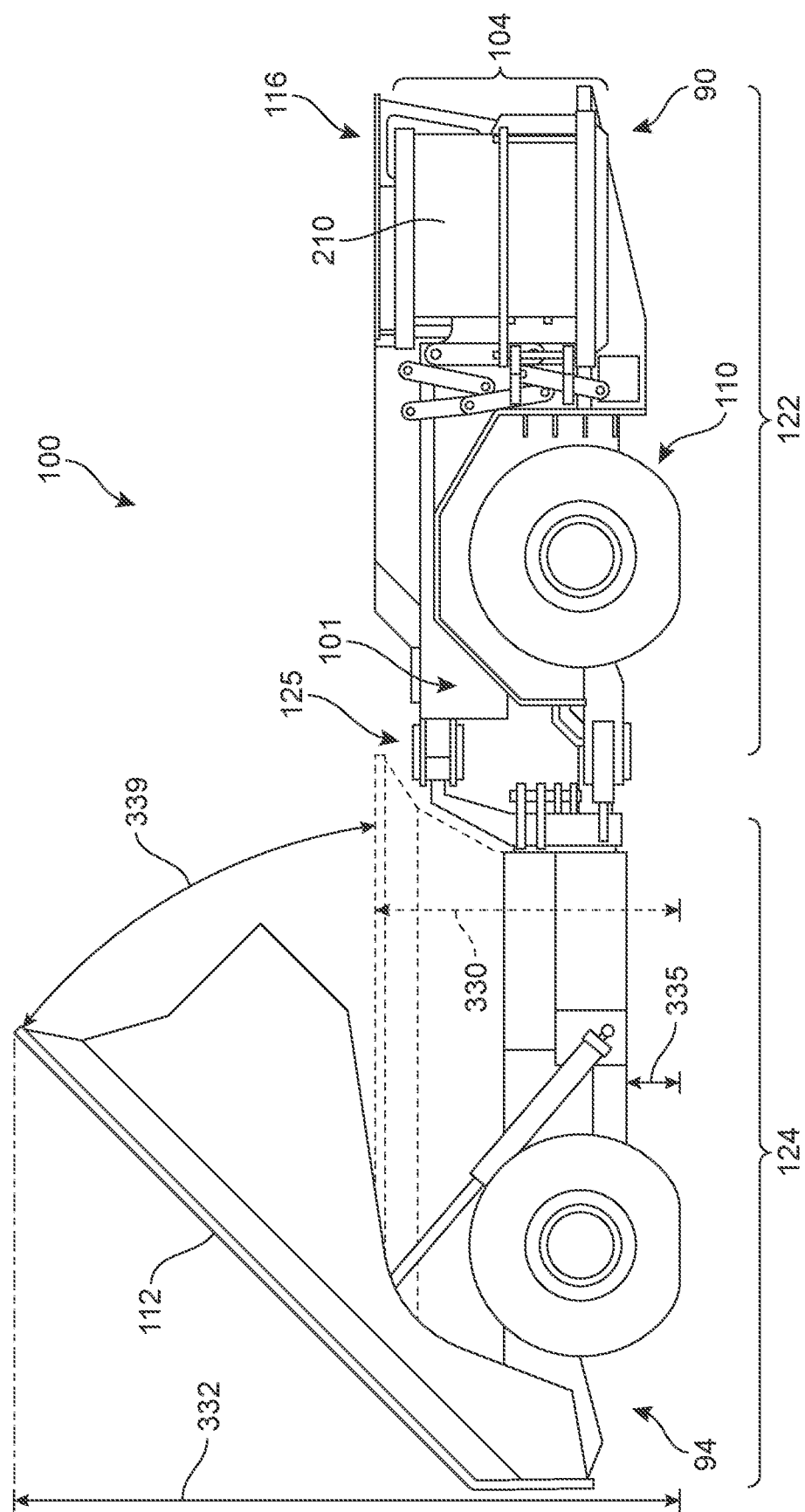
FIG. 2 shows a schematic side view of an embodiment of a mining vehicle.

FIG. 1 illustrates a schematic isometric view of vehicle 100. FIG. 2 is a schematic side view of vehicle 100. Referring to FIGS. 1-2, vehicle 100 may be comprised of a frame 101 (or chassis), a set of wheels 110 and a bed 112. Bed 112 may be coupled with frame 101 and may be tilted between a lowered position (shown in FIG. 1) and raised position (shown in FIG. 2).

For reference, vehicle 100 is also characterized as having a front end 90, a rearward end 92, a first side 94 and a second side 96 (see FIG. 1).

Vehicle 100 is also provided with various standard vehicular provisions, such as cab 116 for receiving one or more operators.

In some embodiments, vehicle 100 may be divided into a first frame portion 122 and a second frame portion 124 (see FIG. 2). First frame portion 122 may be a front portion associated with cab 116. Second frame portion 124 may be a rearward portion associated with bed 112. In some embodiments, a mechanical linkage 125 connects first frame portion 122 and second frame portion 124 so that the two portions can move relative to one another (e.g., swivel or pivot).

Figure 3:
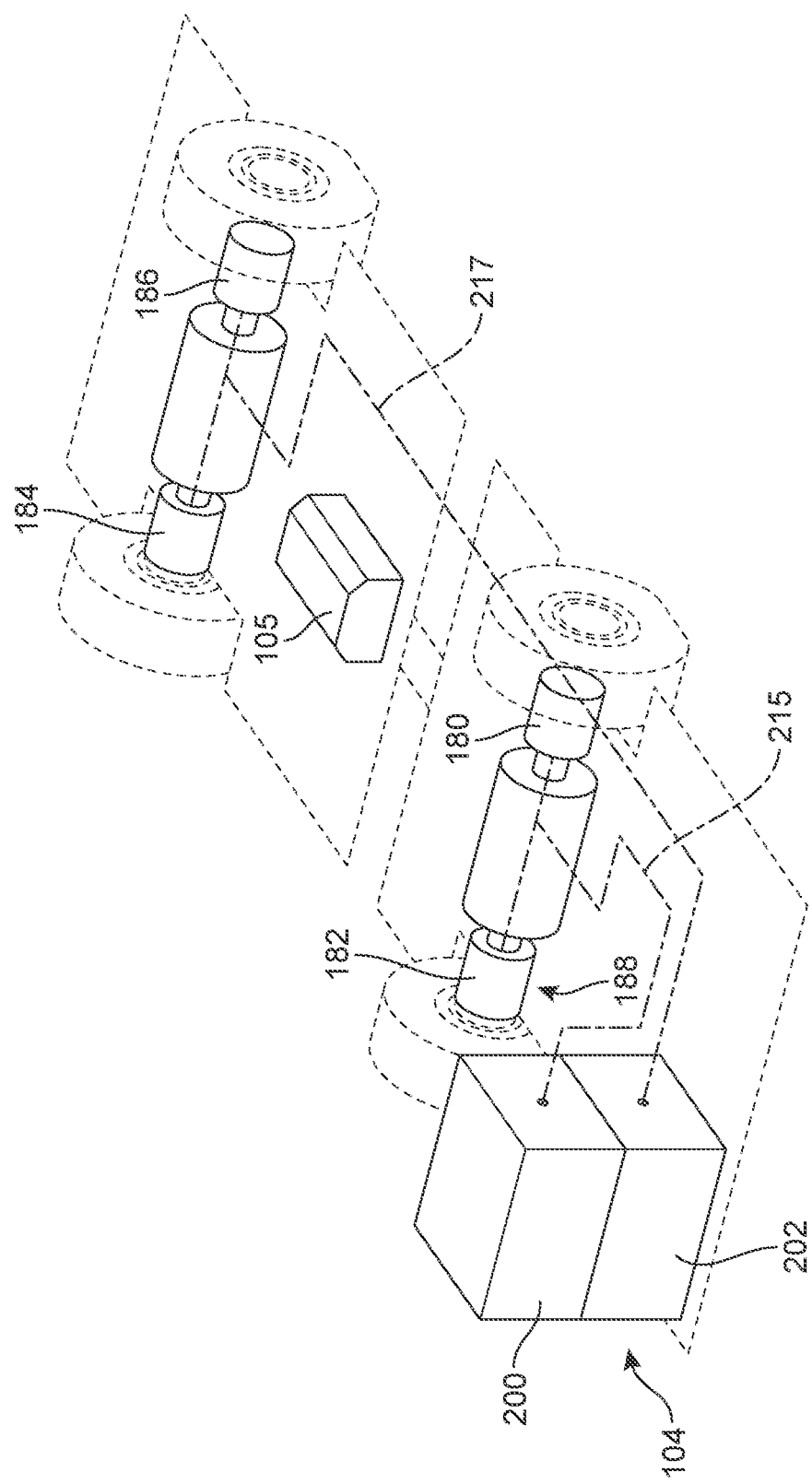
FIG. 3 shows a schematic view of various internal components of a mining vehicle, according to an embodiment.

FIG. 3 is a schematic view of vehicle 100, in which several internal components are visible. Vehicle 100 also includes a propulsion system comprising one or more electric motors that are powered by one or more batteries. In some embodiments, vehicle 100 may include at least two electric motors for powering each pair of wheels. In some embodiments, vehicle 100 may include four electric motors, where each motor independently powers one of four wheels. In the embodiment of FIG. 3, vehicle 100 includes a first electric motor 180, a second electric motor 182, a third electric motor 184 and a fourth electric motor 186, referred to collectively as set of motors 188. For purposes of illustration, the approximate locations of each motor in set of motors 188 are only indicated schematically. It may be appreciated that the exact locations of each motor may vary from one embodiment to another.

In one embodiment, the electric motors in vehicle 100 operate with a combined continuous torque of approximately 2000 Newton-meters. In other embodiments, the electric motors in vehicle 100 may operate with a combined continuous torque approximately in the range of 1500-2500 Newton-meters.

In one embodiment, the electric motors in vehicle 100 operate with a combined continuous power of 440 kilowatts (590 horsepower) and a combined peak power of 560 kilowatts (750 horsepower). In other embodiments, electric motors in vehicle 100 may operate with a combined continuous power approximately in the range of 400-500 kilowatts. In other embodiments, electric motors in vehicle 100 may operate with a combined peak power approximately in the range of 500-600 kilowatts.

Some embodiments may also be equipped with an auxiliary motor (not shown). In some cases, the auxiliary motor may operate with a continuous torque of approximately 700 Newton-meters. In some cases, the auxiliary motor may operate with a combined power of 125 kilowatts (167 horsepower). In some embodiments, an auxiliary motor may be used to drive other sub-systems of vehicle 100, such as a mechanical system that may be used to mount and dismount batteries. Optionally, in other embodiments an auxiliary motor may not be used.

Embodiments can incorporate one or more batteries to power set of motors 188 and/or an auxiliary motor. As used herein, the term "battery pack" generally refers to multiple battery modules in a heavy-duty pack housing. Each module is comprised of multiple battery cells. In this way, a battery pack also refers to a collection of individual battery cells. The battery cells, and therefore modules, are functionally interconnected together as described in the previously incorporated pending applications.

In different embodiments, a battery pack could incorporate any suitable kind of battery cell. Examples of battery cells include capacitors, ultra-capacitors, and electrochemical cells. Examples of electrochemical cells include primary (e.g., single use) and secondary (e.g., rechargeable). Examples of secondary electrochemical cells include lead-acid, valve regulated lead-acid (VRLA), gel, absorbed glass mat (AGM), nickel-cadmium (NiCd), nickel-zinc (NiZn), nickel metal hydride (NiMH), lithium-ion (Li-ion), and the like. A battery cell may have various voltage levels. In particular, in some cases two different battery cells in a battery pack could have different voltage levels. Similarly, the battery cell may have various energy capacity levels. In particular, in some cases, two different battery cells in a battery pack could have different capacity levels.

In some cases, it may be desirable to use multiple battery packs. As used herein, the term "battery pack assembly", or simply "battery assembly" refers to a set of two or more battery packs. In some embodiments, a battery assembly may also include a cage or similar container for holding the separate battery packs together.

As seen in FIGS. 1-3, vehicle 100 is configured with a primary battery assembly 104. In some embodiments, primary battery assembly 104 may be located at front end 90 and on second side 96 of vehicle 100. In particular, primary battery assembly 104 may be disposed adjacent to cab 116, which is located at front end 90 and on first side 94 of vehicle 100.

Vehicle 100 may also include an auxiliary battery pack 105. Auxiliary battery pack 105 may be disposed in a separate location from primary battery assembly 104. As best seen in FIG. 3, auxiliary battery pack 105 may be disposed within the interior of vehicle 100. The interior of vehicle 100 may be a region disposed inside of the exterior surfaces of the vehicle (which are discussed below with reference to FIG. 7). In some cases, auxiliary battery pack 105 may be disposed in a compartment of frame 101 that is designed to hold auxiliary battery pack 105. As discussed below, auxiliary battery pack 105 may be used to power vehicle 100 while the primary battery assembly is being swapped. Auxiliary battery pack 105 may also be referred to as a "tramming battery".

As seen in FIGS. 1-2, battery assembly 104 is exposed on an exterior of vehicle 100. Specifically, various exterior surfaces of the housing (i.e., battery cage 210) that contains one or more battery packs may comprise part of the exterior of vehicle 100. In contrast, auxiliary battery pack 105 is an internal battery and is retained within the chassis of vehicle 100.

Battery assembly 104 may be removably attached to vehicle 100. As used herein, the term "removably attached" refers to two components that are joined together but that can be separated without destroying one or the other component. That is, the components can be non-destructively detached from one another. Exemplary modalities of "removable attachment" include connections made using removeable fasteners, latches, locks, hooks, magnetic connections as well as other kinds of connections.

Auxiliary battery pack 105 may be "fixedly attached" to vehicle 100. That is, auxiliary battery pack 105 may not be separated from vehicle 100 without requiring part of vehicle 100 to be disassembled and/or without destroying one or more parts.

In the embodiment shown in FIGS. 1-3, primary battery assembly 104 comprises two battery packs. These include a first battery pack 200 and a secondary battery pack 202 (see FIG. 3). First battery pack 200 and second battery pack 202 may be disposed in a stacked arrangement, with first battery pack 200 disposed over second battery pack 202. Moreover, in some embodiments first battery pack 200 and second battery pack 202 are retained within a battery cage 210.

In some embodiments, primary battery assembly 104 may provide approximately 340-360 kilowatt hours of power. In some cases, each of first battery pack 200 and second battery pack 202 may provide approximately 170-180 kilowatt hours of power. In some embodiments, auxiliary battery pack 105 may provide approximately 40-50 kilowatt hours of power.

In some embodiments each battery pack of primary battery assembly 104 may power a different set of motors (and accordingly, a different set of wheels). In some cases, each battery pack may power a pair of motors on a particular axle (e.g., front axle or rear axle). In one embodiment shown in FIG. 3, first battery pack 200 may be connected via a power cable 215 to components on a front axle assembly 216. More specifically, first battery pack 200 may provide power to both first electric motor 180 and second electric motor 182 to power a front set of wheels. Likewise, second battery pack 202 may be connected via a power cable 217 to components of a rear axle assembly 217. More specifically, second battery pack 202 may provide power to both third electric motor 184 and to fourth electric motor 186 to power a rear set of wheels. By powering the front and rear axles using separate battery packs, the amount of power required that must be delivered to a single source is reduced. This may allow for the use of smaller power cables (or cables with a lower current rating) that are easier to manage and/or less likely to fail.

Embodiments can include a system for mounting and dismounting one or more battery packs. In the embodiment seen in FIG. 2, vehicle 100 may incorporate an onboard mounting and dismounting system 250. Mounting and dismounting system 250 may include all the necessary components required to lift and lower primary battery assembly 104. The details of mounting and dismounting system 250 are discussed in further detail below and shown, for example in FIGS. 32-45.

FIGS. 4-15 and the accompanying description disclose features related to the overall specifications of vehicle 100, including size, weight, capacity and power.

The embodiments may provide a zero emissions electric vehicle with comparable hauling capacity to similarly sized diesel-powered vehicles.

In discussing the form factor of a vehicle, the description discusses the overall length, overall width, and overall height of a vehicle, as well as various other dimensions. As used herein, the term overall length refers to the distance between the forward-most location on a vehicle and the rearward-most location on the vehicle. In some cases, the forward-most location may be a located on the cab or battery assembly. The term overall width refers to the distance between opposing sides of the vehicle, and is measured at the "outermost" locations along the opposing sides. The term overall height refers to the distance between the lowest point of a vehicle (usually the bottom of the wheels) and the highest point of a vehicle.

Each of these vehicle dimensions may correspond with an axis or direction of vehicle 100. That is, the overall length of vehicle 100 may be taken along a lengthwise direction (or axis) of vehicle 100. The overall width of vehicle 100 may be taken along a widthwise direction (or axis) of vehicle 100. Also, the overall height of vehicle 100 may be taken along a height-wise direction (or axis) of vehicle 100.

Figure 4:
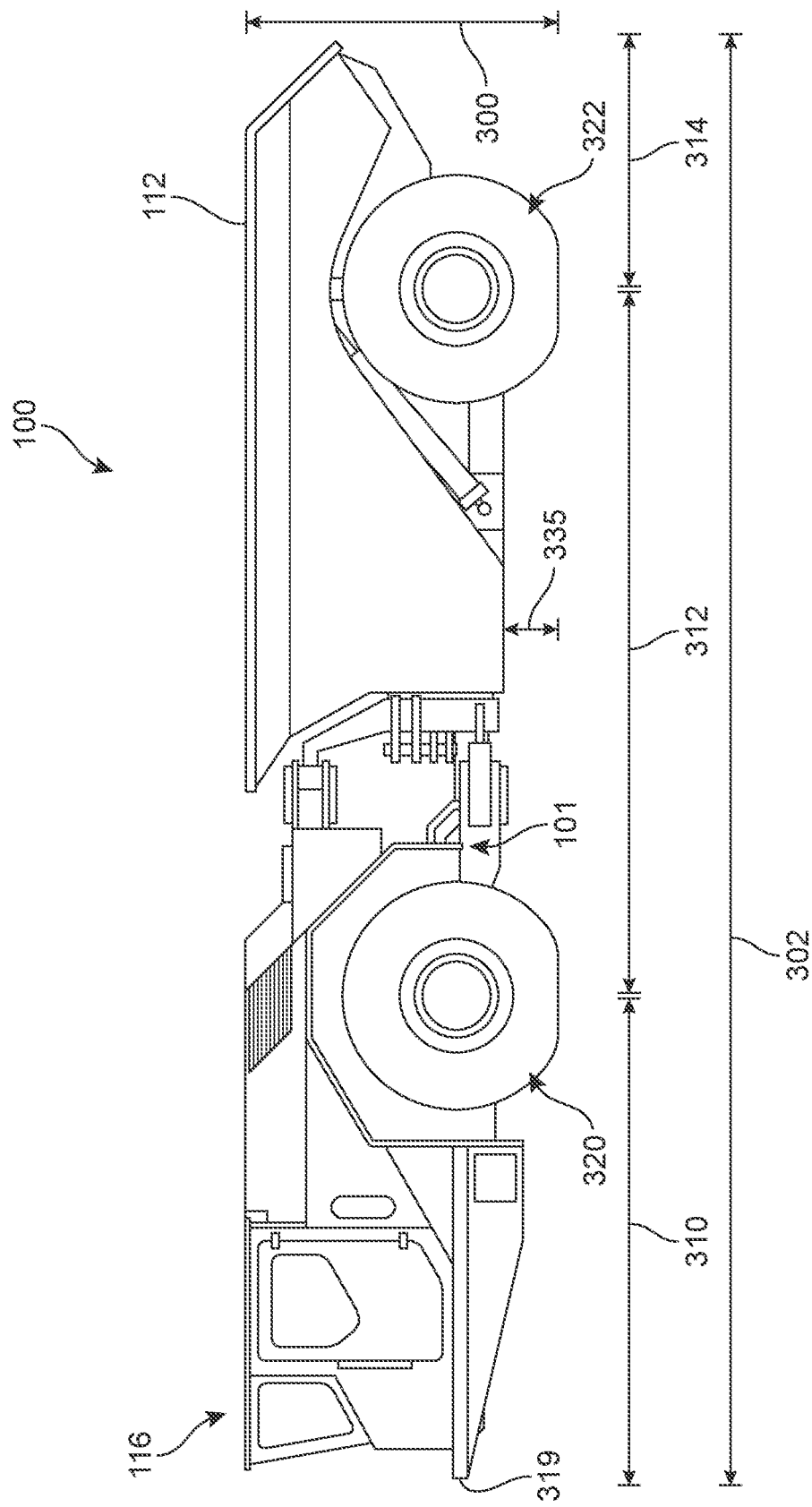
FIG. 4 is a schematic side view of an embodiment of a mining vehicle.

FIG. 4 illustrates a side schematic view of vehicle 100 (as seen from first side 94) for purposes of illustrating a variety of dimensions. Vehicle 100 has overall height 300, measured from the ground vertically up to approximately the highest point of vehicle 100. In one embodiment, overall height 300 has a value of approximately 2,206 millimeters. In other embodiments, overall height 300 could have any value approximately in the range of 1,500 to 2,500 mm. In the exemplary embodiment shown in FIG. 4 it may be seen that the overall height 300 can be measured either from the wheels to the top of bed 112 or to the top of cab 116, as the top of both components lie approximately in a similar horizontal plane.

Vehicle 100 has overall length 302, measured from the rearward-most location of frame 101 to the forward-most location of frame 101. In one embodiment, overall length 302 has a value of approximately 10,175 mm. In other embodiments, overall length 302 could have any value approximately in the range between 9,000 to 12,000 mm.

As seen in FIG. 4, the overall length of vehicle 100 can be separated into a front overhang length 310, wheelbase length 312 and rear overhang length 314. Specifically, wheelbase length 312 is measured between the center of front wheels 320 and the center of rear wheels 322. Front overhang length 310 is measured from the center of front wheels 320 to the forward-most location of vehicle 100 (i.e., the forward most location of cab 116. Rear overhang length 314 is measured from the center of rear wheels 322 to the rearward-most location of bed 112. In one embodiment, front overhang length 310 has a value of approximately 3,429 mm, wheelbase length 312 has a value of approximately 5,000 mm, and rear overhang length 314 has a value of approximately 1,746 mm. Of course, in other embodiments, these values can be varied to accommodate desirable modifications to the wheelbase length, the length of the forward and/or rearward part of the frame or to the size and/or extension of the bed. Moreover, it may be understood that as the overall length is adjusted in different embodiments, the values of front overhang length 310, wheelbase length 312, and rear overhang length 314 may be varied accordingly.

Referring to FIGS. 2 and 4, the height of bed 112 may vary according to its operating position. For example, in a fully lowered state, an upward-most location of bed 112 has a lowered bed height 330 as measured from the ground. In one embodiment, lowered bed height 330 has a value that is approximately equal to the overall height 300 of vehicle 100 (i.e., approximately 2,200 mm). In a fully raised state, an upward-most location of bed 112 has raised bed height 332 as measured from the ground. In one embodiment, raised bed height 332 has a value of approximately 5,389 mm. Moreover, in some cases, raised bed height 332 corresponds to a position of bed 112 in which bed 112 forms an angle 339 with a horizontal plane of vehicle 100. In some cases, angle 339 has a value of approximately 70 degrees.

As shown in FIGS. 2 and 4, vehicle 100 may have a clearance height 335 that is defined as the vertical distance between the bottom of the wheels and the underside of frame 101. In some cases, clearance height 335 may also correspond with the height of the lowest portion of bed 112, as seen in FIG. 4. In one embodiment, clearance height 335 has a value of approximately 323 mm (or 12.7 inches). In other embodiments, clearance height 335 could range approximately between 275 mm and 325 mm.

Figure 5:
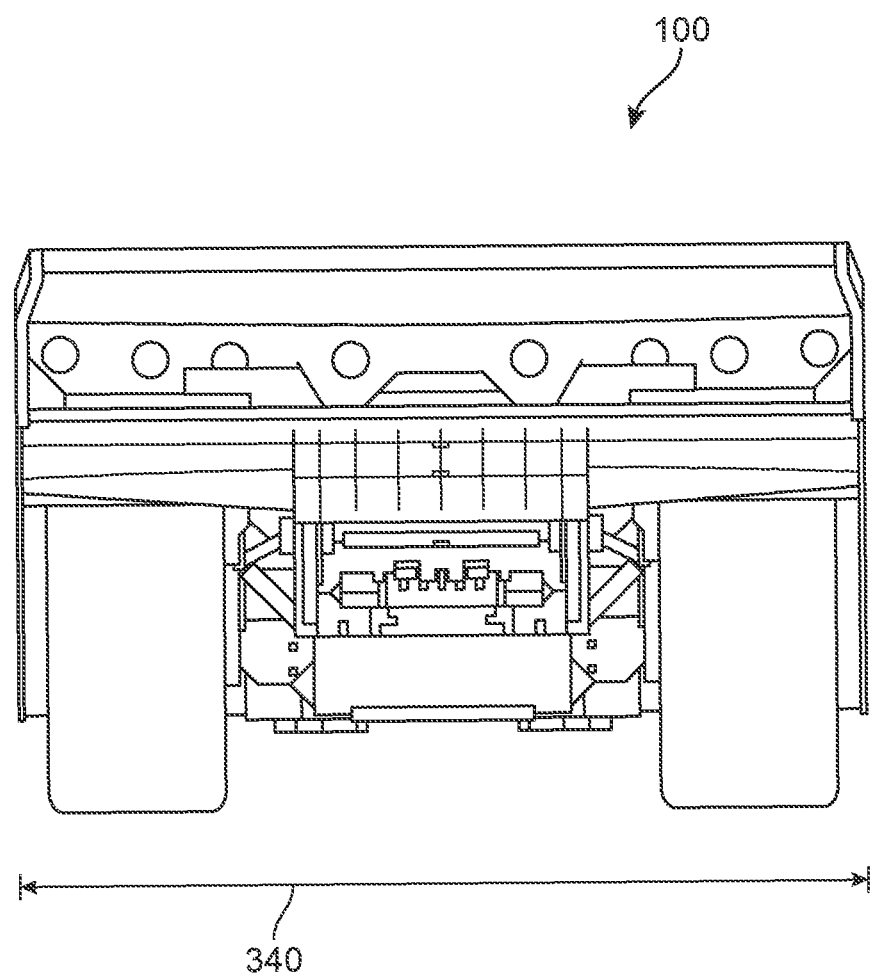
FIG. 5 is a schematic rear view of an embodiment of a mining vehicle.

FIG. 5 shows a rearward view of vehicle 100. Vehicle 100 has overall width 340. In one embodiment, overall width 340 has a value of approximately 3,353 mm. In other embodiments, overall width 340 could have any value approximately in the range of 3,000 to 4,000 mm.

Figure 6:
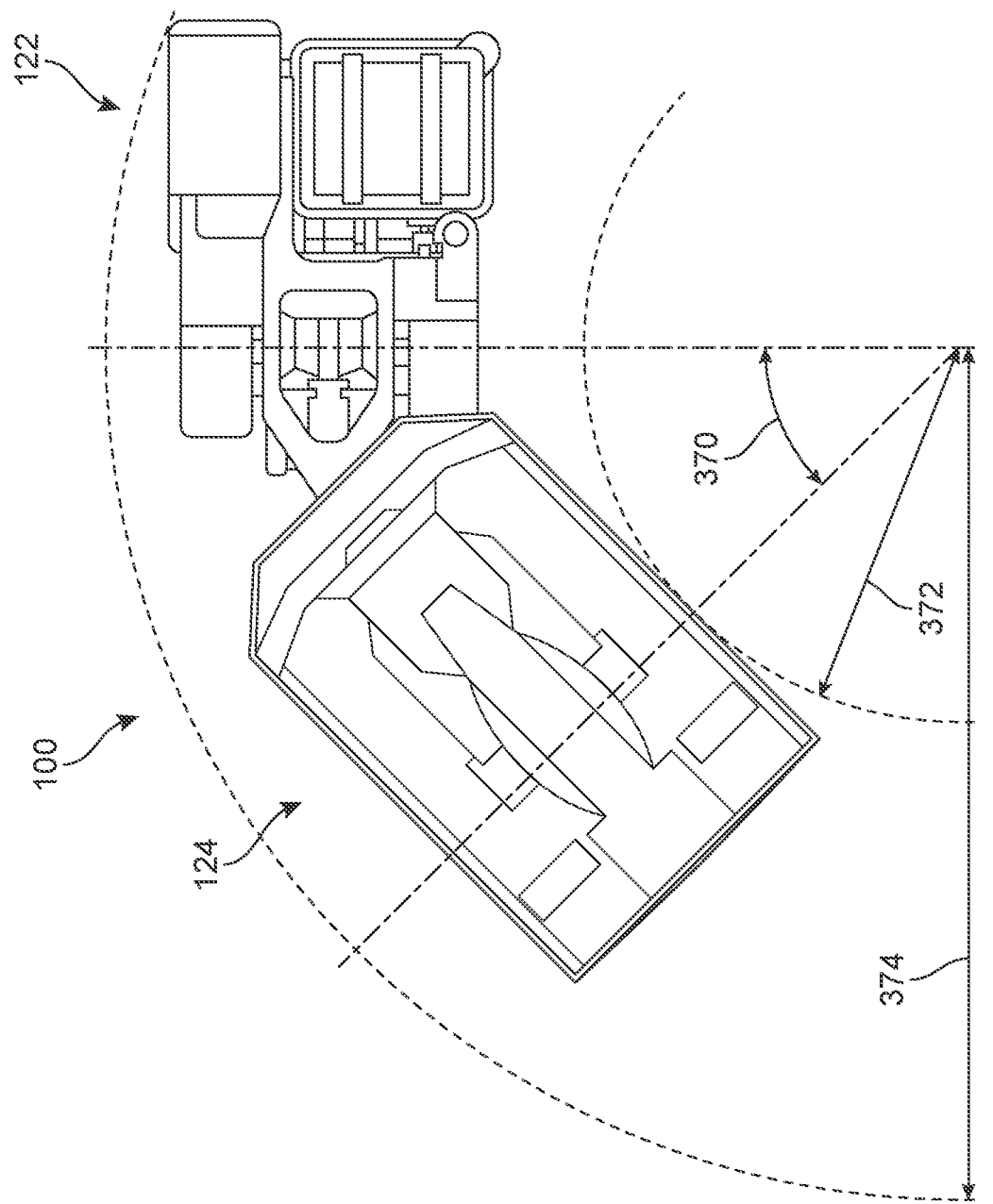
FIG. 6 is a schematic top down view of an embodiment of a mining vehicle in a turning position.

FIG. 6 is a schematic view of vehicle 100 in a turning position. In particular, a first frame portion 122 is angled with respect to second frame portion 124 at angle 370. In one embodiment, angle 370 has a value of approximately 45 degrees. In other embodiments, angle 370 could have any value approximately in the range between 35 and 55 degrees. In addition, the inner turning path has radius 372. The outer turning path has radius 374. In one embodiment, radius 372 has a value of approximately 4,363 mm. Also, in one embodiment, radius 374 has a value of approximately 9,065 mm. Of course, any of angle 370, radius 372, and/or radius 374 could be varied in other embodiments as the length and/or width of the vehicle are varied, and/or as other features are modified (such as the mechanical linkage between first frame portion 122 and second frame portion 124).

The design of vehicle 100 may facilitate improved visibility over other haul trucks. Referring to FIG. 4, cab 116 is positioned very close to the forwardmost edge 319 of vehicle 100. This means that an occupant in cab 116 has almost no limit in their visibility from the forward window 123 of cab 116 (see FIG. 1). This improved line of sight may help the driver to better see a battery assembly on the ground when a battery swap is required.

Vehicle 100 may be characterized by a footprint as well as an envelope, which are two-dimensional and three-dimensional representations of the vehicle's form factor. As used herein, the term "vehicle footprint area" is equal to the product of the overall length and the overall width of a vehicle. In addition, the term "vehicle envelope volume" is equal to the product of the vehicle footprint area and the overall height of the vehicle.

Figure 7:
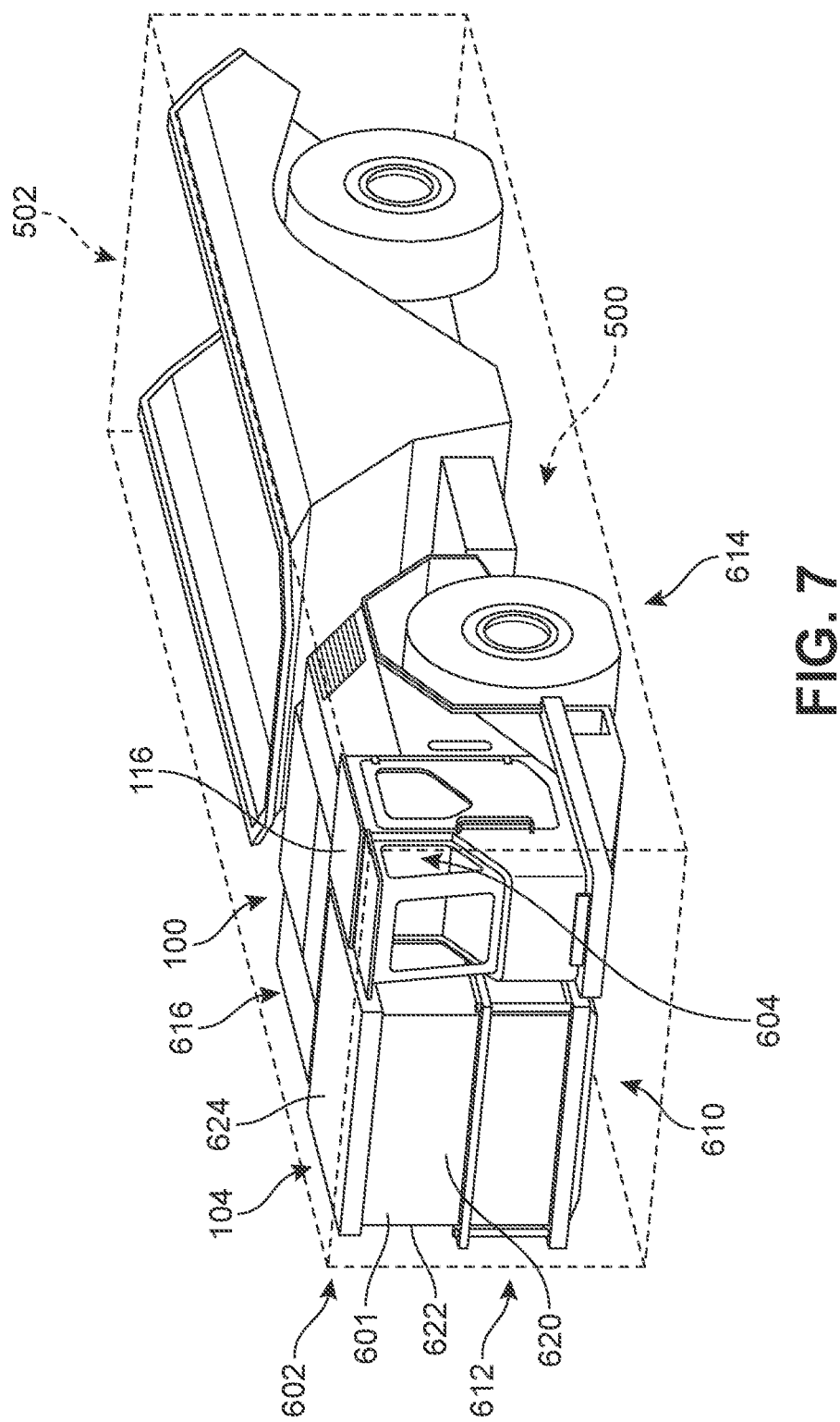
FIG. 7 is a schematic view of an embodiment of a mining vehicle, in which an envelope volume of the vehicle is indicated schematically.

As seen in FIG. 7, vehicle 100 has vehicle footprint area 500. Vehicle 100 also has vehicle envelope volume 502. In one embodiment, vehicle footprint area 500 has a value of approximately 34 m². Similarly, vehicle envelope volume 502 has a value of approximately 75 m³. Of course, in other embodiments, both the footprint area and the envelope volume may be varied by changing one or more of the overall length, overall width, or overall height of vehicle 100. In some other embodiments, the vehicle footprint area may have any value approximately in the range of 32 to 36 m². Also, the vehicle envelope volume may have any value approximately in the range of 70 to 80 m³.

For reference, vehicle 100 may be characterized as having an exterior surface. The exterior surface includes a front exterior surface 610 and a side exterior surface 612.

As seen in FIG. 7, battery assembly 104 is disposed in a front corner of vehicle 100. Specifically, an outer cage 601 (i.e., housing) of battery assembly 104 is disposed on first front corner 602, which is opposite second front corner 604 where cab 116 is disposed. Moreover, with battery assembly 104 mounted to vehicle 100, battery assembly 104 forms parts of both the forward surface 610 of vehicle 100 as well as a first side surface 612 (i.e., a surface opposite of a second side surface 614 adjacent cab 116). Specifically, forward wall 620 of cage 601 forms part of front exterior surface 610 and first sidewall 622 of cage 601 forms part of side exterior surface 614.

In addition, battery assembly 104 forms part of a top exterior surface 616 of vehicle 100. Specifically, a top portion or wall 624 of cage 601 forms part of top exterior surface 616. Still further, in some cases, a bottom portion or wall 626 of cage 601 forms a part of a bottom exterior surface of vehicle 100 (not visible in FIG. 7).

Figure 8:
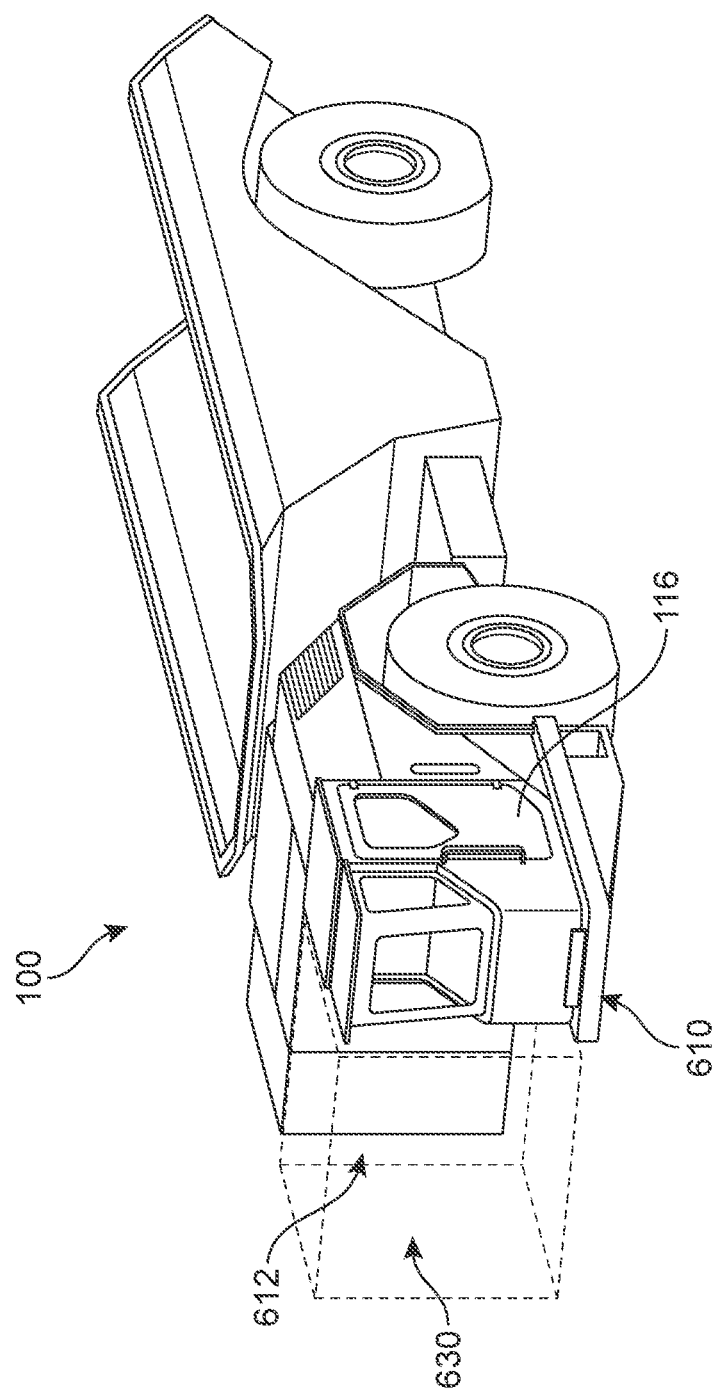
FIG. 8 is a schematic view of an embodiment of a mining vehicle without a battery assembly.

When battery assembly 104 is dismounted, a large space 630 or gap may be formed along forward surface 610 of vehicle 100 adjacent to cab 116, as seen in FIG. 8. Moreover, the front end of vehicle 100 may have an L-like geometry with cab 116 now extending forward in isolation from the rest of the vehicle chassis. Thus, when a battery assembly is removed from vehicle 100, the geometry of its exterior surface changes since the walls of the battery assembly form a part of the vehicle's exterior surface when mounted.

By placing the primary battery assembly on the exterior of vehicle 100, it may be easier to mount and dismount the battery compared to electric vehicles with internally located batteries. Moreover, the battery cage can simultaneously provide structural support for containing the battery packs as well as provide structural support on an exterior of the vehicle.

For purposes of putting vehicle 100's form factor, weight and other characteristics in context, several benchmark vehicles are considered. These include an above ground truck with a relatively higher capacity (39 metric tons) and an underground truck with a relatively lower capacity (30 metric tons).

Figure 9:
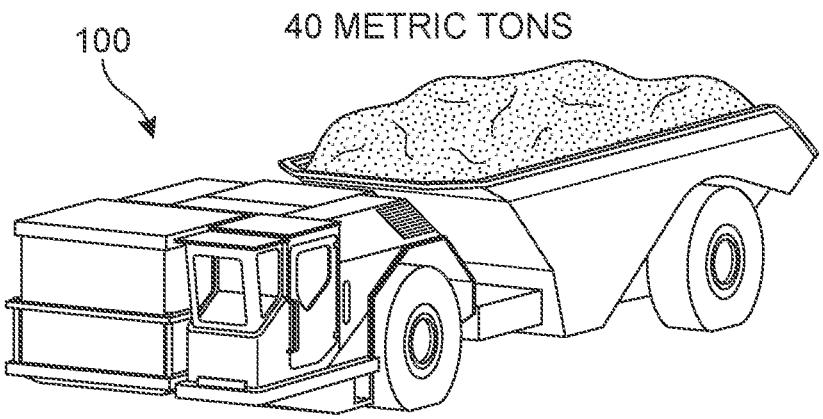
FIGS. 9-11 are schematic views of several embodiments of mining vehicles with varying haul capacities.
Figure 10:
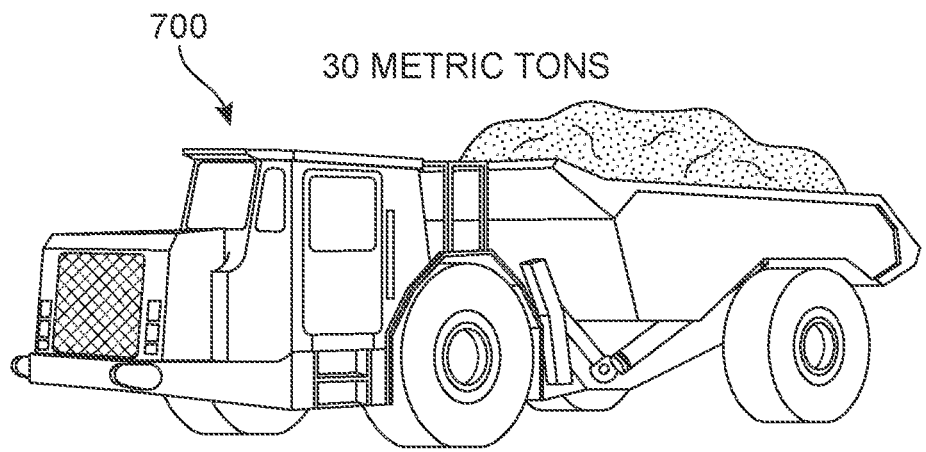
Figure 11:
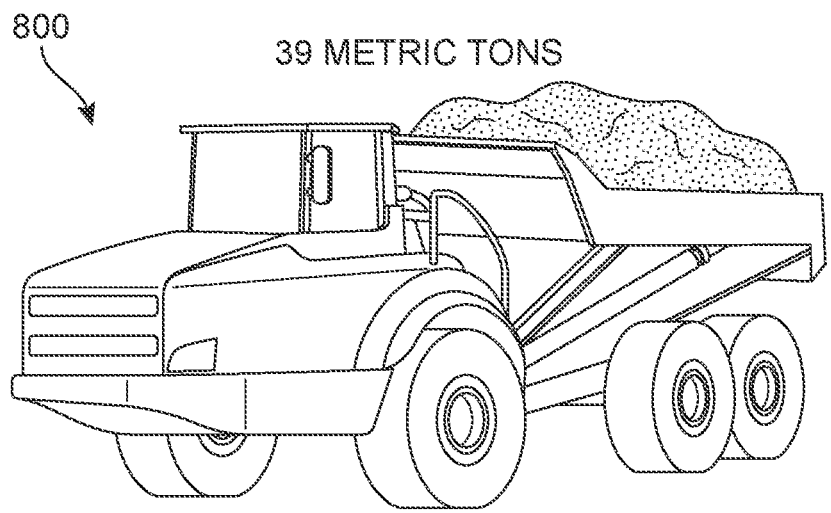
Figure 12:
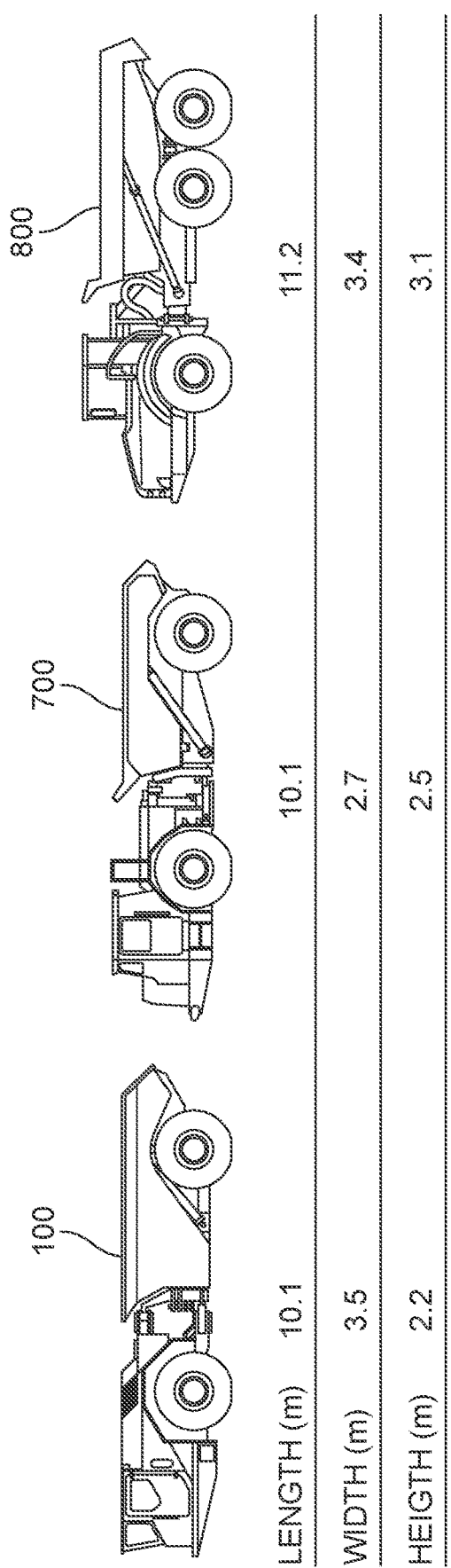
FIG. 12 is a schematic view of a table of dimensions for several different embodiments of mining vehicles.

FIGS. 9-11 illustrate each of vehicle 100 (FIG. 9), vehicle 700 (FIG. 10) and vehicle 800 (FIG. 11) and their corresponding haul weights. In addition, a table in FIG. 12 illustrates the various dimensions of these vehicles. As seen by comparing vehicle 100 with benchmark vehicle 700 and benchmark vehicle 800 in FIGS. 9-12, vehicle 100 has a comparable size and haul capacity to these two diesel vehicles. That is, although vehicle 100 is a zero emissions electric truck, it is still able to achieve hauling capabilities of similarly sized diesel vehicles.

Benchmark vehicle 700 is intended to represent a mining vehicle that is capable of moving underground. As indicated in the table of FIG. 12, benchmark vehicle 700 may have a similar overall form factor to vehicle 100. Specifically, as indicated in FIG. 12, benchmark vehicle 700 may have a length of 10,118 mm, a width of 2,690 mm and a height of 2,547 mm. This relatively small form factor, especially the overall height, allows benchmark vehicle 700 to haul loads through a mining tunnel. An example of a mining vehicle with similar specifications to benchmark vehicle 700 is Caterpillar AD30 underground mining truck.

Benchmark vehicle 800 is intended to represent a mining vehicle with a similar hauling capacity to vehicle 100. In particular, benchmark vehicle 800 has a hauling capacity of 39 metric tons. An example of a mining vehicle with similar specifications to benchmark vehicle 800 is the Volvo A40G articulated haul truck.

As indicated in the table of FIG. 12, benchmark vehicle 800 may have a slightly larger form factor than vehicle 100. Specifically, as indicated in FIG. 12, benchmark vehicle 800 may have a length of 11,263 mm, a width of 3,403 mm and a height of 3,132 mm.

Figure 13:
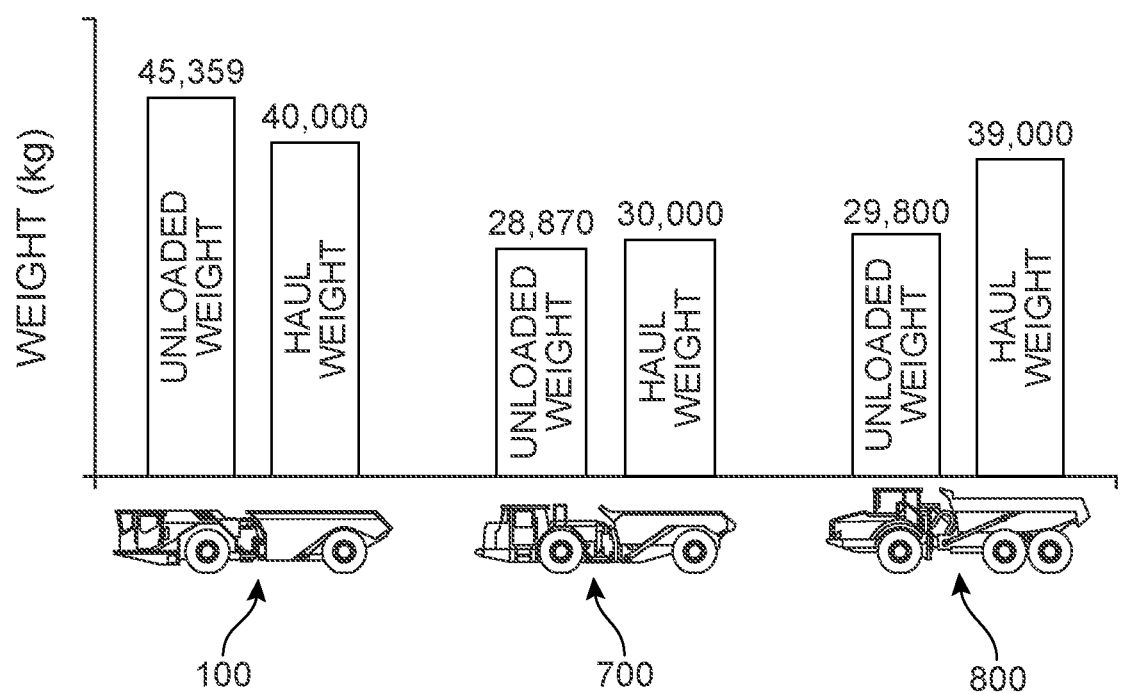
FIG. 13 is a schematic view of an embodiment of a chart indicating unloaded weights and haul weights for several mining vehicles.
Figure 14:
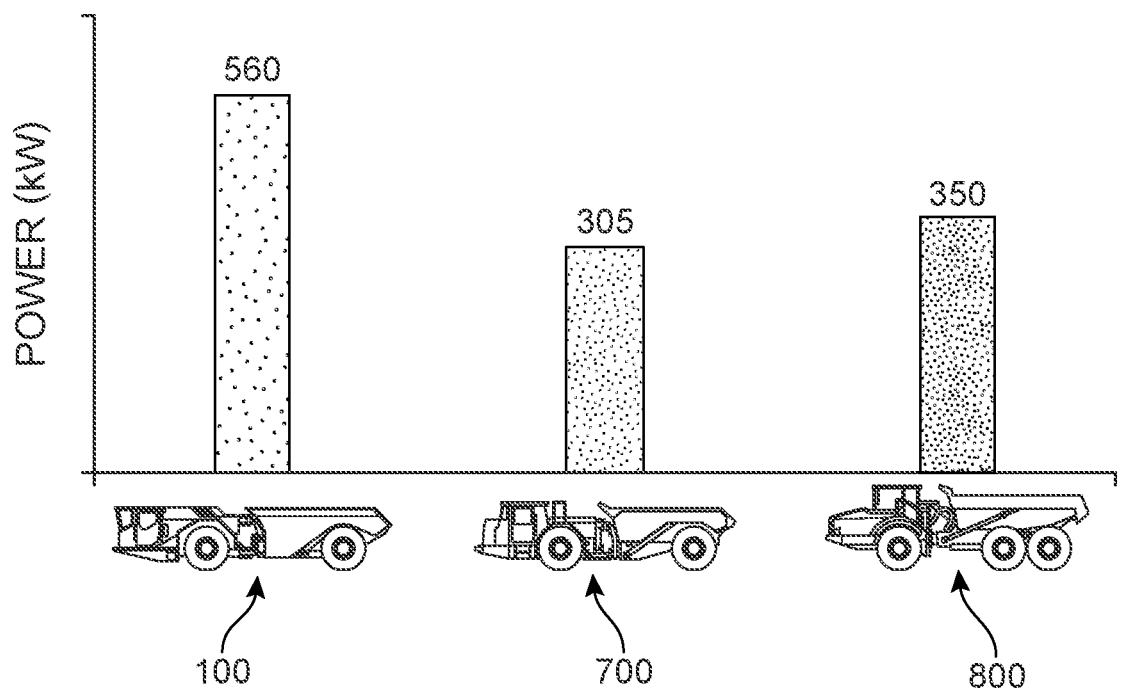
FIG. 14 is a schematic view of an embodiment of a chart indicating power for several mining vehicles.

For purposes of understanding the power-to-weight ratio of vehicle 100, comparisons of weight and power are made in FIGS. 13-14. FIG. 13 is a schematic view of a chart indicating the weights of three haul trucks. For reference, the haul weight for each vehicle is shown next to the unloaded operating weight. Here, the haul weight is equivalent to the haul capacity, when the haul capacity is measured by weight (rather than volume). As seen in FIG. 13, benchmark vehicle 700 has an unloaded weight of approximately 28.9 metric tons. Benchmark vehicle 700 has a haul weight of approximately 30 metric tons. Benchmark vehicle 800 has an unloaded weight of approximately 29.8 metric tons. Benchmark vehicle 800 has a haul weight of approximately 39 metric tons.

As seen in FIG. 13, vehicle 100 has an unloaded weight of approximately 45.4 metric tons. Vehicle 100 has a haul weight of approximately 40 metric tons. Thus, vehicle 100 is seen to be substantially heavier than both benchmark vehicle 700 and benchmark vehicle 800.

As the weight of a vehicle is increased handling may suffer if power is not increased. In the exemplary embodiment, the increased weight of vehicle 100 over benchmark vehicles, is accompanied by an increase in overall power.

FIG. 14 is a schematic chart illustrating the power produced by various vehicles. As previously discussed, one embodiment of vehicle 100 includes a set of electric motors that operates at a continuous power approximately in the range of 400 to 500 kilowatts. In some cases, vehicle 100 may operate at a peak power approximately in the range of 500 to 600 kilowatts. In contrast, a benchmark vehicle 700 with a hauling capacity of 30 metric tons may only operate with a peak power of 305 kilowatts. In addition, benchmark vehicle 800 with a hauling capacity of 39 metric tons may only operate with a peak power of 350 kilowatts.

Figure 15:
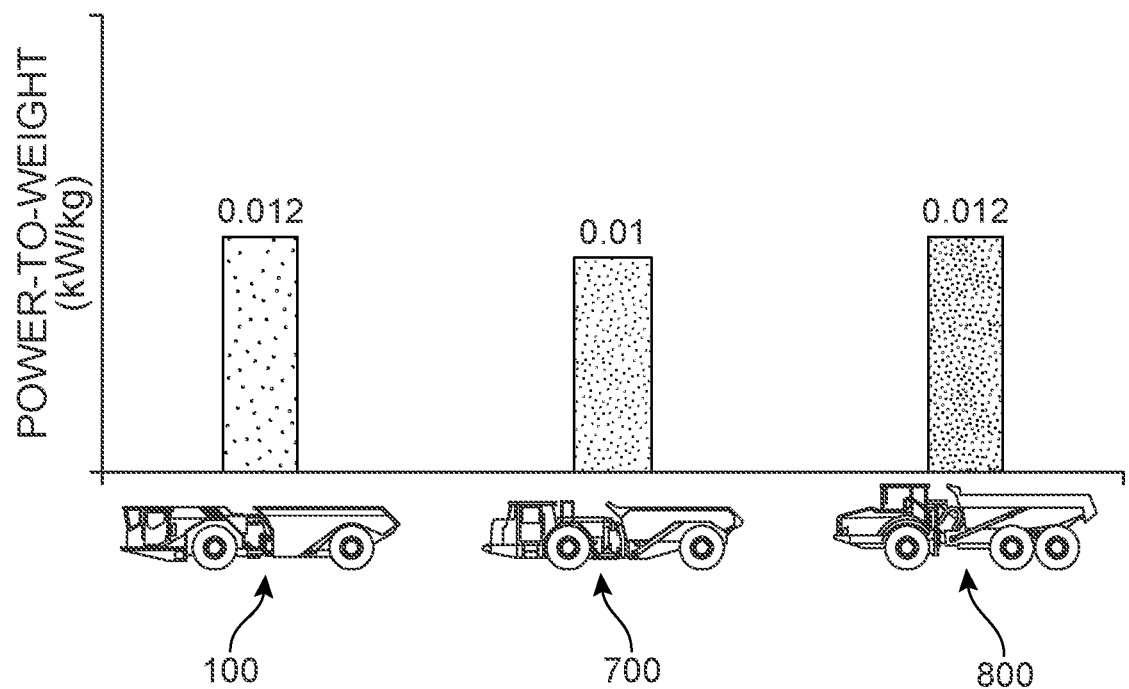
FIG. 15 is a schematic view of an embodiment of a chart indicating power-to-weight ratios for several mining vehicles.

FIG. 15 is a schematic view of a chart illustrating the power-to-weight ratio of several vehicles. As seen in FIG. 15, vehicle 100 has a power-to-weight ratio of about 0.012 kilograms per meters-cubed. Vehicle 700 has a power-to-weight ratio of about 0.010 kilograms per meters-cubed.

Vehicle 800 has a power-to-weight ratio of about 0.012 kilograms per meters-cubed. Thus, it may be seen that these vehicles have approximately similar vehicle-to-weight ratios. Despite being significantly heavier than the other benchmark vehicles, vehicle 100 may have a similar driving performance as indicated by the comparable power-to-weight ratios.

Battery Swapping Process

It is desirable to have a system that can efficiently swap out discharged batteries with fully charged batteries so that vehicles are not idle for long periods as they wait for recharging.

Some systems for swapping batteries in an electric vehicle may require substantial infrastructure. Because batteries for electric vehicles tend to be large and heavy, systems for swapping batteries might include cranes, forklifts, loading ramps, palettes or other components for lifting, lowering and transporting batteries to and from the vehicle. Because space is highly confined in a mine (e.g., in underground shafts) it is desirable to have a battery swapping system that limits the amount of infrastructure required.

Some embodiments may utilize a so-called "zero-infrastructure" battery swap system. For such a zero-infrastructure system all that is needed is "space and dirt" to unload discharged batteries and reload fully charged batteries.

In some embodiments, vehicle 100 is configured with all the provisions necessary to dismount discharged batteries and mount fully charged batteries on the ground of a mine. Such provisions can include the mounting and dismounting system 250 for primary batter assembly 104. These provisions can also include a separate "tramming" battery (i.e., auxiliary battery pack 105) used to power vehicle 100 when primary battery assembly 104 has been dismounted.

FIGS. 16-27 illustrate schematic views of a process of swapping a battery assembly with discharged battery packs for another battery assembly with charged battery packs in a mining vehicle.

Figure 16:
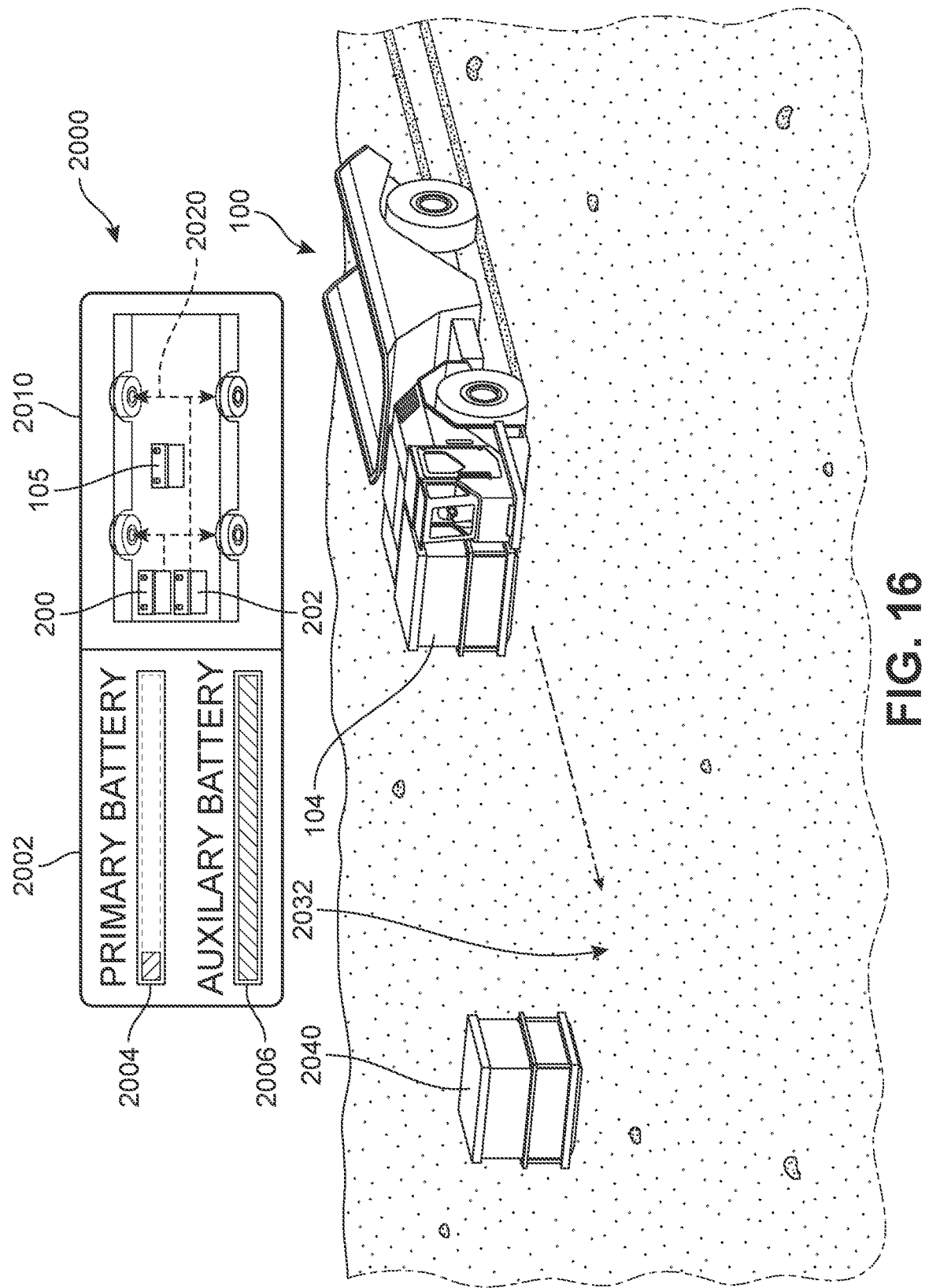
FIG. 16 is a schematic view of an embodiment of a vehicle approaching a location for swapping battery packs.

As seen in FIG. 16, vehicle 100 is traveling in a region of a mine. For purposes of illustration, a display screen 2000 is shown, which may be give information regarding the operating state of vehicle 100. It may be appreciated that while some embodiments of vehicle 100 may provide a display, other embodiments may not include a display. Still other embodiments may include a display that shows different kinds of information. Moreover, still other embodiments could utilize any other kind of indicators (lights, sounds, etc.) for providing an operator with information about the operating state of vehicle 100.

Display screen 2000 includes a battery charge section 2002. Battery charge section 2002 may include a first charging indicator 2004 that indicates the charge level for the battery packs comprising primary battery assembly 104. Battery charge section 2002 may also include a second charging indicator 2006 that indicates the charge level for auxiliary battery pack 105.

Display screen 2000 may also include a power flow section 2010. Power flow section 2010 may provide a schematic representation of the vehicle 100 and some components associated with the propulsion system. Power flow section 2010 may include schematic representations of first battery pack 200, second battery pack 202 and auxiliary battery pack 105. Moreover, power flow section 2010 can include schematic power flow lines 2020 that indicate which battery packs are currently powering the vehicle. For purposes of illustration, power flow lines 2020 are shown as flowing to each of the four wheels of vehicle 100. It may be appreciated, however, that the flow of power actually passes from one or more battery packs to each of four electric motors (i.e., set of motors 188 shown in FIG. 3). Each motor then drives a corresponding wheel.

As seen in FIG. 16, first charging indicator 2004 indicates that the battery packs of primary battery assembly 104 have a low charge. To remedy this, the operator of vehicle 100 is moving vehicle 100 towards an open area where a fully charged battery assembly 2040 (i.e., an assembly with fully charged battery packs) is disposed. Before mounting a new battery assembly, however, vehicle 100 travels to a location 2032 that is adjacent to charged battery assembly 2040. At location 2032, vehicle 100 can automatically dismount discharged battery assembly 104.

Figure 17:
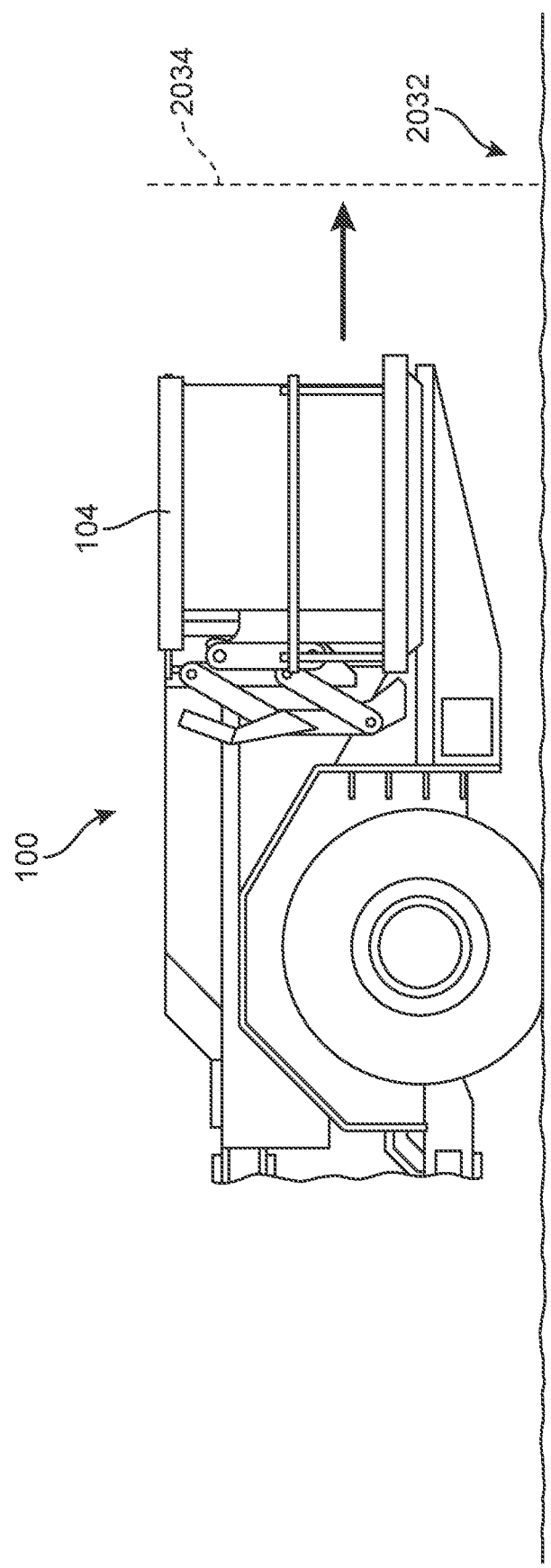
FIG. 17 is a schematic view of a vehicle moving towards a predetermined location, according to an embodiment.

FIG. 17 illustrates a schematic view of vehicle 100 approaching a predetermined location 2032 for dismounting, or "dropping off", primary battery assembly 104. For reference, a schematic line indicates the approximate stopping point 2034 where vehicle 100 should be positioned (e.g., the forward-most end of vehicle 100) to ensure primary battery assembly 104 is dismounted in the desired location. In some cases, such as a completely open area with no infrastructure, it may not be necessary to identify a precise location for vehicle 100 to be positioned before dismounting primary battery assembly 104. However, in some other embodiments where a battery assembly may be dropped off onto a palette, or other localized structure (e.g., part of a charging bay or station), it may be necessary to position vehicle 100 at a precise location (and in a precise direction) before dismounting a battery assembly.

Figure 18:
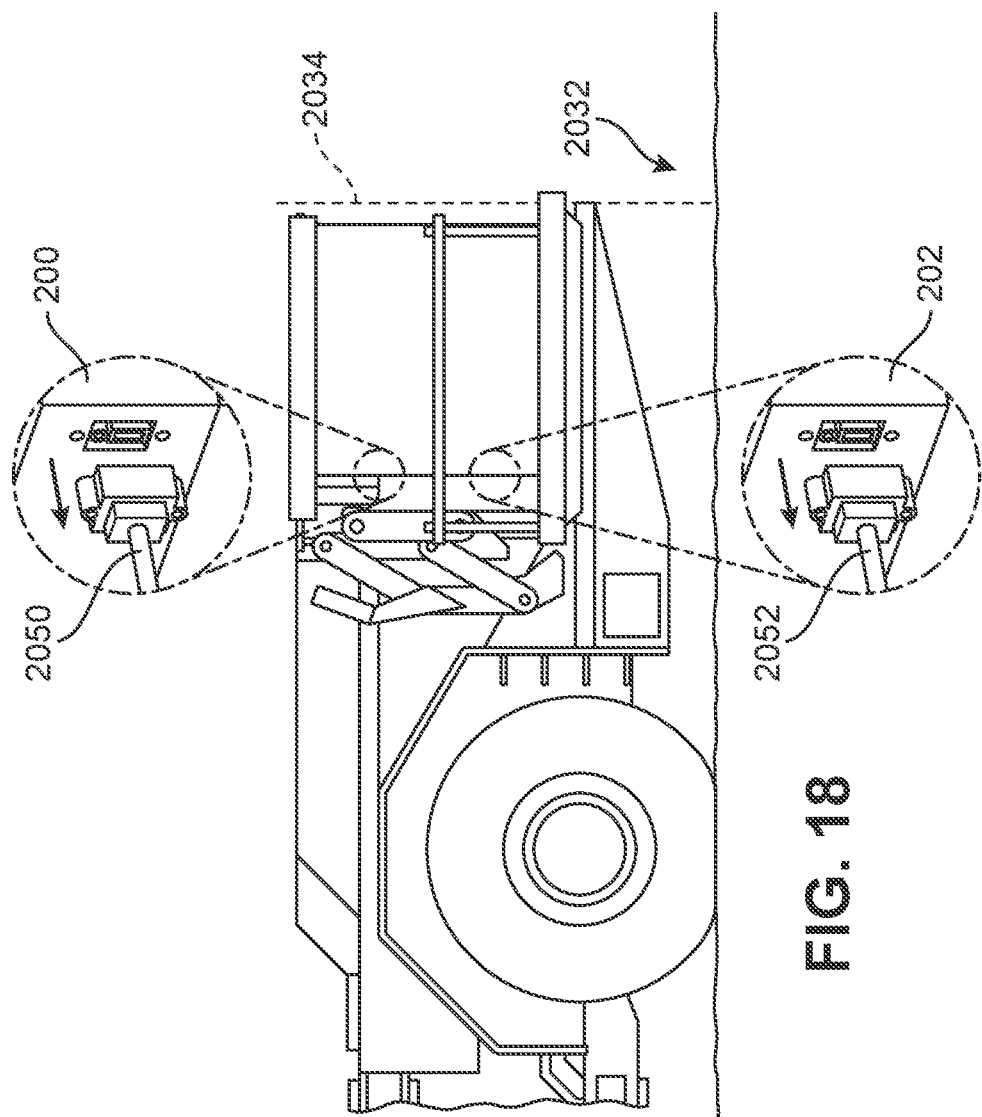
FIG. 18 is a schematic view of a set of power cables being disconnected from battery packs of a vehicle, according to an embodiment.

In FIG. 18, vehicle 100 is seen to be positioned at stopping point 2034 and so that primary battery assembly 104 can be dismounted. Prior to dismounting the battery, one or more physical connections between primary battery assembly 104 and other components of vehicle 100 may be disconnected. As an example, FIG. 18 includes a schematic enlarged view of a single electrical cable 2050 being disconnected from battery pack 200 of battery assembly 104. Likewise, electrical cable 2052 is shown being disconnected from battery pack 202.

In an exemplary embodiment, each battery pack of primary battery assembly 104 may be disconnected from one or more electrical circuits of vehicle 100. Such electrical circuits can be circuits that direct power between one or more batteries and one or more motors. In one embodiment, each battery pack is connected by at least one cable to one or more electrical circuits. Thus, electrically disconnecting each battery pack requires disconnecting one or more cables.

In an exemplary embodiment, each battery pack may also be connected to tubes that run fluids between the batteries and vehicle 100. For example, some embodiments may run oils for cooling through the batteries. In such embodiments, the tubes connecting to one or more fluid ports on the battery packs should also be disconnected prior to dismounting a battery assembly. Alternatively, in other embodiments, tubes used for fluid cooling may only be attached when the battery packs are dismounted (e.g., they may be cooled during charging).

In different embodiments, disconnecting cables and/or tubes could be done manually or automatically. In some embodiments, prior to dismounting a primary battery assembly, a vehicle operator may exit the cab and walk over to the other side of the vehicle with the primary battery assembly. The operator may then manually disconnect electrical cables as well as fluid tubes. Alternatively, it may be understood that in some other embodiments electrical connections (and/or fluid connections) could be automatically disconnected.

Figure 19:
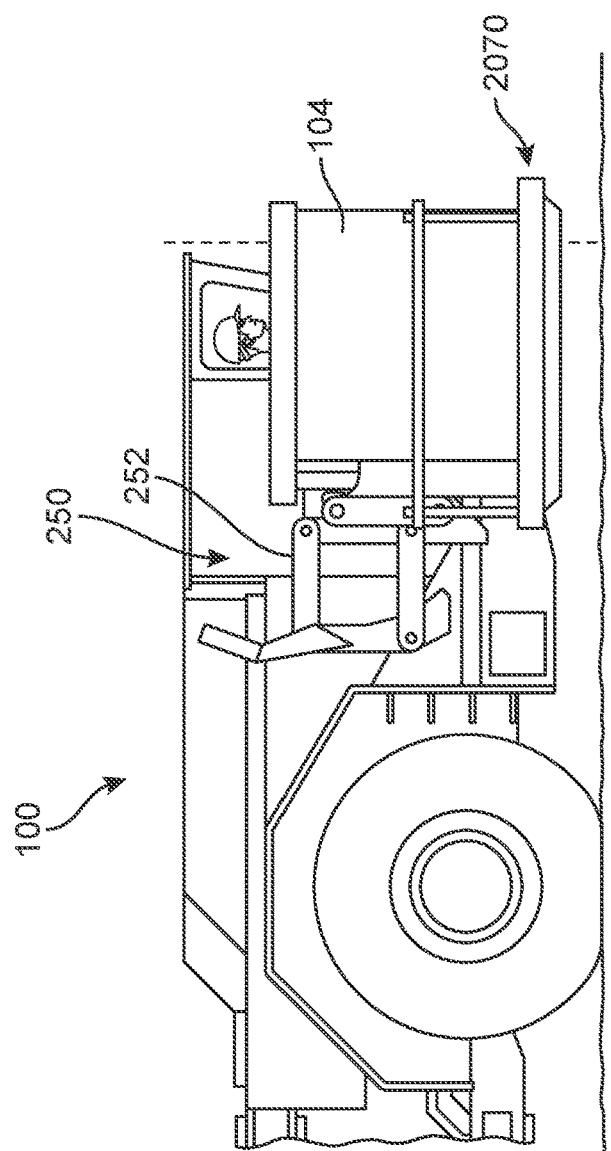
FIGS. 19-20 are schematic views of a battery assembly being lowered to the ground, according to an embodiment.
Figure 20:
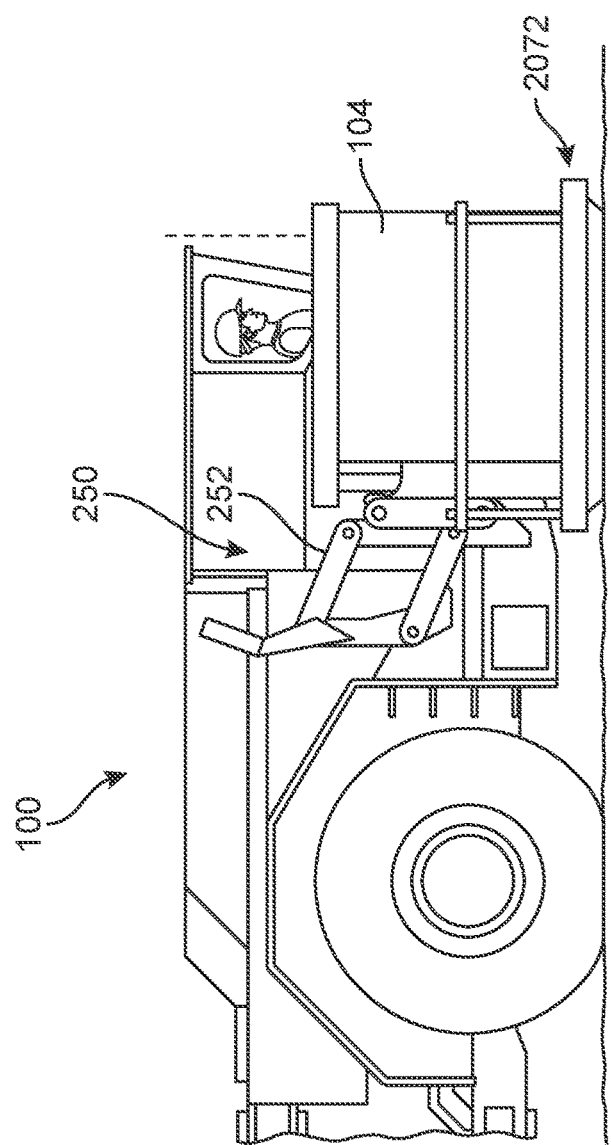

Once the necessary disconnections have been made between battery assembly 104 and vehicle 100, battery assembly 104 can be dismounted. FIGS. 19-20 illustrate successive stages in dismounting primary battery assembly 104 using mounting and dismounting system 250. In particular, battery assembly 104 is seen in a partially lowered position 2070 in FIG. 19. Also, battery assembly 104 is seen in a fully lowered position 2062 in FIG. 20.

As seen in FIGS. 19-20, battery assembly 104 is lowered using a linkage assembly of mounting and dismounting system 250. The specific design of the linkage assemblies that may be used are discussed in further detail below and shown, for example, in FIG. 32.

Because battery assembly 104 must be been disconnected from any motors of vehicle 100 prior to dismounting, mounting and dismounting system 250 may require power from auxiliary battery pack 105. That is, any electrical power required to operate linkage assembly 252 or other components of mounting and dismounting system 250 may be supplied by auxiliary battery pack 105.

In an alternative embodiment, it is contemplated that electrical cables could be designed to extend out from vehicle 100 as battery assembly 104 is lowered to the ground. In such an embodiment, the electrical cables could remain attached to the battery packs of primary battery assembly 104 as dismounting occurs. Therefore, it is conceivable that power from first battery pack 200 and/or second battery pack 202 could be used to power mounting and dismounting system 250.

In some embodiments, after primary battery assembly 104 has been lowered an operator may have the option to plug in one or both battery packs for recharging. For example, in one embodiment, one or more long charging cables may be found in the vicinity of location 2032 (see FIG. 18). The charging cables could be connected to a power source that is located elsewhere in the mine (or even outside of the mine).

In another embodiment, battery swapping may occur adjacent one or more recharging stations. In such embodiments, a battery may be dismounted at a location directly adjacent to a recharging station.

In still other embodiments, batteries may not be recharged at the swapping site, but may be moved to another location for charging. For example, in some embodiments a crew of workers could collect discharged batteries throughout the mine and bring them to another location within (or outside) the mine where charging provisions are provided. This same crew could then deliver recently charged batteries to locations throughout the mine where it is anticipated that haul trucks or other electric mining vehicles may be operating.

Figure 21:
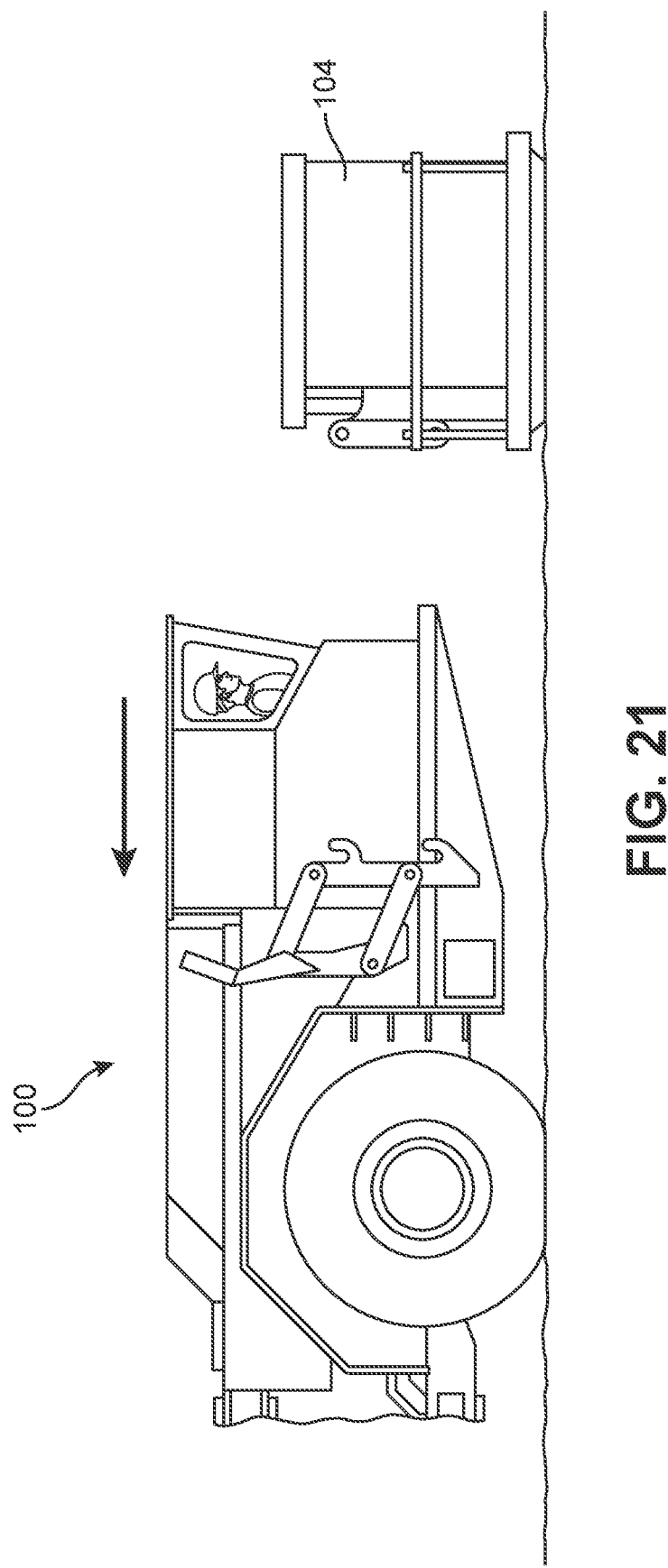
FIG. 21 is a schematic view of a vehicle reversing away from a dismounted battery assembly, according to an embodiment.

In FIG. 21, vehicle 100 is shown reversing away from battery assembly 104. As discussed in further detail below, mounting and dismounting system 250 may be configured to automatically disconnect from battery assembly 104 once battery assembly 104 is moved to the lowest position. In particular, it is unnecessary for an operator to manually detach battery assembly 104 from mounting and dismounting system 250. This may help save time during the swapping process by reducing the number of times an operator has to get in and out of the cab throughout the process.

Figure 22:
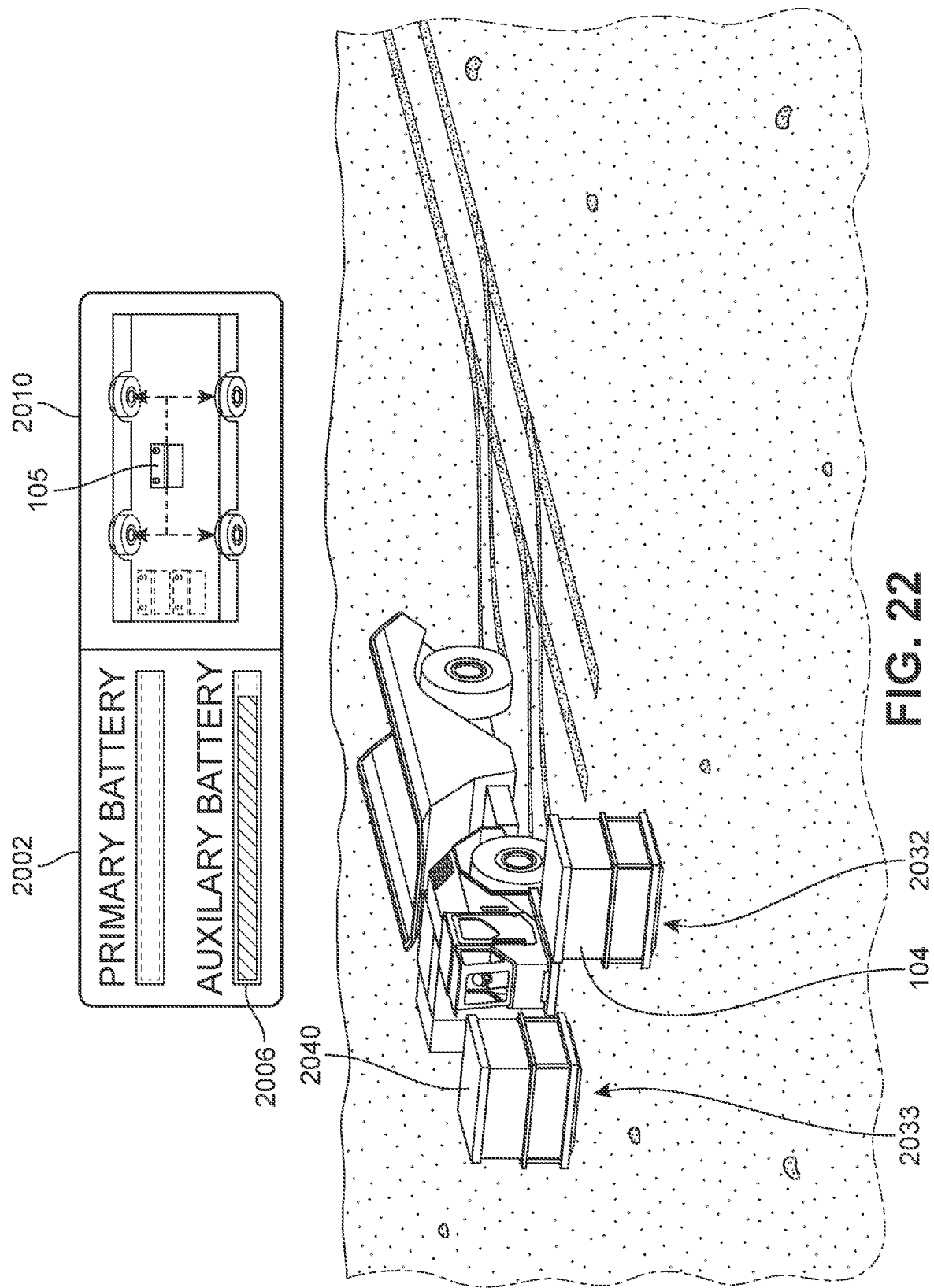
FIG. 22 is a schematic view of a vehicle moving from a first location to a second location near a charged battery assembly, according to an embodiment.

In FIG. 22, vehicle 100 is shown moving from a first location 2032 adjacent discharged battery assembly 104 to a second location 2033 adjacent fully charged battery assembly 2040. As vehicle 100 travels between the first and second locations, display screen 2000 indicates that vehicle 100 is being powered by auxiliary battery pack 105. This is indicated by the lower charge level shown on second charging indicator 2006 (compared with the charge level shown in FIG. 16). In addition, power flow section 2010 explicitly shows that power is flowing from auxiliary battery pack 105 to the wheels (via the electric motors disposed adjacent each wheel).

Although the embodiment shown in FIG. 22 depicts power flowing to all four wheels, in some embodiments auxiliary battery pack 105 may only provide power to some of the wheels. In one embodiment, auxiliary battery pack 105 may provide power only to the front wheels. In another embodiment, auxiliary battery pack 105 may provide power only to the rear wheels. Thus, in some cases, while swapping batteries vehicle 100 may operate with either front wheel drive or in rear wheel drive.

Figure 23:
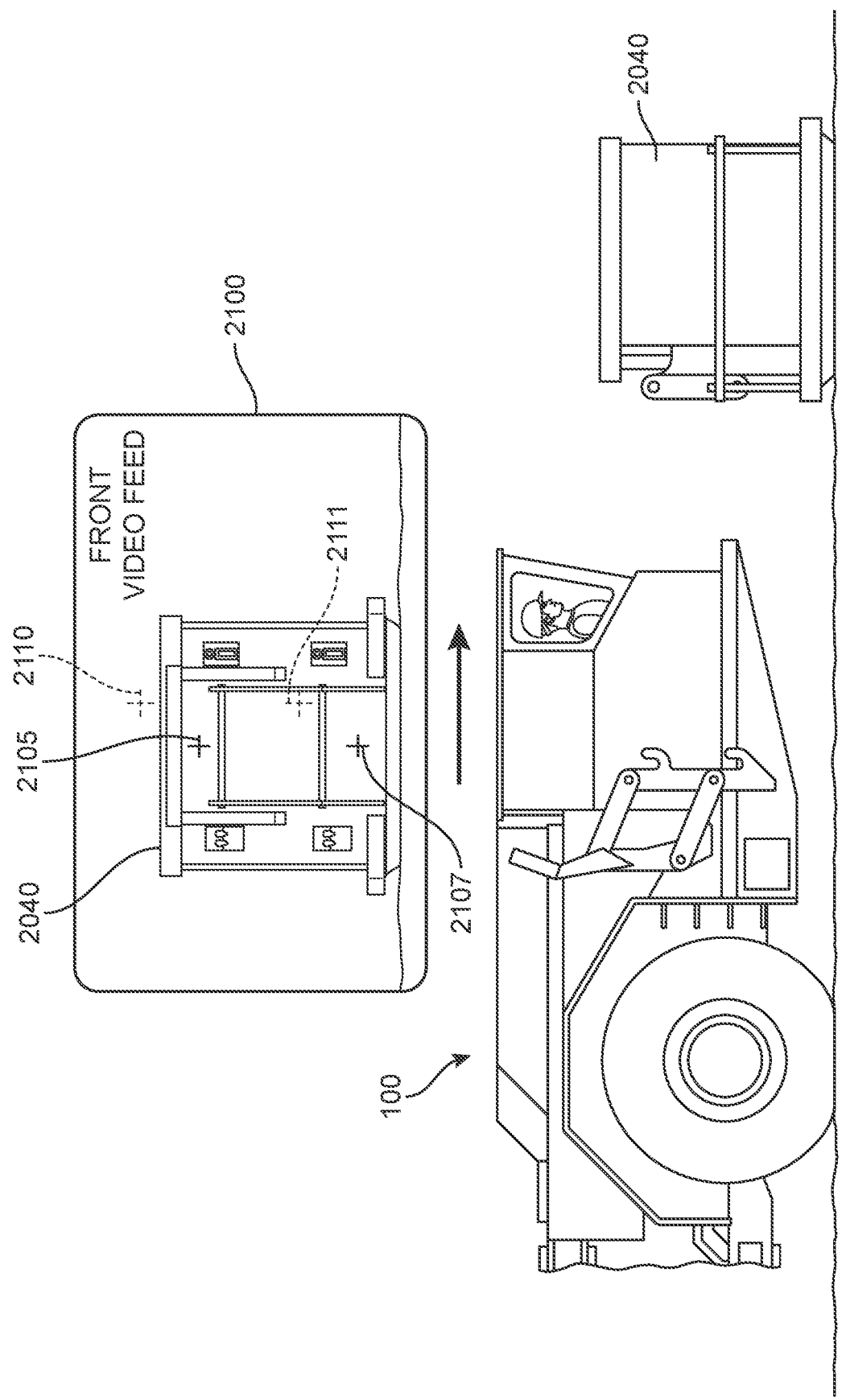
FIG. 23 is a schematic view of a step of aligning a mounting system with a battery assembly, according to an embodiment.

FIG. 23 shows a schematic view of vehicle 100 approaching fully charged battery assembly 2040. In some embodiments, vehicle 100 may include provisions for helping align vehicle 100 and battery assembly 2040. In one embodiment, vehicle 100 could include one or more cameras disposed on or near mounting and dismounting system 250. As vehicle 100 approaches, an operator may watch a display of the video feed to help align mounting and dismounting system 250 with battery assembly 2040.

Referring to FIG. 23, a schematic view of a second display screen 2100 is shown. Display screen 2100 may display the view from a mounting camera that may be disposed, for example, on a portion of mounting and dismounting system 250.

Some embodiments could incorporate indicia or other visual indicators on a battery assembly. These indicia may be seen on the video feed to help an operator determine when the vehicle is properly aligned. In the embodiment of FIG. 23, a rear side of battery assembly 2040 may be configured with a first physical indicia 2105 and a second physical indicia 2107 at the top and bottom, respectively, of battery assembly 2040. A set of virtual indicia, including a first virtual indicia 2110 and a second virtual indicia 2111 are superimposed over the video image of battery assembly 2040. As the driver gets closer to battery assembly 2040 they may attempt to steer vehicle 100 so that virtual indicia 2110 and virtual indicia 2111 are aligned over physical indicia 2105 and indicia 2107, respectively. This may help a driver to accurately align components of mounting and dismounting system 250 with corresponding features (such as bars that can be grasped) of battery assembly 2040.

Figure 24:
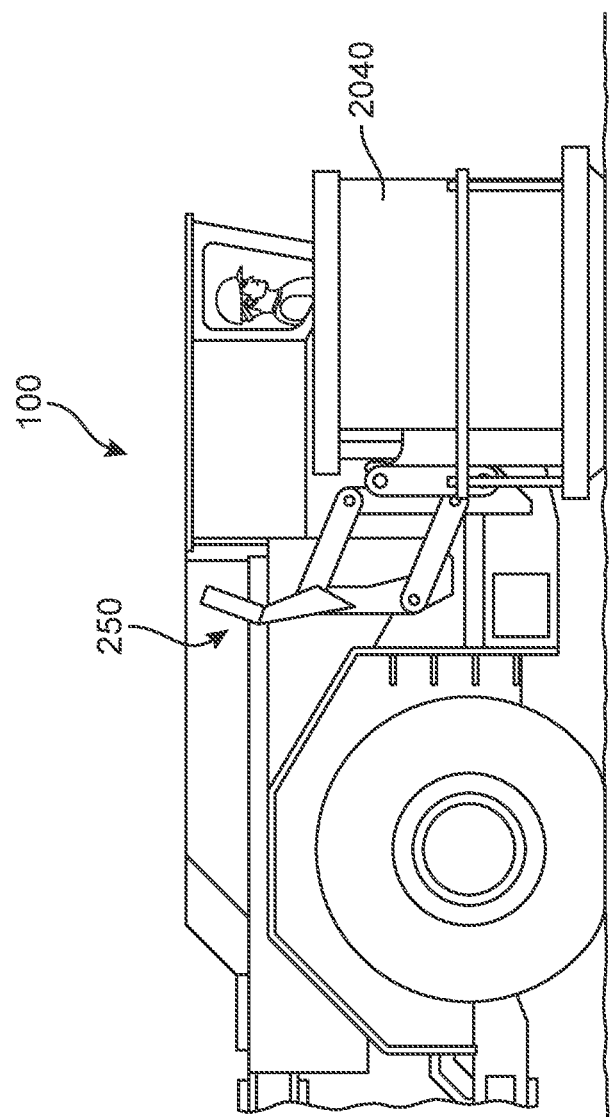
FIGS. 24-25 are a schematic views of a battery assembly being raised and mounted to a vehicle, according to an embodiment.

FIG. 24 shows a schematic view of vehicle 100 stopped at second location 2033 where charged battery assembly 2040 is disposed. Vehicle 100 is positioned so that mounting and dismounting system 250 is in contact with charged battery assembly 2040.

Figure 25:
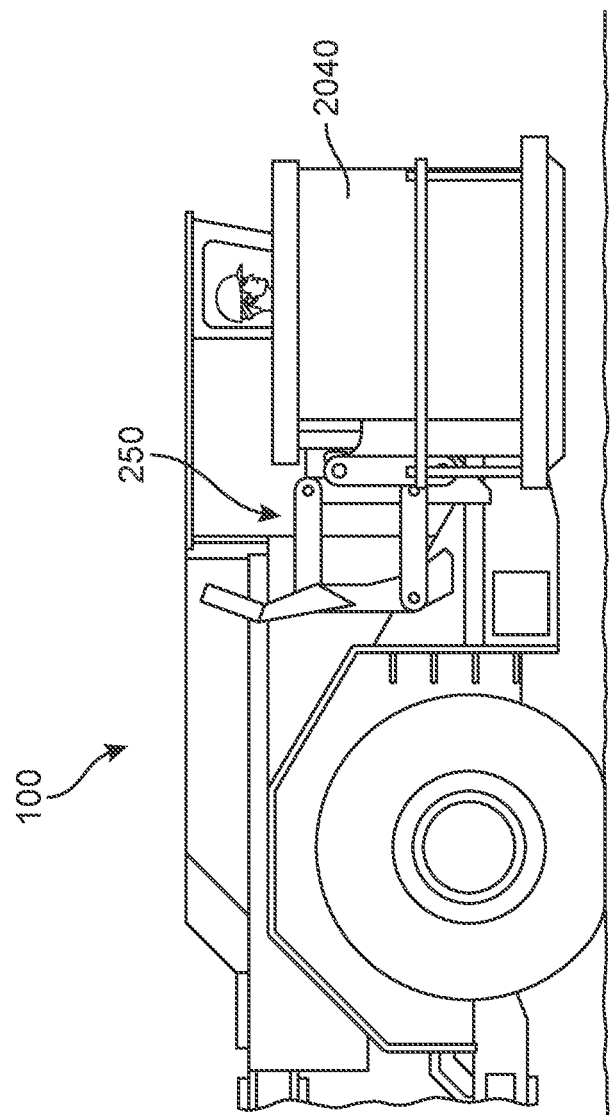
Figure 26:
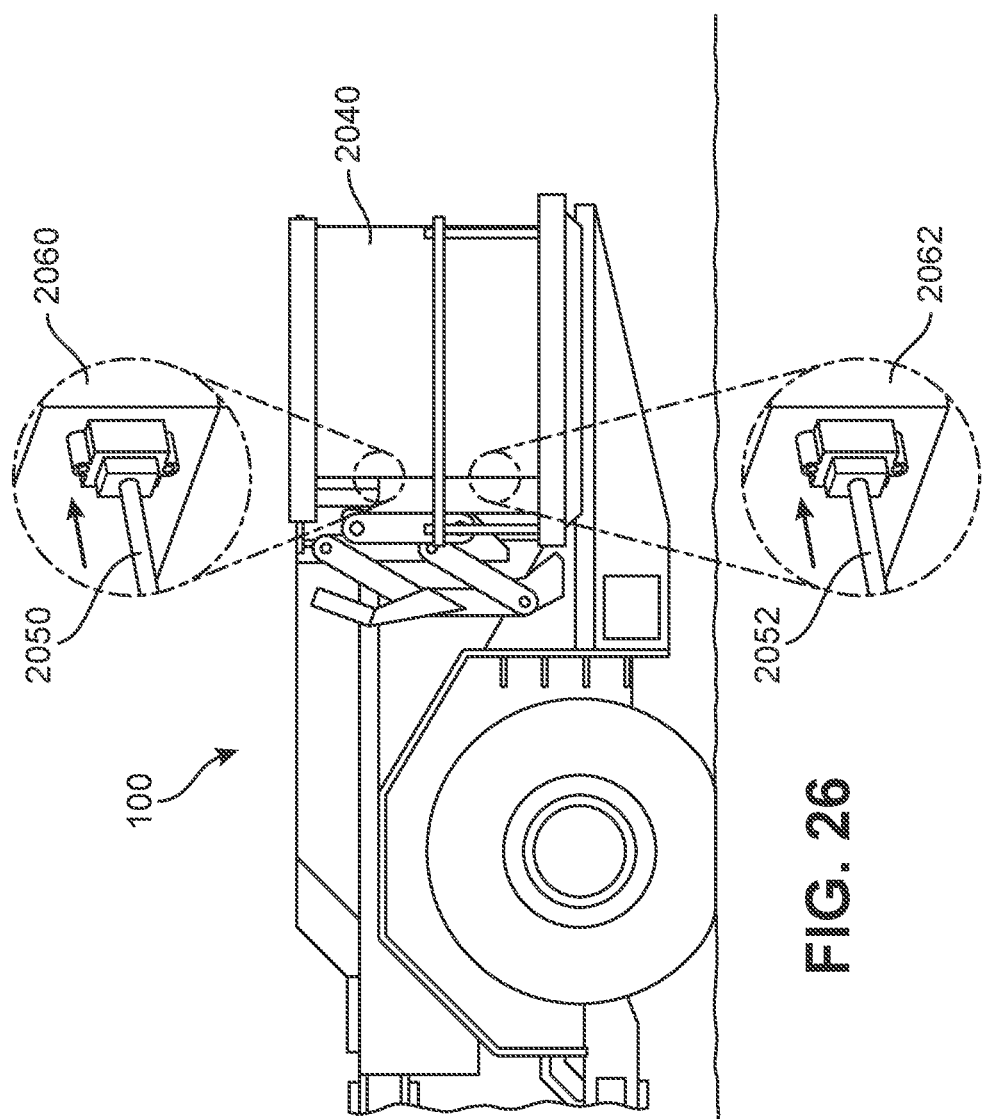
FIG. 26 is a schematic view of an embodiment of a set of power cables being reattached to battery packs in a battery assembly, according to an embodiment.

FIG. 25 illustrates a schematic view of vehicle 100 as charged battery assembly 2040 is raised off the ground by mounting and dismounting system 250. Finally, as seen in FIG. 26, battery assembly 2040 is raised to a final mounted position. At this point an operator may reconnect the electrical cables and/or other physical connections with the battery packs of battery assembly 2040. As seen in FIG. 26, cable 2050 and cable 2052 are manually reconnected with a battery pack 2060 and a battery pack 2062 of battery assembly 2040, respectively.

In an alternative embodiment, it is contemplated that electric cables could be designed to extend out from vehicle 100 while battery assembly 2040 is disposed on the ground. In such an embodiment, the electrical cables could be attached the battery packs of battery assembly 2040 prior to mounting battery assembly 2040 on vehicle 100. Therefore, it is conceivable that power from battery pack 2060 and battery pack 2062 could be used to power mounting and dismounting system 250.

Figure 27:
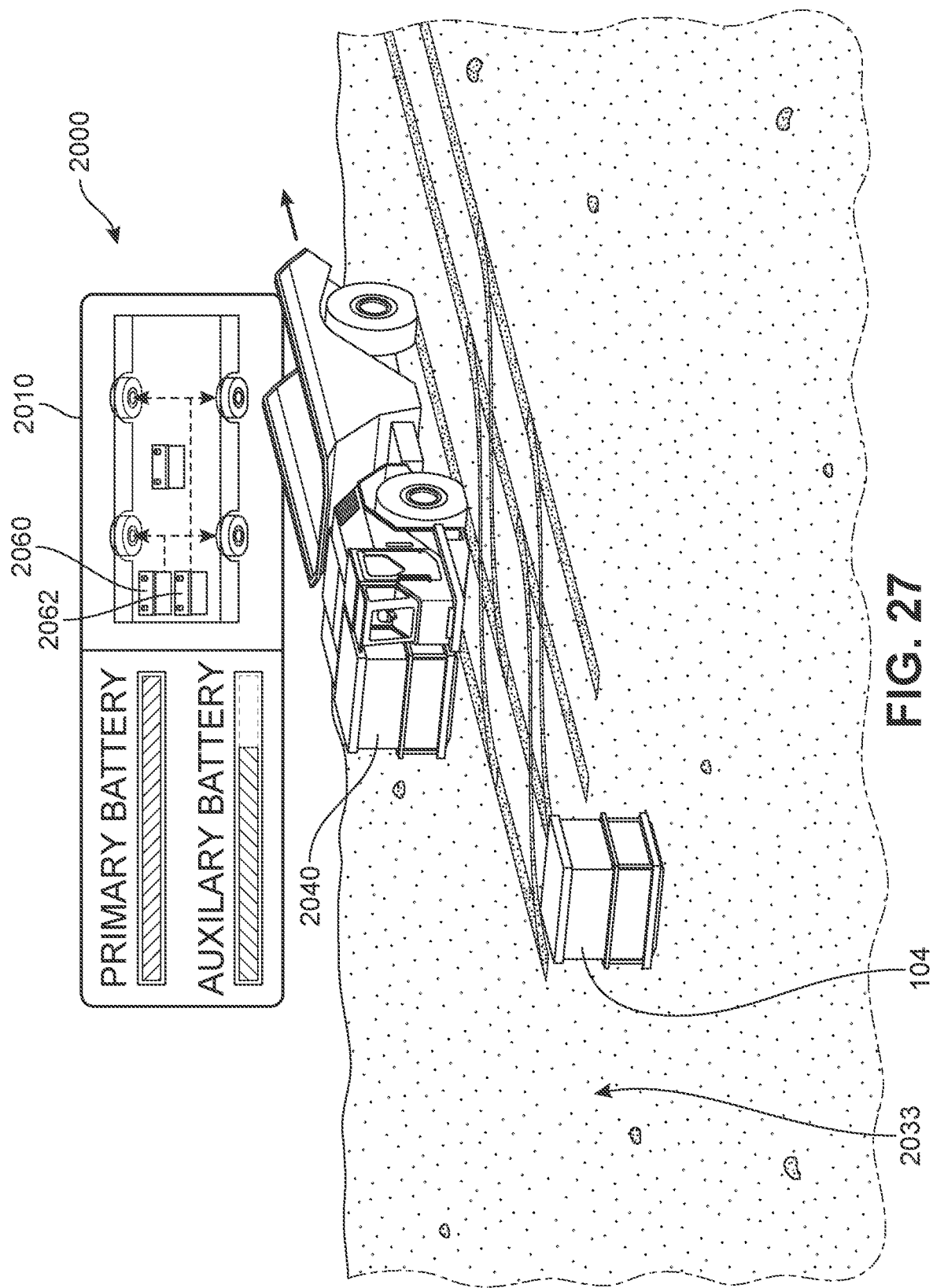
FIG. 27 is a schematic view of a vehicle reversing away from an area where a battery swapping process has occurred, according to an embodiment.

FIG. 27 shows a schematic view of vehicle 100 driving away (reversing) from second location 2033 with a fully charged primary battery assembly. As seen in power flow section 2010 of display screen 2000, battery pack 2060 and battery pack 2062 of primary battery assembly 2040 are powering the motion of vehicle 100 and the auxiliary battery pack is no longer in use.

Vehicle 100 may now return to hauling material in (or outside of) the mine for as long as the current primary battery assembly remains charged. Once the current battery assembly is fully (or near fully) discharged, vehicle 100 may repeat this same process of swapping a discharged battery with a fully charged battery.

Figure 28:
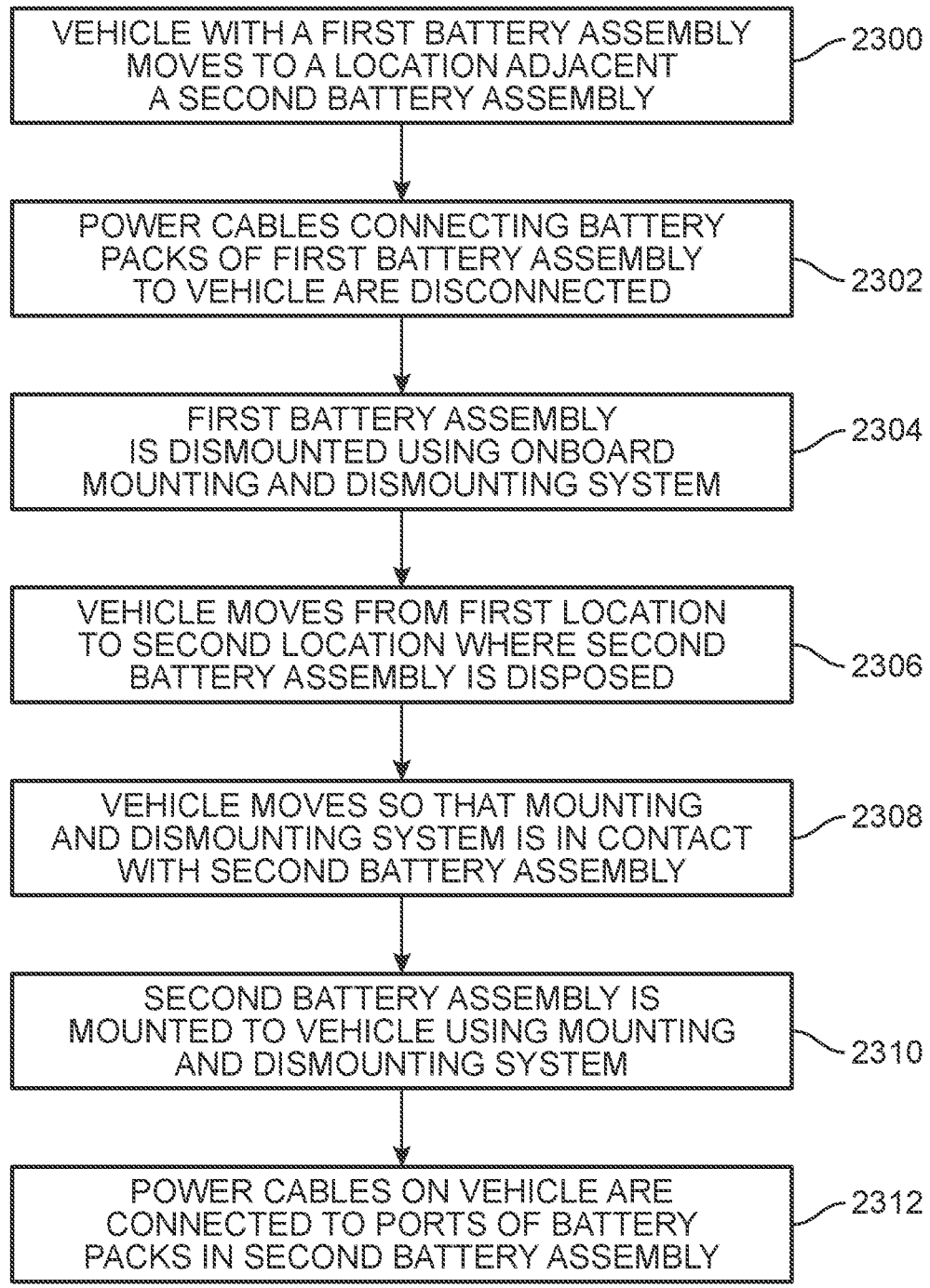
FIG. 28 is a schematic view of a process for swapping batteries in an electric vehicle, according to an embodiment.

FIG. 28 is a flow chart illustrating a process for battery swapping according to the steps described above. It may be appreciated that in some embodiments, some of these steps may be optional. In other embodiments, additional steps may be included.

During a first step 2300, a vehicle with one or more replaceable battery packs comprising a first battery assembly may move to a first location. In some cases, the first location may be adjacent to a second location where a second battery assembly including one or more charged battery packs has been placed.

In a second step 2302, one or more battery packs of the first battery assembly can be disconnected from the vehicle. This may include disconnecting power cables. In some cases, the power cables may be manually disconnected. In other cases, the power cables could be automatically disconnected.

In a third step 2304, the first battery assembly can be dismounted from the vehicle using an onboard mounting and dismounting system. In some cases, this may include a hydraulically actuated linkage assembly as well as one or more latches. In particular, in some cases, latches that are holding the first battery assembly in place against the vehicle may release and a linkage assembly can be used to lower the first battery assembly to the ground. In some cases, the linkage system is automatically disconnected from the first battery assembly as the battery assembly is placed on the ground.

In a fourth step 2306, the vehicle may move away from the first battery assembly and travel to the second location where the second battery assembly is located. During this time, the vehicle may operate using power from an auxiliary battery that is onboard the vehicle at all times.

In a fifth step 2308, the vehicle may approach the second battery assembly and make contact between the second battery assembly and the mounting and dismounting system. In some cases, a video feed may be used to help properly align the mounting and dismounting system with the second battery assembly. In some cases, the battery assembly could be provided with indicia to facilitate alignment. In other cases, the video feed may project one or more indicia to be aligned with parts of the battery assembly (possibly other physical indicia on the battery).

In a sixth step 2310, the mounting and dismounting system may be used to lift the second battery assembly up and lock it into place on the vehicle. In some cases, as the second battery assembly is lifted to a highest position, one or more portions of the battery assembly may be grasped by one or more latches of the mounting and dismounting system to lock the battery assembly into place.

In a seventh step 2312, once the second battery assembly has been mounted to the vehicle, any power cables can be reconnected with the battery packs of the second battery assembly. At this point, the vehicle may be powered by the secondary battery assembly rather than the auxiliary battery.

In some embodiments, battery swapping can occur at one or more fixed locations (e.g., locations in a mine). In such cases, an operator may have a map or list of these locations and when the primary battery assembly needs to be swapped the operator may drive the vehicle to the closest known swapping location. In other embodiments, battery swapping locations could change, especially as the mining operation evolves with vehicles located primarily in some regions of the mine but not others. In still other embodiments, battery swapping could occur on demand. That is, when the operator realizes the battery assembly has a low charge, he or she may call a dispatcher to request that a fully charged battery assembly be delivered to a nearby location.

The present embodiments depict battery swapping with an unloaded vehicle. It may be appreciated, however, that this same battery swapping process could happen while the bed of the truck is loaded with material.

Embodiments may include provisions for recharging an auxiliary battery pack. In some embodiments, an auxiliary battery pack may be charged by way of an onboard converter that is connected to one or more modules of the primary battery assembly. In one embodiment, an onboard 600V to 300V DC/DC converter may be used. In other embodiments, an auxiliary battery pack could be recharged by an external source. In such cases, the auxiliary battery pack could be recharged at the end of the day (or other operating cycle of the truck).

Battery Mounting and Dismounting

Figure 29:
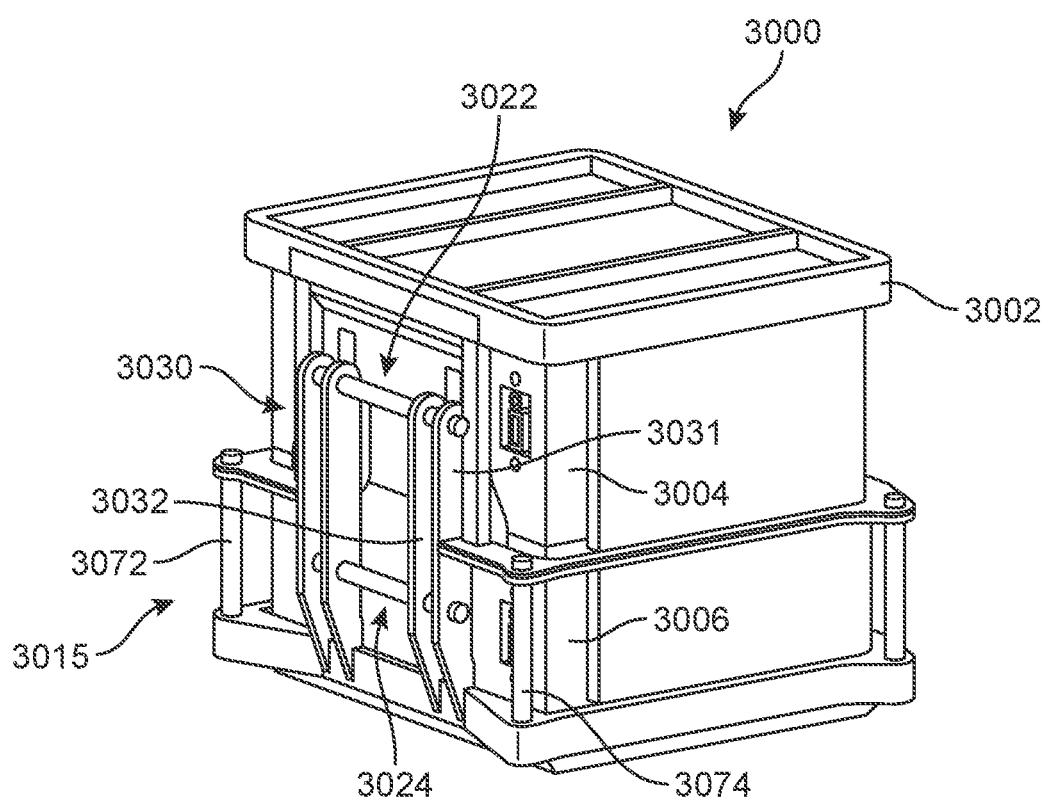
FIG. 29 is a schematic isometric view of an embodiment of a battery assembly.
Figure 30:
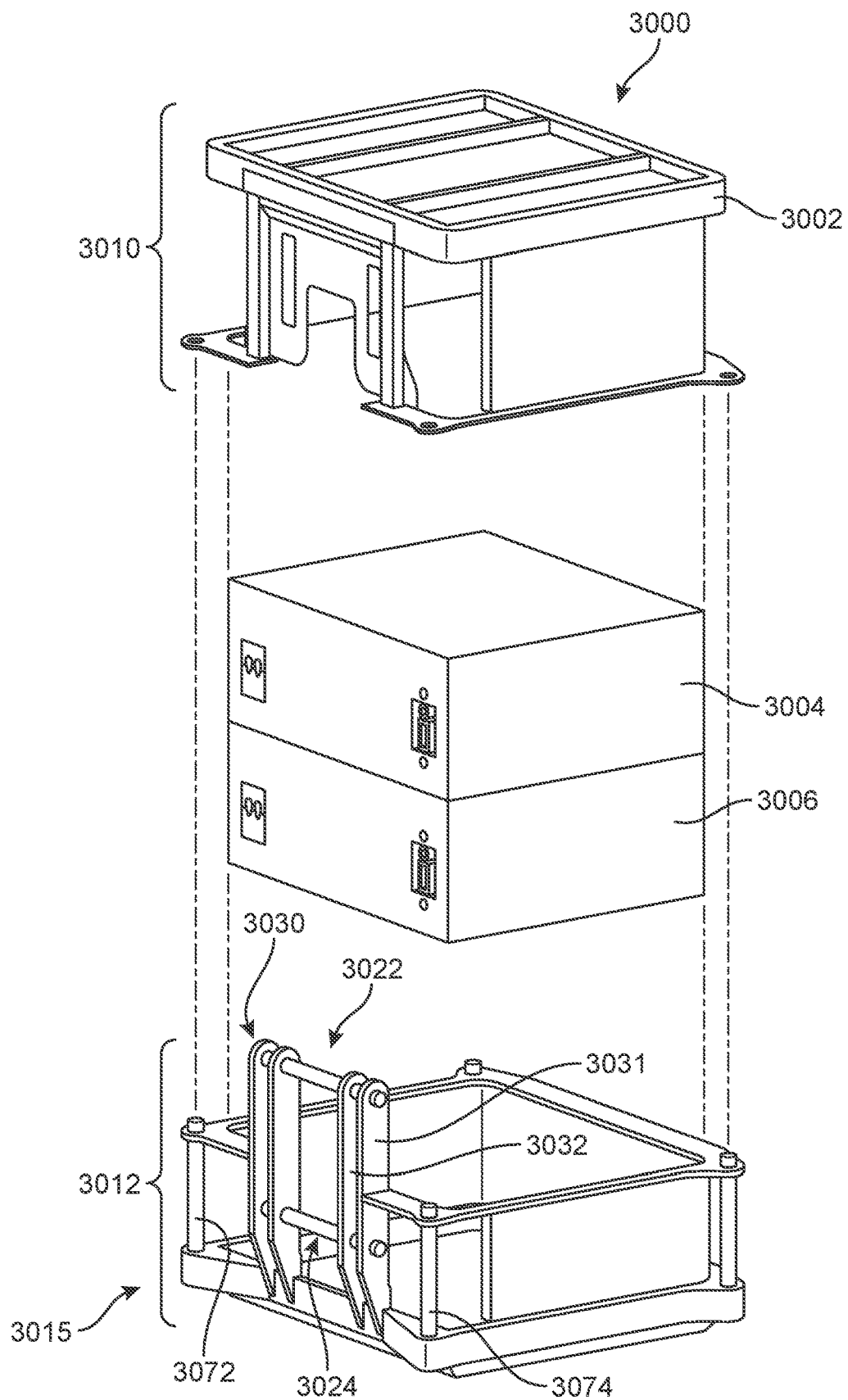
FIG. 30 is a schematic isometric exploded view of an embodiment of a battery assembly.
Figure 31:
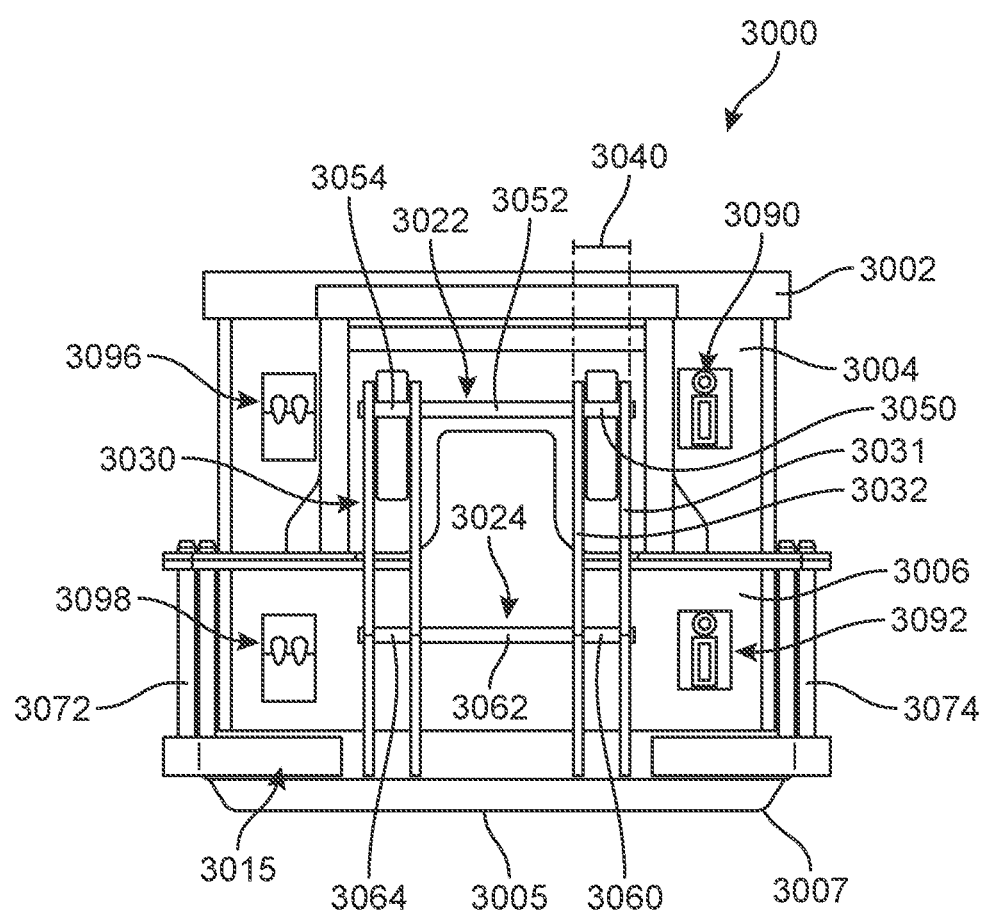
FIG. 31 is a schematic rear view of an embodiment of a battery assembly.

FIGS. 29-31 illustrate schematic views of an exemplary battery assembly 3000. Battery assembly 3000 may share some provisions with battery assembly 104 (and battery assembly 2040). However, it may be appreciated that in different embodiments, some of the following features of a battery assembly could be optional.

Referring to FIG. 29-30, battery assembly 3000 is comprised of a battery cage 3002, a first battery pack 3004 and a second battery pack 3006. Each battery pack may further one or more battery cells.

Battery cage 3002 may serve to retain and protect first battery pack 3004 and second battery pack 3006. To this end, battery cage 3002 may be sized and dimensioned to receive each of first battery pack 3004 and second battery pack 3006. In the embodiments shown in FIGS. 29-30, battery cage 3002 is configured as a relatively thin outer casing with an interior cavity that can hold two battery packs in a stacked configuration. In particular, battery cage 3002 has a horizontal footprint that is slightly larger than the horizontal footprint of each battery pack. Battery cage 3002 also has a vertical height that is slightly larger than the combined heights of first battery pack 3004 and second battery pack 3006.

As seen in FIG. 30, battery cage 3002 is configured as two separate parts that can be separated, including an upper cage portion 3010 and a lower cage portion 3012. Upper cage portion 3010 is sized and dimensioned to receive first battery pack 3004. Lower cage portion 3012 is sized and dimensioned to receive second battery pack 3006. Upper cage portion 3010 and lower cage portion 3012 can be attached using any kinds of fasteners known in the art.

Battery cage 3002 may include provisions to facilitate mounting and dismounting. Some embodiments can include one or more horizontal bars that are configured to facilitate mounting. Some embodiments can include one or more vertical bars that are configured to facilitate mounting. Some embodiments can include a combination of horizontal and vertical bars to facilitate mounting.

As seen in FIGS. 29-31, battery cage 3002 includes a set of horizontal mounting bars, including an upper horizontal mounting bar 3022 and a lower horizontal mounting bar 3024.

Each horizontal mounting bar is projected slightly rearwards from rearward side 3015 of battery cage 3002. Furthermore, the horizontal mounting bars are retained by two sets of vertically oriented brackets 3030. These vertically oriented brackets 3030 are located at opposing ends of the horizontal mounting bars. Each pair of brackets may be spaced apart by a fixed distance. As an example, first vertically oriented bracket 3031 and second vertically oriented bracket 3032 are spaced apart by a distance 3040 (see FIG. 31). This configuration divides each horizontal bar into separate sections that could be grasped by a mounting and dismounting system. Specifically, upper horizontal mounting bar 3022 is divided into a first end segment 3050, an intermediate segment 3052 and a second end segment 3054. Likewise, lower horizontal mounting bar 3024 is divided into a first end segment 3060, an intermediate segment 3062 and a second end segment 3064.

Some embodiments can include one or more vertical bars. As seen in FIGS. 29-31, battery cage 3002 includes a set of vertical mounting bars. In particular, battery cage 3002 comprises first vertical mounting bar 3072 and second vertical mounting bar 3074.

Each vertical mounting bar extends from a lower side of lower cage portion 3012 to a lower side of upper cage portion 3010. Moreover, the vertical mounting bars are disposed at opposing rearward corners of battery cage 3002. Thus, in some cases, each vertical mounting bar may also be configured to provide some strength to battery cage 3002 under vertically applied loads. In some cases, similar vertically oriented bars may also be located at one or both of the front corners of battery cage 3002 to help with structural support.

It may be appreciated that both horizontal bars and vertical bars can facilitate mounting in at least three ways. First, either type of bar can be grasped by components of a mounting and dismounting system to help raise and/or lower the battery assembly. Second, either type of bar can facilitate horizontal and/or vertical alignment by interacting with a corresponding component on a mounting and dismounting system (e.g., a v-shaped block that may help to automatically align the battery cage in the horizontal and/or vertical directions). Third, either type of bar can be locked in place, for example using one or more latches or other locking mechanisms. It may be appreciated though that in different embodiments horizontal and vertical bars could be used to achieve different functions (e.g., horizontal bars for lifting, alignment and latching and vertical bars for alignment and latching but not lifting).

In the present embodiment shown in FIGS. 29-31, set of horizontal mounting bars 3020 may function as contact points for lifting/lowering battery cage 3002, for aligning battery cage 3002 and for locking battery cage 3002 in place (e.g., using latches that grasp the bars). In contrast, set of vertical mounting bars 3070 may not be used as contact points during lifting/lowering battery cage 3002, but may be used to facilitate alignment and/or locking battery cage 3002 in place (e.g., using latches that grasp the bars).

Battery cage 3002 may primarily be closed on the front, top, bottom and side surfaces. However, battery cage 3002 may be partially open on rearward side 3015 (as well as parts of the side surfaces) so that connecting ports or other provisions of the battery packs can be exposed.

Some embodiments can include provisions to facilitate sliding a battery on an uneven ground surface. As best seen in FIG. 31, battery cage 3002 may have a bottom surface 3005 with rounded corners 3007 to facilitate sliding.

Battery cage 3002 is designed to retain and protect first battery pack 3004 and second battery pack 3006. To do this, battery cage 3002 is constructed to have sufficient strength while being secured to a haul truck primarily along attachment points on rearward side 3015.

In different embodiments, materials for battery cage 3002 could vary. In some embodiments, battery cage 3002 is constructed of a material including a metal or metal alloy. In some embodiments, battery cage 3002 is constructed of a similar material to the material used in the chassis (e.g., frame 101) of vehicle 100.

Each battery pack may be configured with one or more ports for receiving electrical cables. As seen in FIG. 31, first battery pack 3004 includes a port 3090 for connecting an electric cable. Second battery pack 3006 includes a port 3092 for connecting an electric cable. These ports may be used to connect each battery pack to one or more circuits of a vehicle when battery assembly 3000 is mounted to the vehicle. These ports may also be used to connect each battery pack to a charging source when the battery assembly has been dismounted from the vehicle. In other embodiments, however, each battery pack could include two or more electrical ports including a port for connecting the battery pack to an electrical circuit of the vehicle and a separate port for charging the battery pack.

Each battery pack can also be configured with one or more valves or fluid ports to facilitate the flow of oil or other fluids to cool the battery packs. In FIG. 31, first battery pack 3004 includes a set of fluid ports 3096. Also, second battery pack 3006 includes a set of fluid portions 3098.

Figure 32:
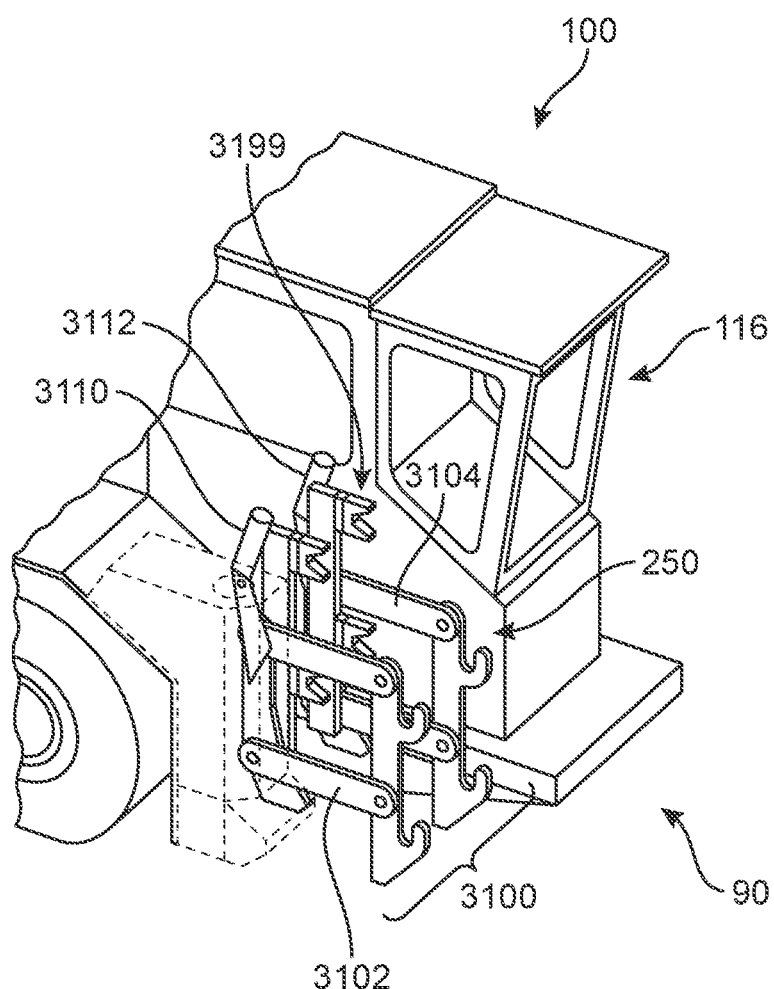
FIG. 32 is a schematic isometric view of a front end of a vehicle with a mounting and dismounting system, according to an embodiment.

FIG. 32 illustrates a schematic view of a portion of vehicle 100 at front end 90. As seen in FIG. 32, mounting and dismounting system 250 is disposed at front end 90 adjacent to cab 116. Mounting and dismounting system 250 comprises a pair of linkage assemblies 3100. Specifically, mounting and dismounting system 250 includes a first linkage assembly 3102 and a second linkage assembly 3104 that is spaced apart from first linkage assembly 3102.

Each linkage assembly is actuated by at least one hydraulic cylinder. Specifically, first linkage assembly 3102 is actuated by first hydraulic cylinder 3110. Second linkage assembly 3104 is actuated by second hydraulic cylinder 3112.

Mounting and dismounting system 250 can also include provisions for locking a battery assembly into place on vehicle 100. Mounting and dismounting system 250 includes a set of receiving members 3199 that may be used to secure a battery assembly in place on vehicle 100.

Figure 33:
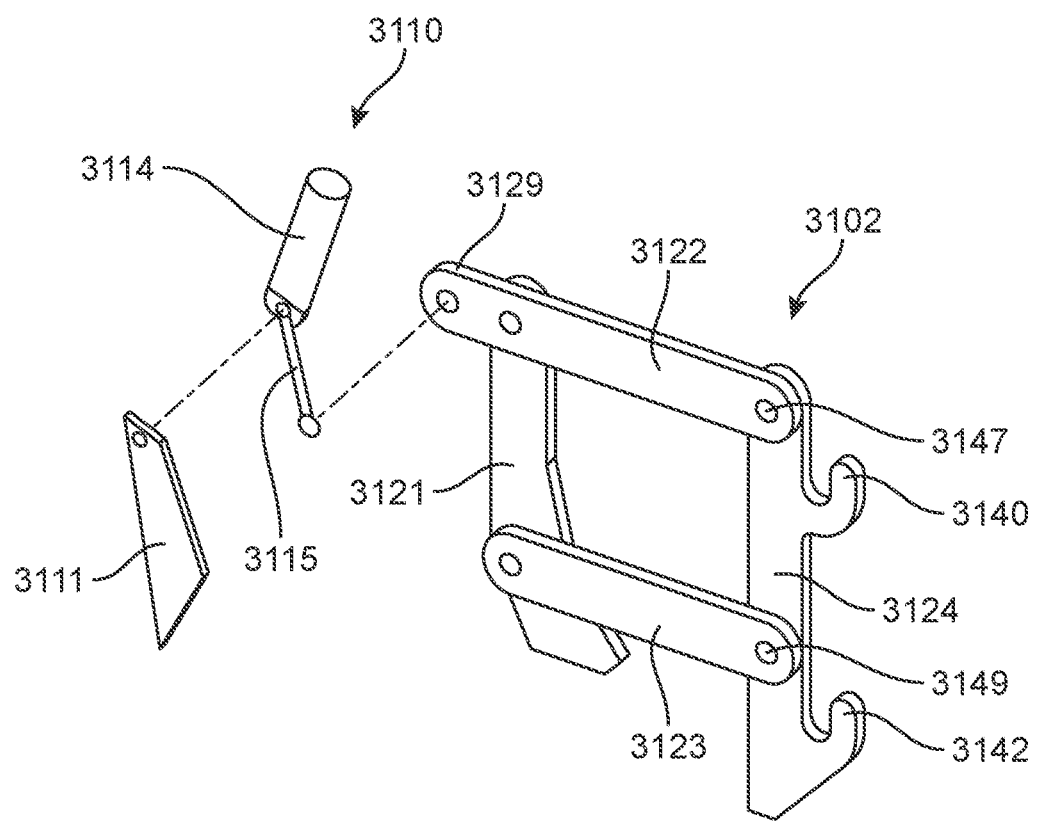
FIG. 33 is a schematic isometric view of an embodiment of a linkage assembly.

FIG. 33 is an exploded isometric view of first linkage assembly 3102 (also referred to simply as linkage assembly 3102), hydraulic cylinder 3110 and another structural element 3111. A first end of structural element 3111 may be pivotably connected to the cylinder barrel 3114 of hydraulic cylinder 3110. In some embodiments, a second end of structural element 3111 may attached to another portion of vehicle 100. In some embodiments, a second end of structural element 3111 could be fixed to one of the links in linkage assembly 3102.

Linkage assembly 3102 may be a four-bar linkage. That is, linkage assembly 3102 comprises four links connected arranged in a loop and connected to one another by four revolute joints. More specifically, linkage assembly 3102 may be a planar four-bar linkage as the links are confined to move in parallel planes.

Linkage assembly 3102 comprises four links including ground link 3121 (also referred to as a fixed link or frame), upper grounded link 3122, lower grounded link 3123 and floating link 3124. As seen in FIG. 32, ground link 3121 may be fixed in an approximately vertical position on vehicle 100. Floating link 3124 remains approximately parallel with ground link 3121 (i.e., oriented in an approximately vertical direction). The orientations of upper grounded link 3122 and lower grounded link 3123 may vary as the linkage is actuated.

Floating link 3124 includes a first hook 3140 and a second hook 3142. First hook 3140 and second hook 3142 extend forwards from floating link 3124 such that when disposed on vehicle 100 the hooks may be the forwardmost portions of linkage assembly 3102. First hook 3140 may be disposed above second hook 3142. That is, first hook 3140 and second hook 3142 may have different vertical positions. First hook 3140 may be disposed just below a pivot joint 3147 between upper grounded link 3122 and floating link 3124. Likewise, second hook 3142 may be disposed just below a pivot join 3149 between lower grounded link 3123 and floating link 3124.

Each hook is shaped and designed to receive a corresponding part on a battery cage so that linkage assembly 3102 can engage and lift (or lower) the battery cage along with second linkage assembly 3104. For example, first hook 3140 may be sized and shaped to receive a segment of upper horizontal mounting bar 3022. Second hook 3142 may be sized and shaped to receive a segment of lower horizontal mounting bar 3024.

Linkage assembly 3102 is actuated by a piston rod 3115 of hydraulic cylinder 3110. Specifically, the end of piston rod 3115 may be pivotably coupled with an end 3129 of upper grounded link 3122. End 3129 may be the end of upper grounded link 3122 that is connected to ground link 3121. Thus, as piston rod 3115 extends from cylinder barrel 3114, end 3129 of upper grounded link 3122 is pushed downwardly and acts to tilt upper grounded link 3122 upwardly so that floating link 3124 is raised upwards. Likewise, as piston rod 3115 contracts within cylinder barrel 3114, end 3129 of upper grounded link 3122 is pulled up and acts to tilt upper grounded link 3122 in a downward direction so that floating link 3124 is lowered. Because of the configuration of linkage assembly 3102, lower grounded link 3124 moves in a similar manner to upper grounded link 3122 during actuation even thought it may not be in direct contact with an actuator (like hydraulic cylinder 3110).

Although the current embodiments incorporate linkage assemblies, it may be appreciated that in other embodiments other mechanical assemblies could be used to raise and lower battery assemblies. More broadly, a battery mounting and dismounting system may include an actuatable assembly and an actuator for moving the actuatable assembly (e.g., a linkage assembly and a hydraulic cylinder). The system may further include an engaging component of the actuatable assembly (e.g., a floating link). The engaging component may include at least two vertically spaced hooks for engaging a battery assembly so that as the actuatable assembly is actuated the battery assembly can be raised or lowered.

It may also be appreciated that the term "hook" as used herein is not intended to be limited to a particular size or geometry. As used herein a hook refers to any piece of material (e.g., metal) that is curved or bent for the purpose of holding, catching or otherwise engaging other elements.

FIGS. 34-38 illustrate schematic views of a range of motion of linkage assembly 3102. For clarity, reference is made to the overall position of floating link 3124 as well as the vertical and horizontal components of the overall position. The vertical component of a position may be taken as relative to an element with a fixed vertical position, such as structural element 3111. Likewise, the horizontal component of a position may be taken as relative to an element with a fixed horizontal position, such as ground link 3121.

Figure 34:
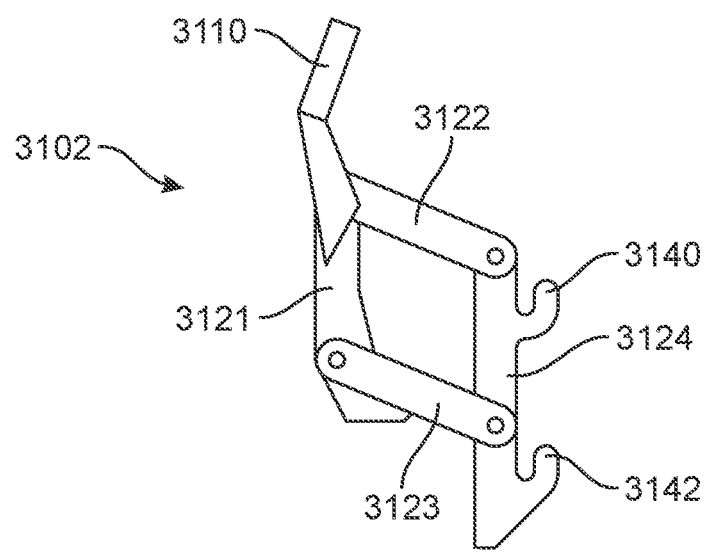
FIGS. 34-38 are schematic side views of a range of motion of a linkage assembly, according to an embodiment.

Initially, as seen in FIG. 34, linkage assembly 3102 is seen to be disposed in a first position, which corresponds with a first vertical position and a first horizontal position. In this first position floating link 3124 is at its lowest vertical position in its range of motion. Also, upper grounded link 3122 and lower grounded link 3123 are tilted downwardly.

Figure 35:
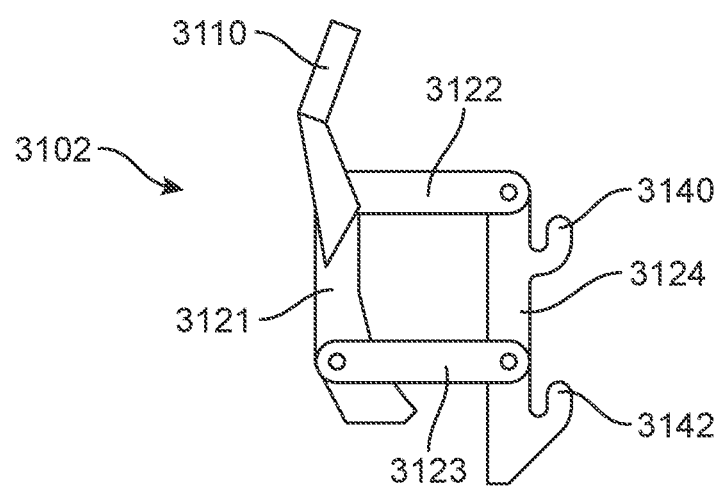

FIG. 35 shows linkage assembly 3102 in a second position, which corresponds with a second vertical position and a second horizontal position. In this second position upper grounded link 3122 and lower grounded link 3123 are both approximately horizontal (and thus approximately perpendicular to floating link 3124). As seen by comparison with FIG. 34, floating link 3124 has moved upwards. Floating link 3124 has also achieved some small motion forward (e.g., away from ground link 3121). This initial sweep forward of floating link 3124 may help ensure proper engagement with a battery assembly, as discussed in further detail below.

Figure 36:
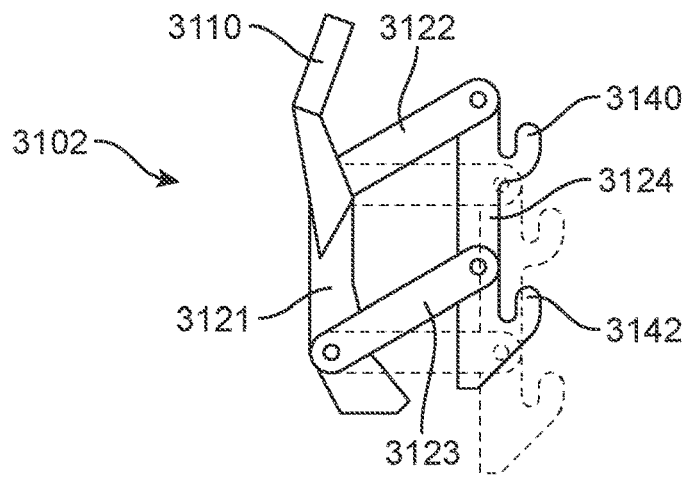

FIG. 36 shows linkage assembly 3102 in a third position, which corresponds with a third vertical position and a third horizontal position. In this third position upper grounded link 3122 and lower grounded link 3123 are both tilted upwards so that floating link 3124 is raised up. By comparison with the second position in FIG. 35, floating link 3124 has risen primarily in the vertical direction with relatively less motion in the horizontal direction. This helps ensure that the energy used to get a battery assembly up onto a vehicle is primarily used for vertical lifting, rather than wasting energy in also moving the battery assembly through a wide range of horizontal motion as it is lifted off the ground.

Figure 37:
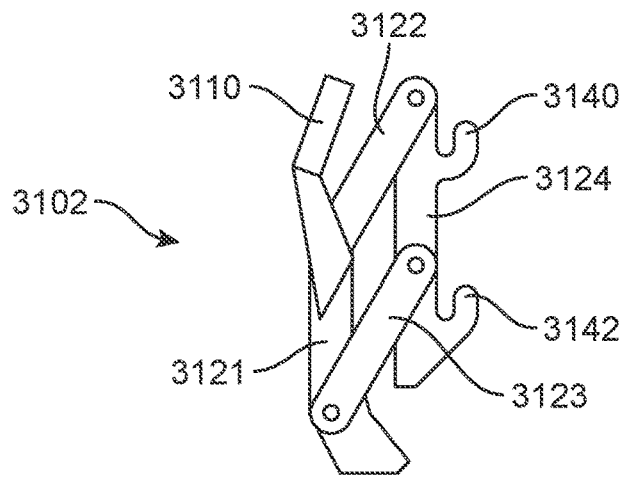

FIG. 37 shows linkage assembly 3102 in a fourth position, which corresponds with a fourth vertical position and a fourth horizontal position. In this fourth position upper grounded link 3122 and lower grounded link 3123 are more severely tilted up compared to their orientations in the third position shown in FIG. 36. In going from the third position to this fourth position, floating link 3124 has begun reversing its horizontal motion so that it is now traveling back towards ground link 3121 (and also vehicle 100). Moreover, its rate of vertical motion between the third and fourth positions is less than its rate of horizontal motion.

Figure 38:
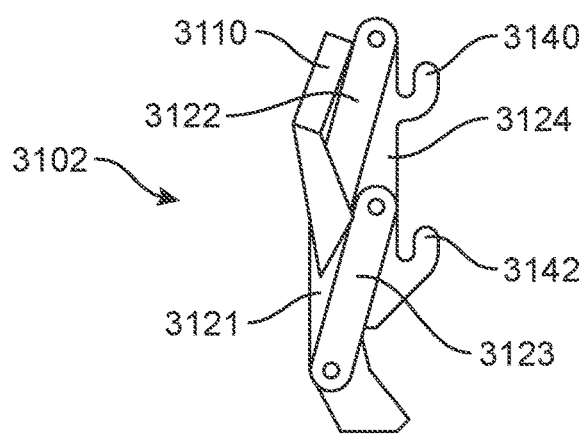

FIG. 38 shows linkage assembly 3102 in a fifth and final position, which corresponds with a fifth vertical position and a fifth horizontal position. In this fifth position upper grounded link 3122 and lower grounded link 3123 are almost vertical in their orientation. Also, floating link 3124 is disposed directly adjacent to (and possibly in contact with) ground link 3121. Between the fourth position of FIG. 37 and this fifth position almost all of the motion of floating link 3124 is directed in the horizontal direction with minimal vertical motion. This helps ensure that a battery assembly has sufficient horizontal momentum for contacting and being engaged by a locking mechanism (such as latches).

It may be appreciated that while the above discussion is directed to first linkage assembly 3102, similar provisions apply to second linkage assembly 3104. Moreover, first linkage assembly 3102 and second linkage assembly 3104 are configured to act in parallel with one another, undergoing substantially identical motions and sharing the load as a battery assembly is lifted or lowered from a vehicle.

Figure 39:
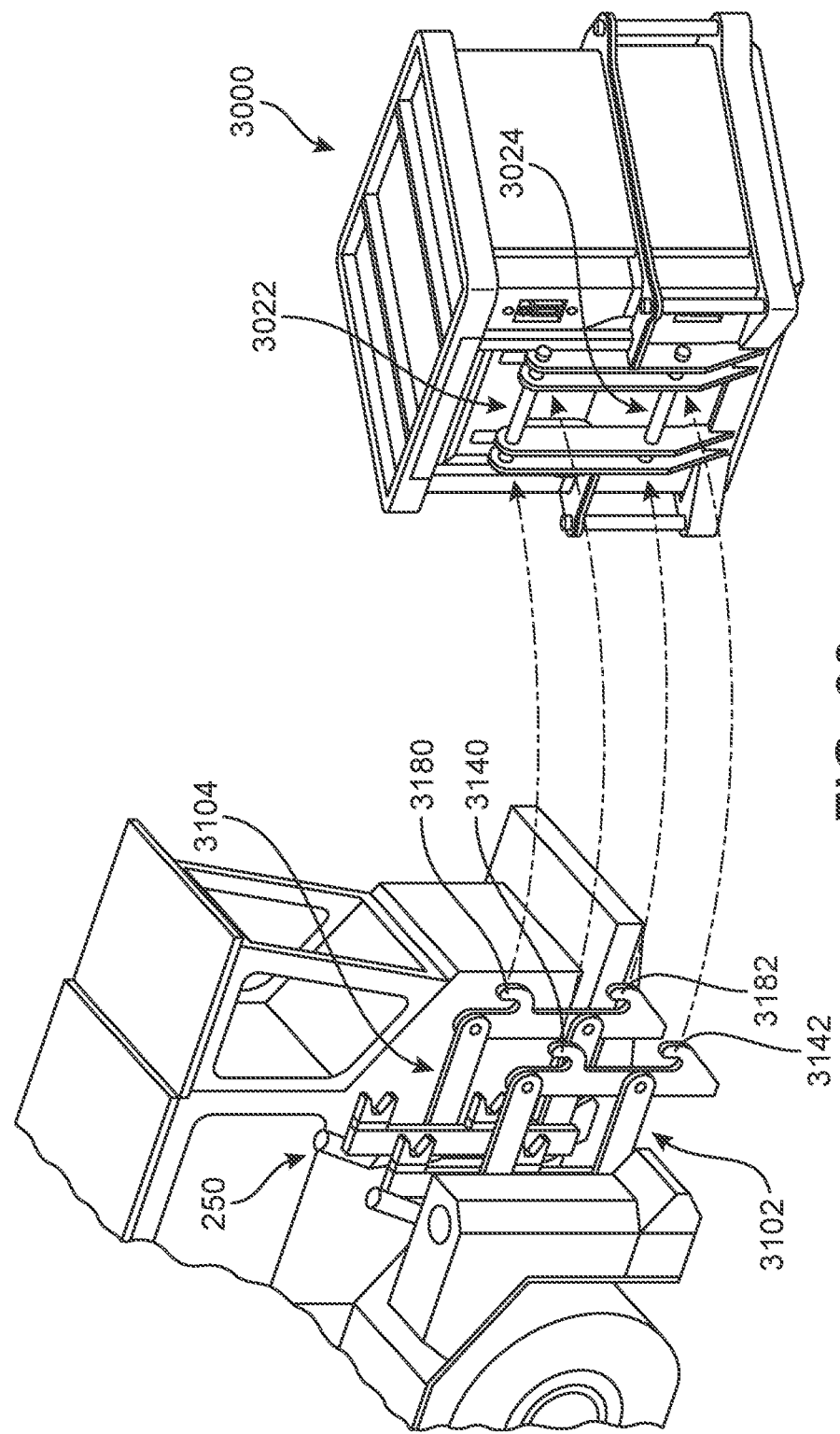
FIG. 39 is a schematic isometric view of a correspondence between a mounting system and mounting bars on a battery assembly, according to an embodiment.

FIG. 39 is a schematic view of a front end 90 of vehicle 100 and a dismounted battery assembly 3000. As indicated schematically in FIG. 39, each hook of mounting and dismounting system 250 may be correspond to one of the horizontal mounting bars of battery cage 3002. That is, each hook may be configured to grasp one of these two bars.

First hook 3140 of first linkage assembly 3102 is positioned to engage upper horizontal mounting bar 3022. Likewise, a first hook 3180 of second linkage assembly 3104 is also positioned to engage upper horizontal mounting bar 3022. Second hook 3142 of first linkage assembly 3102 is positioned to engage lower horizontal mounting bar 3022. Likewise, a second hook 3182 of second linkage assembly 3104 is also positioned to engage lower horizontal mounting bar 3024. This configuration provides for four points of engagement between mounting and dismounting system 250 and battery assembly 3000.

Generally, each hook can grab any segment of a corresponding horizontal bar. In some embodiments it may be desirable for hooks to grasp an intermediate segment of a bar, such as intermediate segment 3052 of upper horizontal mounting bar 3022 and intermediate segment 3062 of lower horizontal mounting bar 3024 (see FIG. 31). In other embodiments, it may be desirable for hooks to grasp end segments of a bar. This includes first end segment 3050 and second end segment 3054 of upper horizontal mounting bar 3022. This also includes first end segment 3060 and second end segment 3064 of lower horizontal mounting bar 3024.

FIGS. 40-45 illustrate schematic views of a process of mounting a battery assembly. For clarity, only first linkage assembly 3102 is shown in FIGS. 40-45, however it may be appreciated that second linkage assembly 3104 may operate in a substantially identical manner along with first linkage assembly 3102. Moreover, portions of battery assembly 3000 are shown in phantom so that a section of upper horizontal mounting bar 3022 and lower horizontal mounting bar 3024 are visible during this process.

Figure 40:
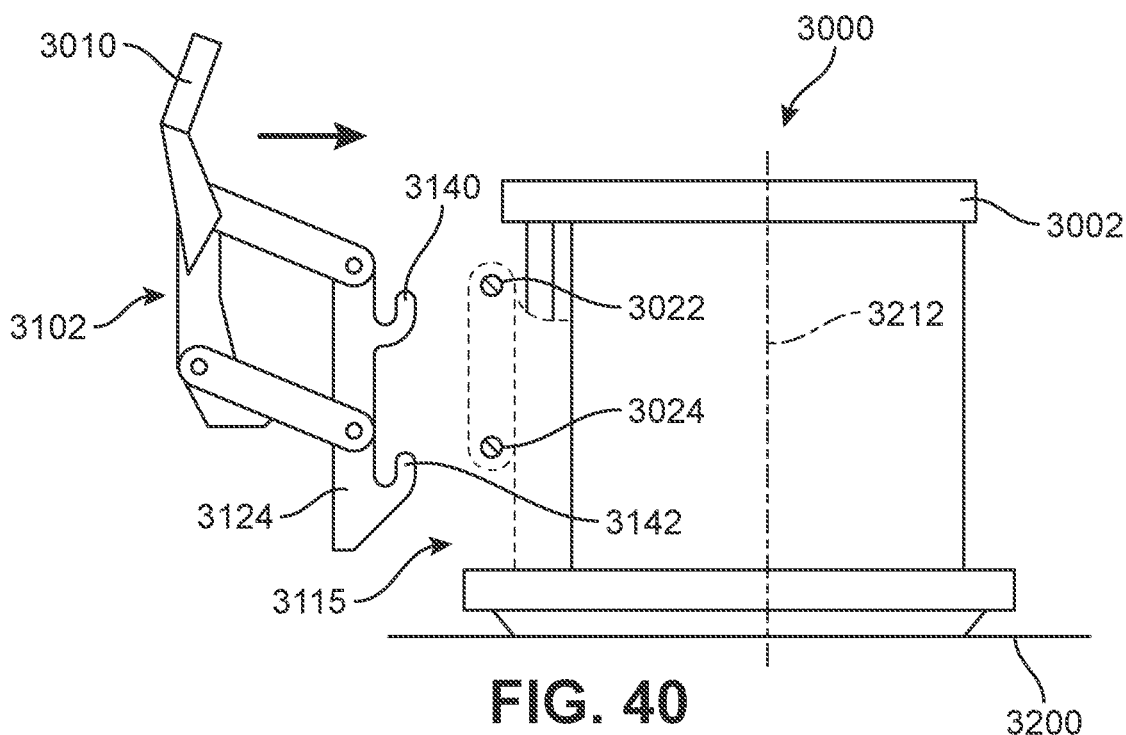
FIGS. 40-45 are schematic side views of a process of lifting a battery assembly using a linkage assembly, according to an embodiment.
Figure 41:
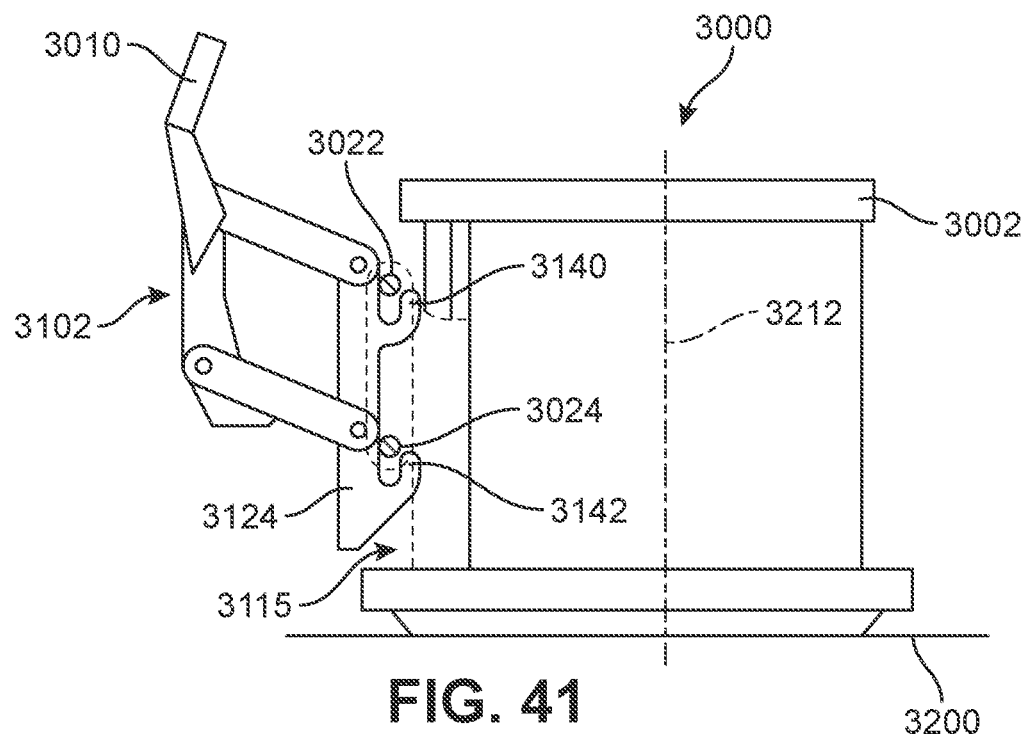

Initially, as shown in FIG. 40, battery assembly 3000 is disposed on a ground surface 3200. As vehicle 100 approaches battery assembly 3000 (as shown, for example, in FIG. 23), linkage assembly 3102 may be in a lowered position. Specifically, linkage assembly 3102 may be lowered to a position where first hook 3140 is sufficiently lower than upper horizontal mounting bar 3022 and so that second hook 3142 is sufficiently lower than lower horizontal mounting bar 3024. This ensures that first hook 3140 and second hook 3142 may be moved into position just beneath the mounting bars as the hooks make contact with rearward side 3015 of battery cage 3002 (as shown in FIG. 41).

Figure 42:
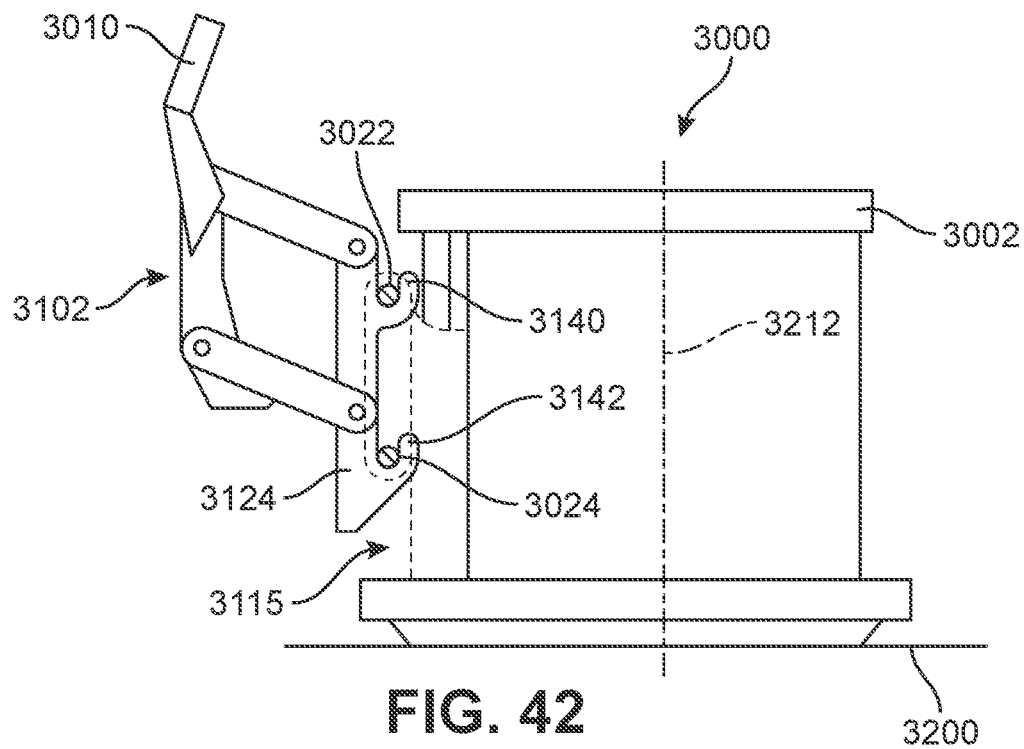

Once first hook 3140 and second hook 3142 are in contact with battery cage 3002, hydraulic cylinder 3110 may actuate linkage assembly 3102, as shown in FIG. 42. As discussed above, when starting from a lowest position linkage assembly 3102 moves so that floating link 3124 is moved slightly forwards in a horizontal direction as it simultaneously begins to move up. This slight forward horizontal motion may have the effect of pressing first hook 3140 and second hook 3142 further into battery cage 3002. In some cases, the force may be such that battery cage 3002 (or alternatively, vehicle 100) are displaced slightly in the horizontal direction, or titled slightly (as seen in FIG. 42). However, this forward motion is intentional to ensure that first hook 3140 and second hook 3142 completely engage upper horizontal mounting bar 3022 and lower horizontal mounting bar 3024.

Figure 43:
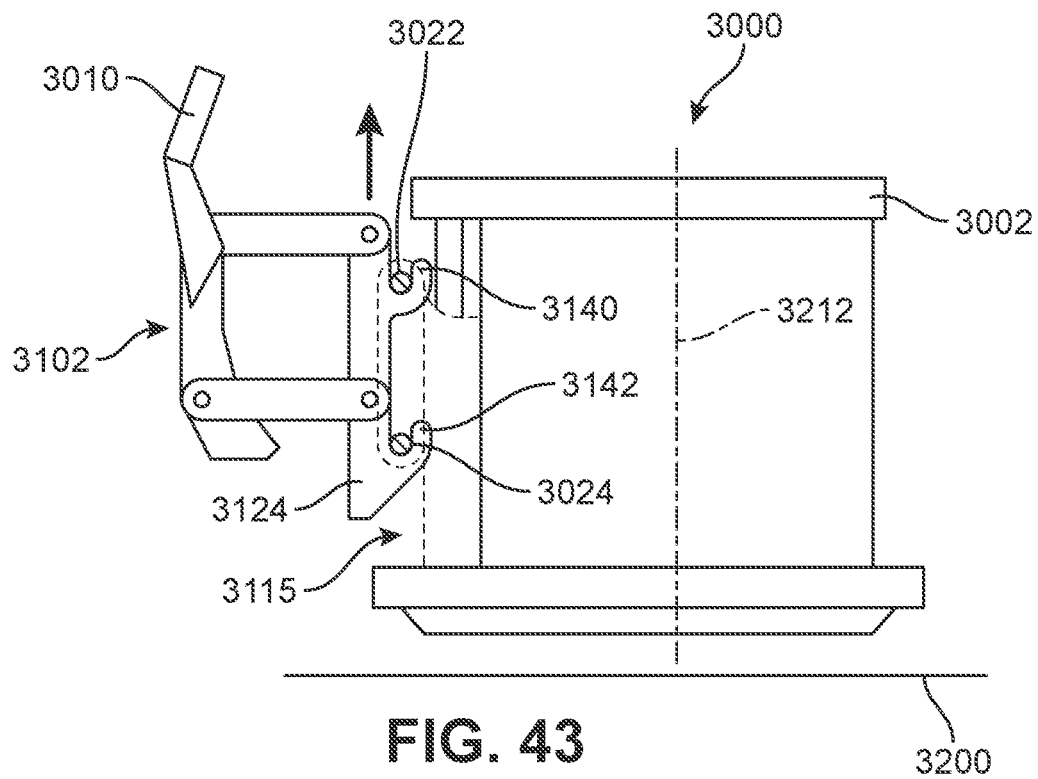

With the system properly engaged with the mounting bars linkage as shown in FIG. 42, linkage assembly 3102 may continue to move with floating link 3124 moving primarily in the vertical direction, as seen in FIG. 43. As floating link 3124 moves further up battery assembly 3000 is lifted off ground surface 3200.

Figure 44:
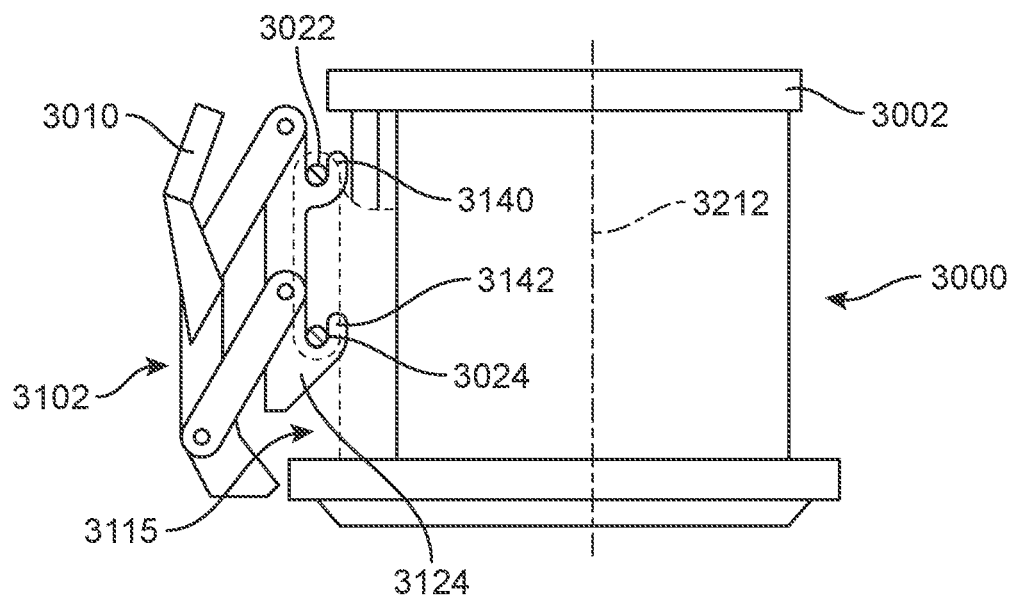
Figure 45:
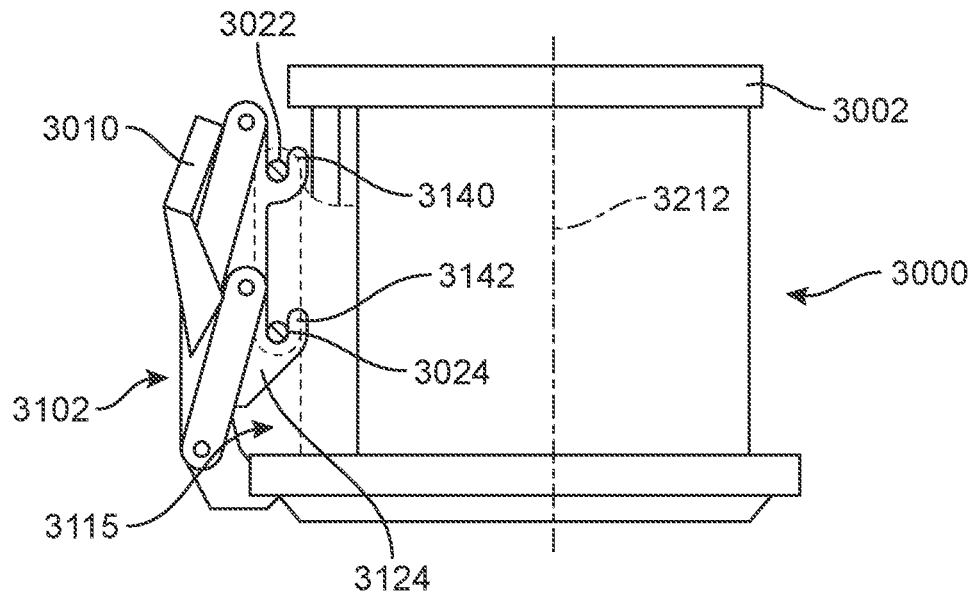

Eventually, as shown in FIGS. 44-45, the motion of linkage assembly 3102 is such that battery assembly 3000 is translated in a primarily rearward direction. This helps ensure battery assembly 3000 has sufficient rearward momentum to be engaged and locked into place by a locking mechanism (e.g., latches).

It may be appreciated that the use of hooks at different vertical positions of floating link 3120 help ensure stability and proper loading of battery assembly 3000. Specifically, the use of both an upper set of hooks (across both linkage assemblies) and a lower set of hooks helps maintain battery assembly in a substantially constant orientation throughout the duration of the lifting process. For example, as shown in FIG. 40, a central vertical axis 3210 of battery cage 3002 is approximately parallel with floating link 3120 (i.e., a central vertical axis 3212 of floating link 3120) prior to engagement with battery cage 3002. As battery cage 3002 is lifted and moved in both horizontal and vertical directions between its lowest position in FIG. 42 and its highest position in FIG. 45, battery cage 3002 retains a substantially constant orientation. That is, central vertical axis 3210 remains substantially parallel with floating link 3120. Another way of saying this is that throughout the lifting process battery cage 3002 is never tilted or tipped. This helps ensure no unwanted rocking of battery assembly 3000 occurs since such rocking could reduce the efficiency of the lifting mechanism and also make alignment between battery assembly 3000 and any locking mechanisms more difficult.

It may be appreciated that the process described above and illustrated in FIGS. 40-45 may be reversed to lower battery assembly 3000 from vehicle 100 to ground surface 3200. Once battery assembly 3000 has been lowered to ground surface 3200, linkage assembly 3102 may be lowered until first hook 3140 and second hook 3142 are low enough to disengage with upper horizontal mounting bar 3022 and lower horizontal mounting bar 3024. Once the hooks are disengaged vehicle 100 can reverse away from battery assembly 3000 to move to a location where another battery assembly can be mounted (for example, as shown in FIG. 21).

Figure 46:
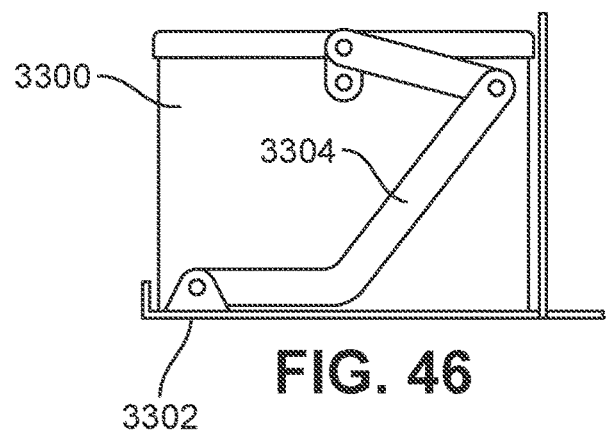
FIGS. 46-48 are schematic views of another embodiment of a system for moving a battery.
Figure 47:
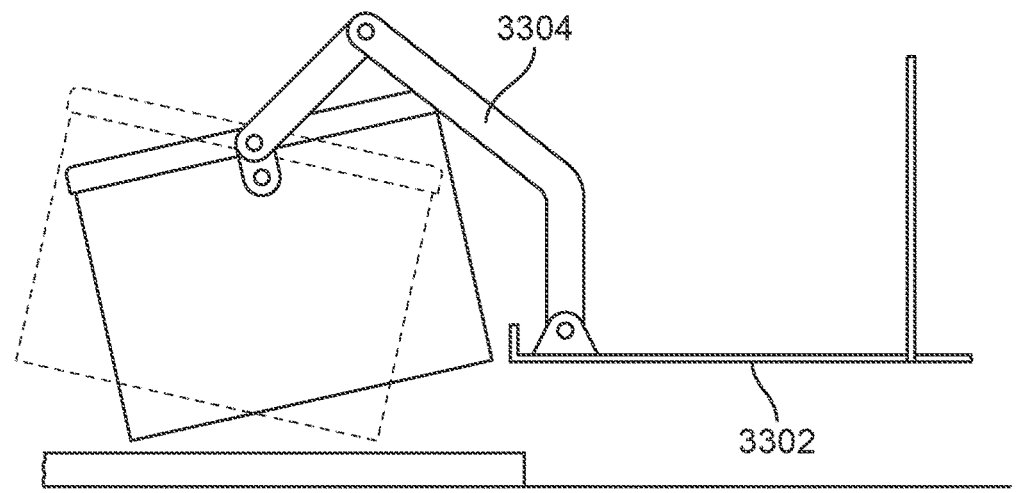
Figure 48:
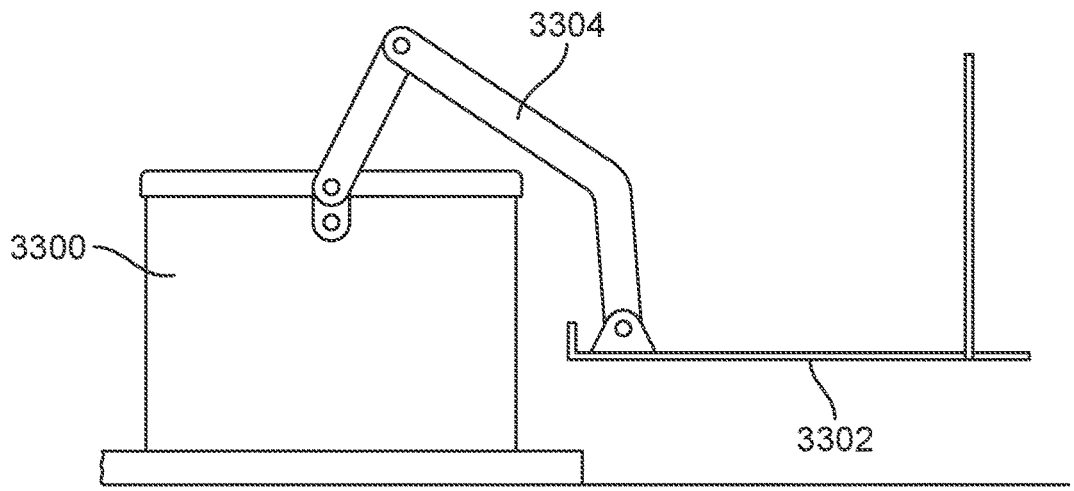

FIGS. 46-48 illustrate a schematic view of an alternative embodiment of a system for raising and lowering batteries. In FIG. 46, a battery 3300 is initially disposed on a raised platform 3302. A linkage assembly 3304 connects a top central part of battery 3300 to raised platform 3302. As linkage assembly 3304 is rotated and extended, battery 3300 is raised off platform 3302 and lowered to a position off platform 3302, as shown in FIGS. 47-48. However, as clearly seen in FIG. 47, battery 3300 may rock or swing as it is lowered due to the act that the battery is only engaged at a single vertical position.

In a mining environment the ground surface may not be level. This means that as a vehicle attempts to mount or dismount a battery assembly, the patch of ground where the battery is raised from (or lowered to) may be slightly higher or lower relative to the patch of ground where the vehicle's wheels are located. Some embodiments of a vehicle can include provisions to ensure batteries can be mounted or dismounted on unlevel ground.

Figure 49:
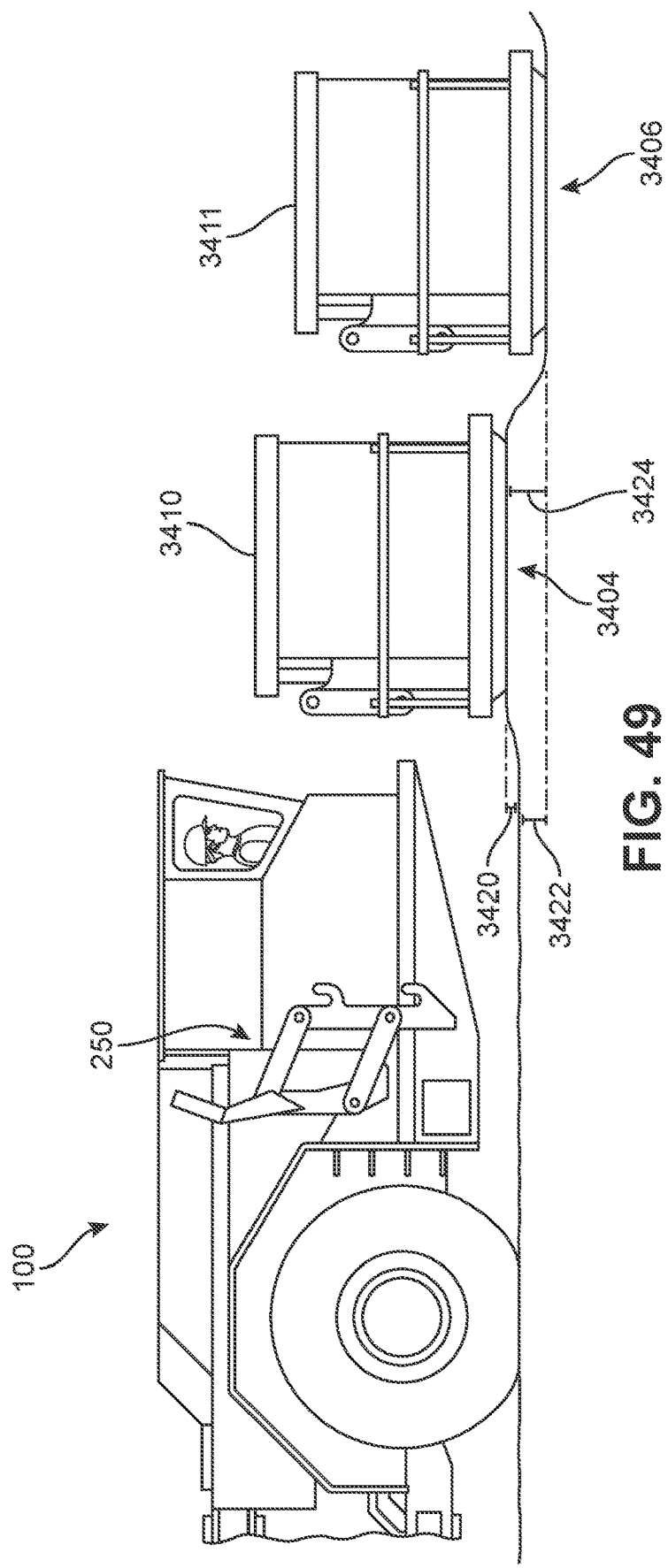
FIG. 49 is a schematic view of a vehicle and different loading positions of a battery assembly, according to an embodiment.

FIG. 49 illustrates a schematic view of a portion of vehicle 100 for purposes of characterizing a loading envelope of the vehicle's mounting and dismounting system 250. Here, the wheels of vehicle 100 are sitting on a patch of ground 3402. The height of patch of ground 3402 is taken to be the ground level 3403 for reference. In an exemplary embodiment, mounting and dismounting system 250 is capable of loading a battery assembly 3410 off of a raised patch of ground 3404. Patch of ground 3404 may be raised from ground level 3403 by a height 3420. Additionally, mounting and dismounting system 250 is capable of loading battery assembly 3411 from a recessed patch of ground 3406. Patch of ground 3406 may be recessed below ground level 3403 by a height 3422. For purposes of illustration, raised patch of ground 3404 and recessed patch of ground 3406 are shown adjacent one another.

The overall vertical distance between recessed patch of ground 3406 and raised patch of ground 3404 is referred to as the "loading envelope" of mounting and dismounting system 250. This distance is indicated by loading envelope 3424 in FIG. 49, and is equal to the sum of height 3420 and height 3422.

The size of loading envelope may be determined by the range of motion of the linkage assemblies of mounting and dismounting system 250, as well as by the relative height of these assemblies from ground level. The lowest loading position is constrained by how low, relative to ground level, the hooks on each linkage assembly can go, since the hooks must be lower than the horizontal mounting bars on the battery cage as they first engage the battery cage. In some cases, the highest loading position is constrained by the height (relative to ground level) at which the linkage assemblies may begin to retreat rearwardly and thus could fail to engage the horizontal mounting bars.

In different embodiments, the values of the lowest loading position, the highest loading position and the overall loading envelope could vary. In some embodiments, the lowest loading position could vary approximately in the range between 6 inches to 10 inches below ground level (which is defined by the height of the ground where the front wheels are disposed). In one embodiment, the lowest loading position has a value of approximately 8 inches below ground level. In some embodiments, the highest loading position could vary approximately in the range between 2 inches and 4 inches above ground level. In one embodiment, the highest loading position has a value of approximately 2.75 inches above ground level.

It may be appreciated that in some embodiments a mounting and dismounting system may be sufficiently strong to lift a battery assembly that weighs 8 to 10 kilograms. Thus, it may be appreciated that the components of each linkage assembly may be designed with this constraint in mind.

Battery Auto-Alignment and Locking System

As previously discussed, once mounting and dismounting system 250 lifts a battery assembly to a desired position on a vehicle, some mechanism can be used to lock the battery assembly into place on the vehicle. Additionally, in some embodiments, a mounting and dismounting system can also include provisions that help with alignment of the battery assembly. Such provisions could include auto-aligning components that guide the battery assembly into a predetermined position to ensure the battery assembly can be properly engaged by one or more locking mechanisms (e.g., latches).

Figure 50:
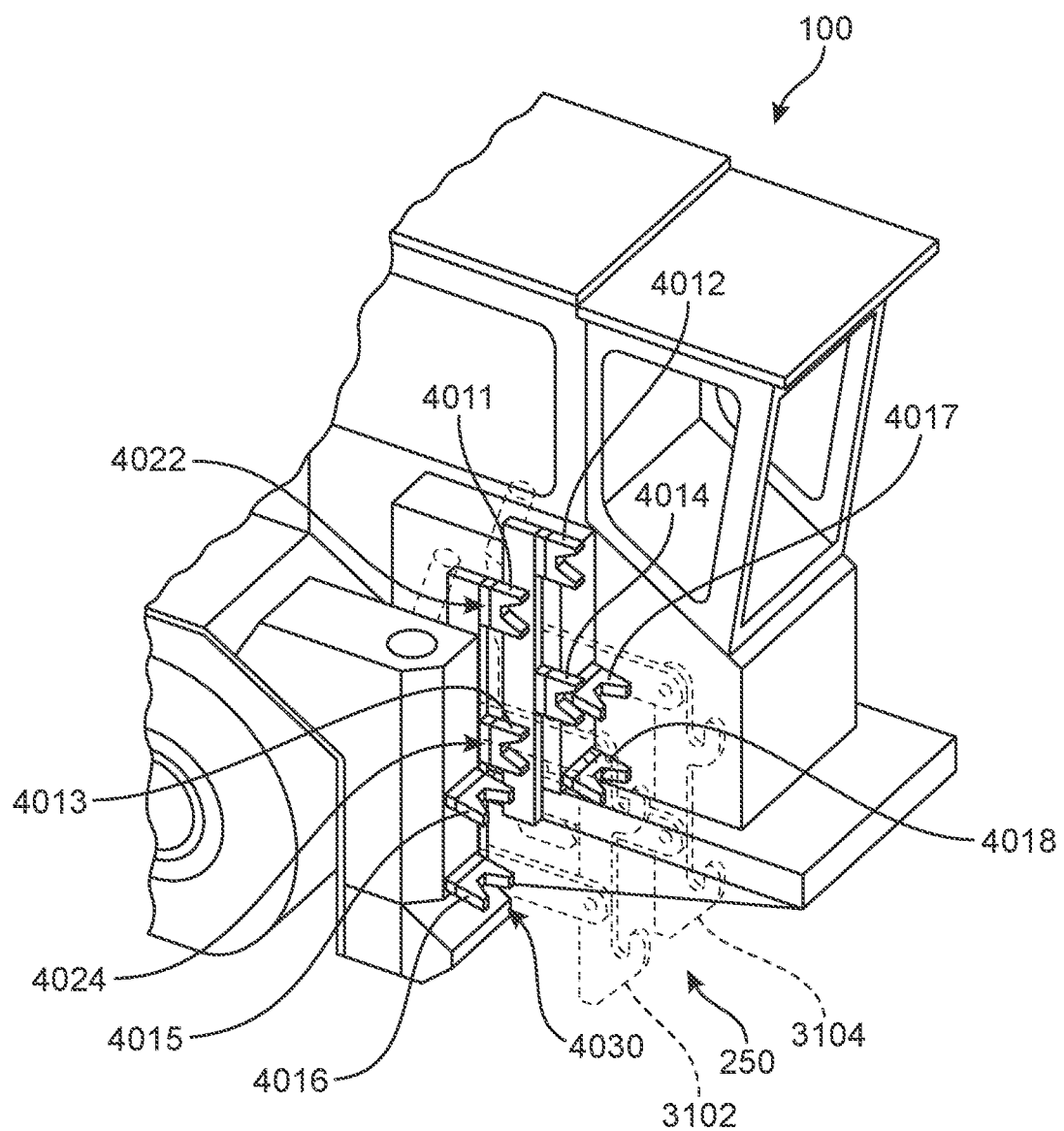
FIG. 50 is a schematic view of a front end of a vehicle with an alignment and locking system for a battery assembly, according to an embodiment.

FIG. 50 is a schematic isometric view of a front end of vehicle 100. Referring to FIG. 50, mounting and dismounting system 250 may incorporate both autonomous alignment features and locking features, which may collectively be referred to as components of an alignment and locking system.

Vehicle 100 may include a plurality receiving members. A receiving member can be any component configured to receive and hold a mounting bar or other mounting element of a battery cage. In some embodiments, a receiving member can include an alignment portion for guiding a mounting bar or other element in place. In some embodiments, a receiving member can also include a locking mechanism for locking a mounting bar or other element in place. Alternatively, in other embodiments, a receiving member may include a locking mechanism but not an alignment portion.

Specifically, in FIG. 50, vehicle 100 includes a first receiving member 4011, a second receiving member 4012, a third receiving member 4013, a fourth receiving member 4014, a fifth receiving member 4015, a sixth receiving member 4016, a seventh receiving member 4017 and an eighth receiving member 4018, which may be collectively referred to as plurality of receiving members 4010. For purposes of illustration, the receiving members are shown schematically in FIG. 50.

Plurality of receiving members 4010 may be divided into a set of receiving members that are configured to engage horizontal mounting bars on a battery assembly and another set of receiving members that are configured to engage vertical mounting bars on a battery assembly. Specifically, first receiving member 4011, second receiving member 4012, third receiving member 4013 and fourth receiving member 4014 collectively comprise a first set of receiving members 4020 that are configured to engage horizontal mounting bars. Additionally, fifth receiving member 4015, sixth receiving member 4016, seventh receiving member 4017 and eighth receiving member 4018 collectively comprise a second set of receiving members 4030 that are configured to engage vertical mounting bars.

First set of receiving members 4020 may be disposed on vehicle 100 in between first linkage assembly 3102 and second linkage assembly 3104, with respect to a horizontal direction. Moreover, first set of receiving members 4020 may be arranged into an upper set of receiving members 4022 (including first receiving member 4011 and second receiving member 4012) and a lower set of receiving members 4024 (including third receiving member 4013 and fourth receiving member 4014). Upper set of receiving members 4022 have a common vertical position and may engage upper horizontal mounting bar 3022 of battery assembly 3000. Lower set of receiving members 4024 have a common vertical position that is below upper set of receiving members 4022. Lower set of receiving members 4024 may engage lower horizontal mounting bar 3024 of battery assembly 3000.

First set of receiving members 4020 may all have a common orientation. Specifically, each receiving member is oriented with its lengthwise direction aligned with the vertical direction. This orientation ensures that the opening of each receiving member can be engaged by a horizontally oriented bar from a battery assembly.

Second set of receiving members 4030 may be disposed on vehicle 100. Specifically, fifth receiving member 4015 and sixth receiving member 4016 may be disposed adjacent to first linkage assembly 3102, while seventh receiving member 4017 and eighth receiving member 4018 may be disposed adjacent second linkage assembly 3104. However, unlike first set of receiving members 4020 that are disposed between the linkages and adjacent the inner sides of the linkages, the receiving members of second set of receiving members 4030 are disposed adjacent the outer facing sides of the linkages.

Second set of receiving members 4030 may all have a common orientation. Specifically, each receiving member is oriented with its lengthwise direction aligned with the widthwise direction. This orientation ensures that the opening of each receiving member can be engaged by a vertically oriented bar from a battery assembly.

Figure 51:
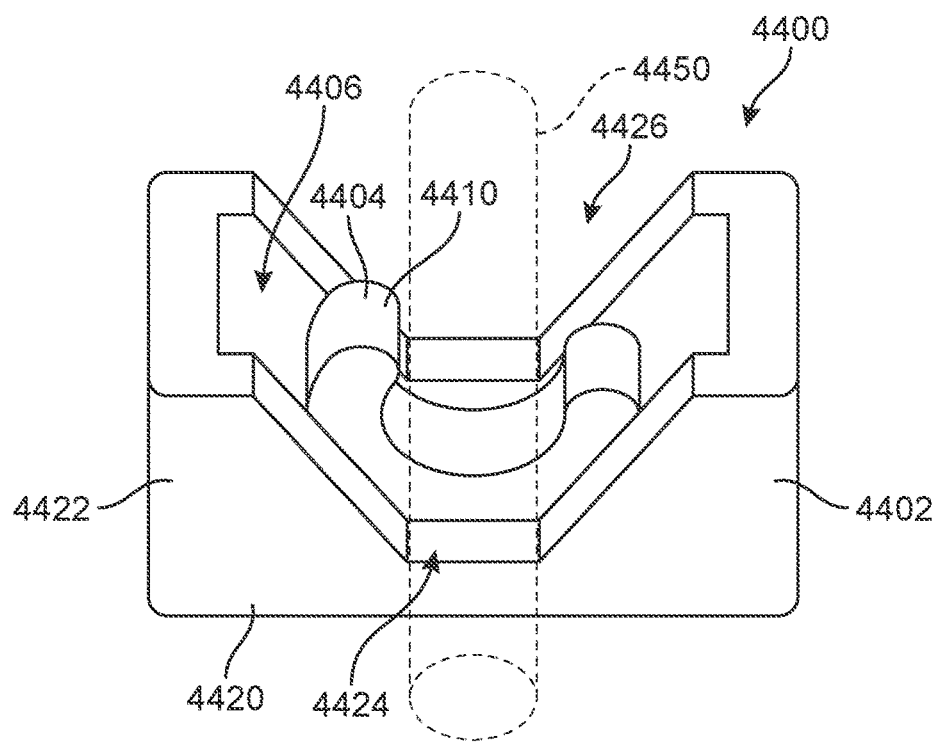
FIGS. 51-52 are schematic views of a receiving member with an alignment portion and a locking mechanism, according to an embodiment.
Figure 52:
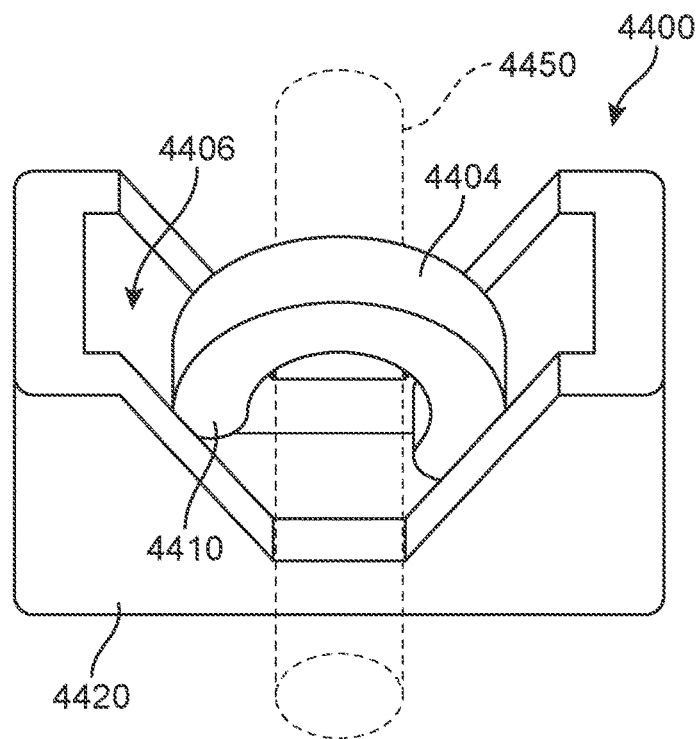

FIGS. 51-52 illustrate schematic views of an exemplary receiving member 4400 that may be used with the present system. Specifically, FIG. 51 is a schematic isometric view of receiving member 4400 in an open position, while FIG. 52 is a schematic isometric view of receiving member 4400 in a closed position.

Receiving member 4400 may comprise an outer housing 4402 and an inner locking member 4404. Inner locking member 4404 is disposed within a receiving cavity 4406 of outer housing 4402. Moreover, inner locking member 4404 may be able to pivot within receiving cavity 4406.

Outer housing 4402 includes a base portion 4420 and raised sidewalls 4422 that form the boundaries of receiving cavity 4406. Sidewalls 4422 may slope towards base portion 4420 such that sidewalls 4422 are highest at the ends of receiving member 4400 and lowest at a center of receiving member 4400. That is, sidewalls 4422 may include a first notch 4424 on one side of receiving member 4400 and a second notch 4426 on a second side of receiving member 4400.

Inner locking member 4404 may have an open loop or hook-like shape with an open side 4410. When inner locking member 4404 is rotated so that open side 4410 is positioned adjacent first notch 4424 and second notch 4426, receiving member 4400 is in an "open" position, as seen in FIG. 51. In this open position, a section of a mounting bar can be placed between first notch 4424, second notch 4426 and also within openside 4410 of inner locking member 4404. Also, in the open position, a mounting bar 4450 can be removed from receiving member 4400.

When inner locking member 4404 is rotated so that open side 4410 is disposed within base portion 4420, receiving member 4400 is in a closed position, as seen in FIG. 52. In the closed position, a section of a mounting bar may be locked between inner locking member 4404 and portions of outer housing 4402. Depending on the tension between the mounting bar and the receiving member components, the mounting bar may or may not be able to slide through the gap formed between inner locking member 4404 and base portion 4420 of outer housing 4402.

In some embodiments, receiving member 4400 may be powered by hydraulic pressure. For example, in one embodiment, receiving member 4400 could be a hydraulic latch. In other embodiments, receiving member 4400 could be a spring-loaded receiving member. In still other embodiments, receiving member 4400 could be actuated using any additional mechanical components (such as a linkage) that can be used to lock an element into place.

In some embodiments, a receiving member could be biased in an open position. In other embodiments, a receiving member could be biased in a closed position. In still other embodiments, a receiving member may not be biased in either the open or closed position.

It may be appreciated that receiving member 4400 is only intended to be an exemplary embodiment of the type of receiving member that could be used with mounting and dismounting system 250. In some embodiments, one or more of the receiving members in either first set of receiving members 4220 and/or second set of receiving members 4230 could be configured with similar provisions to receiving member 4400. That is, one or more of the receiving members of the present embodiments could include sidewalls that slope towards a center of the receiving member as well as an inner locking member that rotates, pivots or otherwise actuates to open and close around a mounting bar.

Figure 53:
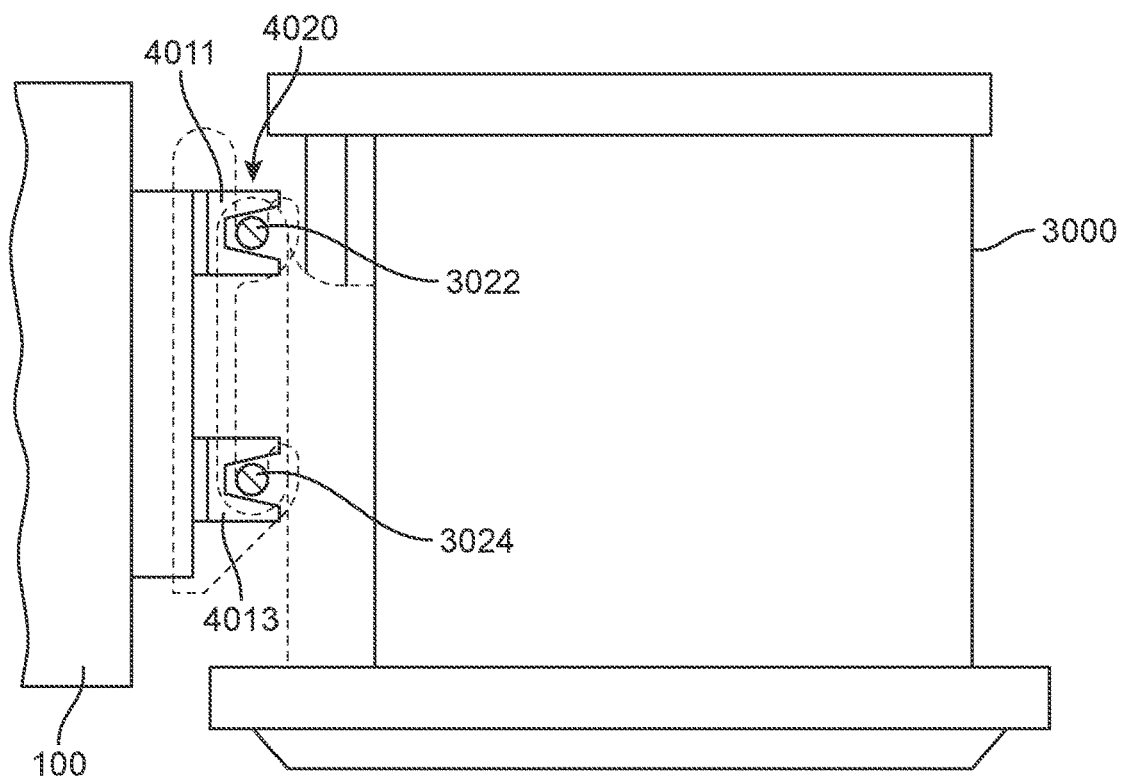
FIGS. 53-54 are schematic views of horizontal mounting bars of a battery assembly being locked into place on a vehicle chassis, according to an embodiment.
Figure 54:
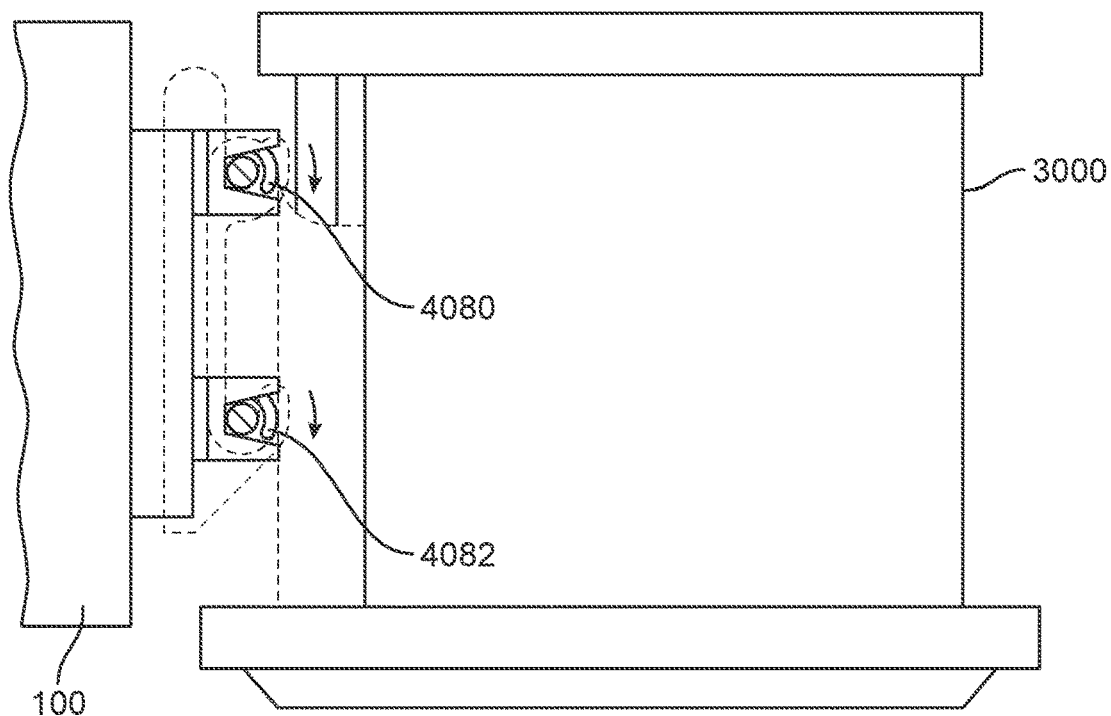

FIGS. 53-54 illustrate how first set of receiving members 4020 engage with upper horizontal mounting bar 3022 and lower horizontal mounting bar 3024 as battery assembly 3000 is raised up and towards first set of receiving members 4020. Specifically, as seen in FIG. 53, the linkage assemblies may act to raise battery assembly 3000 up and towards first set of receiving members 4020. As seen in FIG. 54, as upper horizontal mounting bar 3022 and lower horizontal mounting bar 3024 are placed within a pair of corresponding receiving members, the receiving members are automatically closed to secure battery assembly 3000 in place on vehicle 100. That is, first receiving member 4111 and second receiving member 4112 engage and close around upper horizontal mounting bar 3022. Specifically, an inner locking member 4080 of first receiving member 4111 closes around upper horizontal mounting bar 3022 and an inner locking member 4082 of third receiving member 4113 closes around lower horizontal mounting bar 3024. Also, third receiving member 4113 and fourth receiving member 4114 (not visible in FIGS. 53-54) engage and close around lower horizontal mounting bar 3024.

Figure 55:
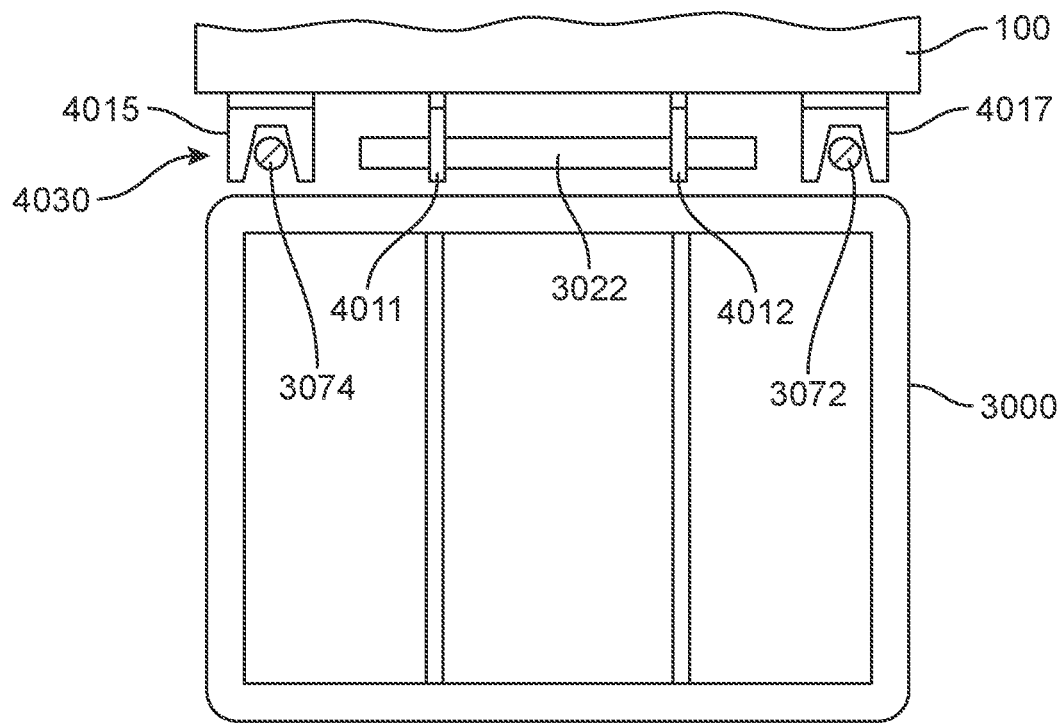
FIGS. 55-56 are schematic views of vertical mounting bars of a battery assembly being locked into place on a vehicle chassis, according to an embodiment.
Figure 56:
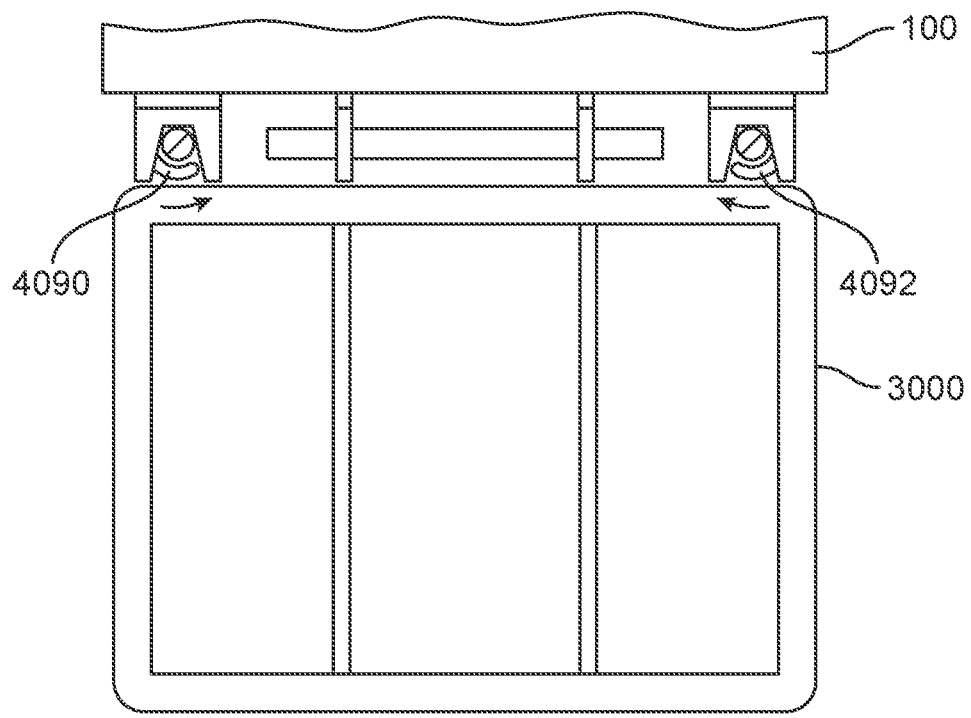

FIGS. 55-56 illustrate how second set of receiving members 4030 engage with upper horizontal mounting bar 3022 and lower horizontal mounting bar 3024 as battery assembly 3000 is pushed horizontally towards second set of receiving members 4030. In contrast to FIGS. 53-54, which depict a side schematic view of battery assembly 3000 and corresponding receiving members on vehicle 100, FIGS. 55-56 depict a top down view of battery assembly 3000 and corresponding receiving members.

As seen in FIG. 55, the linkage assemblies may act to raise battery assembly 3000 up and towards second set of receiving members 4030. As seen in FIG. 56, as first vertical mounting bar 3072 and second vertical mounting bar 3074 are placed within a pair of corresponding receiving members, the receiving members are automatically closed to secure battery assembly 3000 in place on vehicle 100. That is, fifth receiving member 4115 engages and closes around second vertical mounting bar 3074. Also, seventh receiving member 4117 engages and closes around first vertical mounting bar 3072. Specifically, an inner locking member 4090 of fifth receiving member 4115 closes around second vertical mounting bar 3074 and an inner locking member 4092 of seventh receiving member 4117 closes around first vertical mounting bar 3072. Although not shown in this view, sixth receiving member 4116 may also engage and close around first vertical mounting bar 3072. And eighth receiving member 4018 may also engage and close around second vertical mounting bar 3074.

While FIGS. 53-56 illustrate a process of mounting a battery assembly to a vehicle chassis by locking it in place, it may be appreciated that the reverse process may be used during dismounting. That is, to dismount a battery assembly, any locking mechanisms closed around the mounting bars may be opened so that the battery assembly can be released. Once the battery assembly is released, the linkages can be actuated to lower the battery assembly to the ground.

Embodiments can include provisions for autonomous alignment of a battery assembly as it is mounted to a vehicle. In some embodiments, autonomous alignment can occur in a single direction (e.g., vertical alignment with respect to the vehicle). In other embodiments autonomous alignment can occur in two or more directions simultaneously (e.g., horizontal and vertical alignment).

Figure 57:
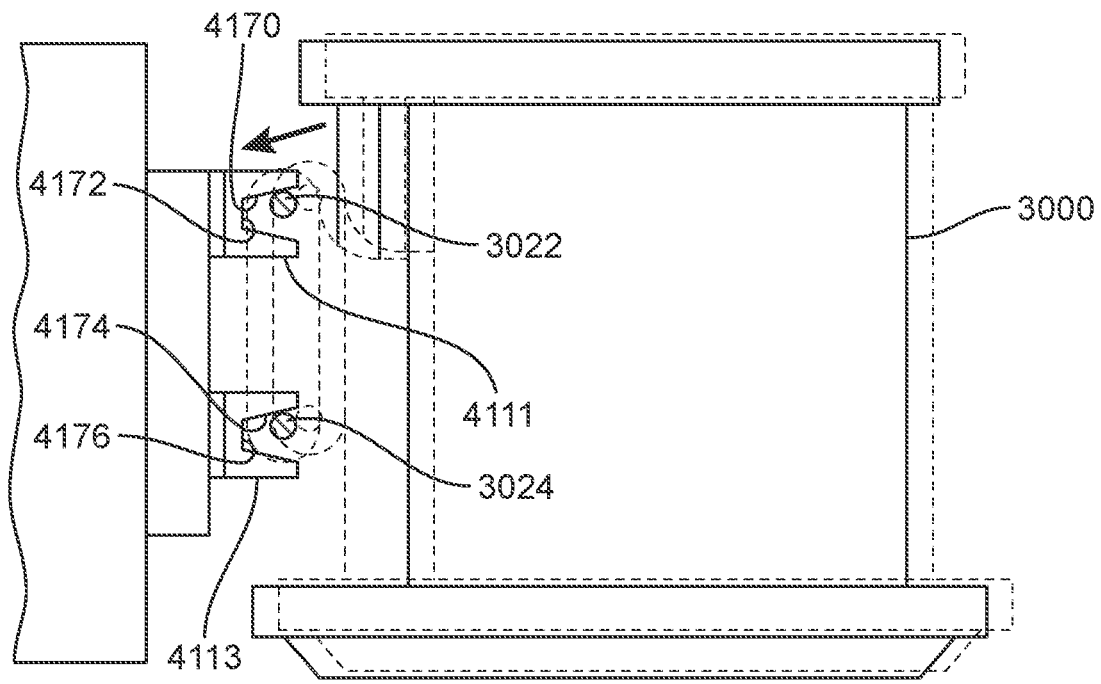
FIGS. 57-58 are schematic views of a battery assembly being automatically aligned in a vertical direction by a set of receiving members, according to an embodiment.
Figure 58:
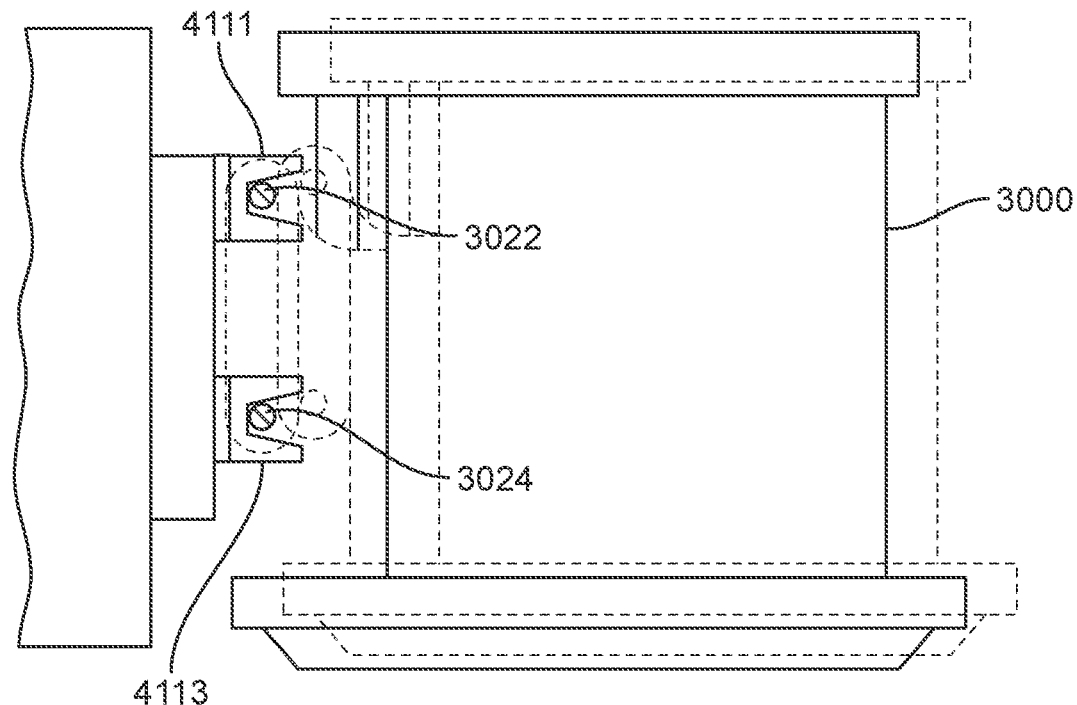

FIGS. 57-58 illustrate schematic views of a battery assembly being aligned with respect to the vertical direction. Specifically, FIGS. 57-58 illustrate a side schematic view of some components of vehicle 100, including first receiving member 4111 and third receiving member 4113 as they engage battery assembly 3000.

Initially, as seen in FIG. 57, battery assembly 3000 is misaligned with first receiving member 4111 and third receiving member 4113. As upper horizontal mounting bar 3022 and lower horizontal mounting bar 3024 come into contact with first receiving member 4111 and third receiving member 4113, respectively, the motion of the bars are directed downwardly towards a central region of the receiving members. For example, as upper horizontal mounting bar 3022 is pressed against a sloped surface 4170 of first receiving member 4111, upper horizontal mounting bar 3022 may slide downwards as it approaches central region 4172 of first receiving member 4111. Likewise, as lower horizontal mounting bar 3024 is pressed against a sloped surface 4174 of third receiving member 4113, lower horizontal mounting bar 3024 may slide downwards as it approaches central region 4176 of third receiving member 4113.

In FIG. 58, first receiving member 4111 and third receiving member 4113 continue until battery assembly 3000 is properly aligned with respect to the vertical position. At this point, locking mechanisms can close around upper horizontal mounting bar 3022 and lower horizontal mounting bar 3024, respectively, to fix battery assembly 3000 to the vehicle chassis.

Although FIGS. 57-58 illustrate a process of autonomous alignment when battery assembly 3000 has a higher vertical position than the necessary final alignment position, it may be appreciated that a similar process occurs when battery assembly 3000 has a lower vertical position than the final alignment position.

Figure 59:
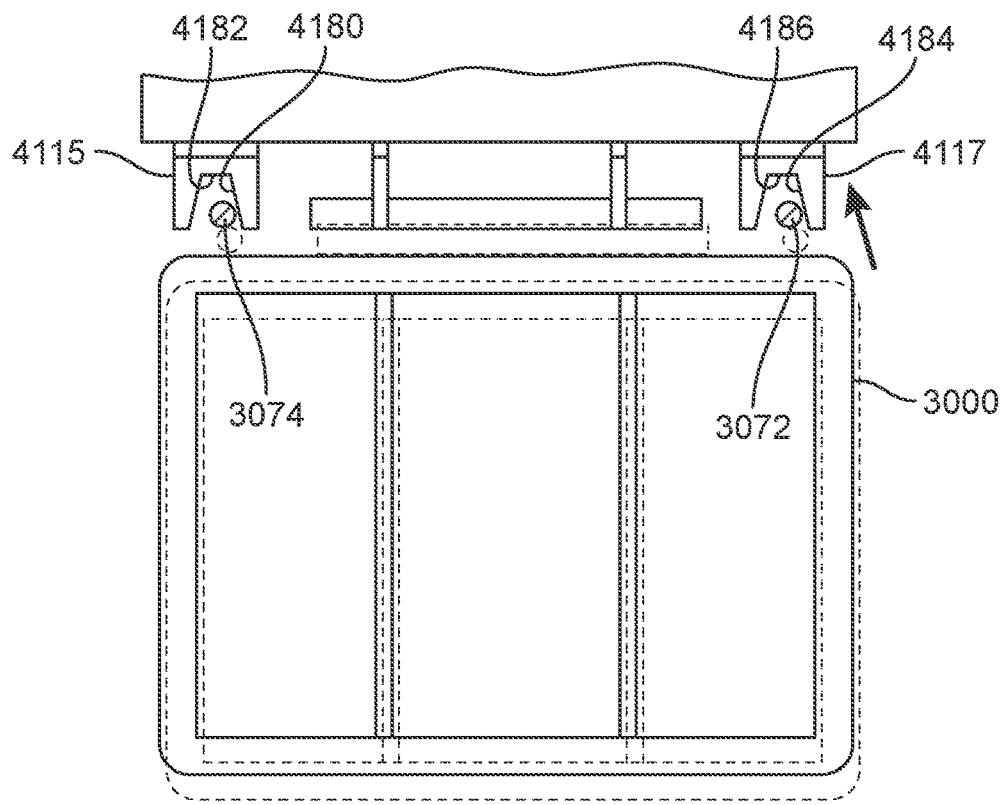
FIGS. 59-60 are schematic views of a battery assembly being automatically aligned in a horizontal direction by a set of receiving members.
Figure 60:
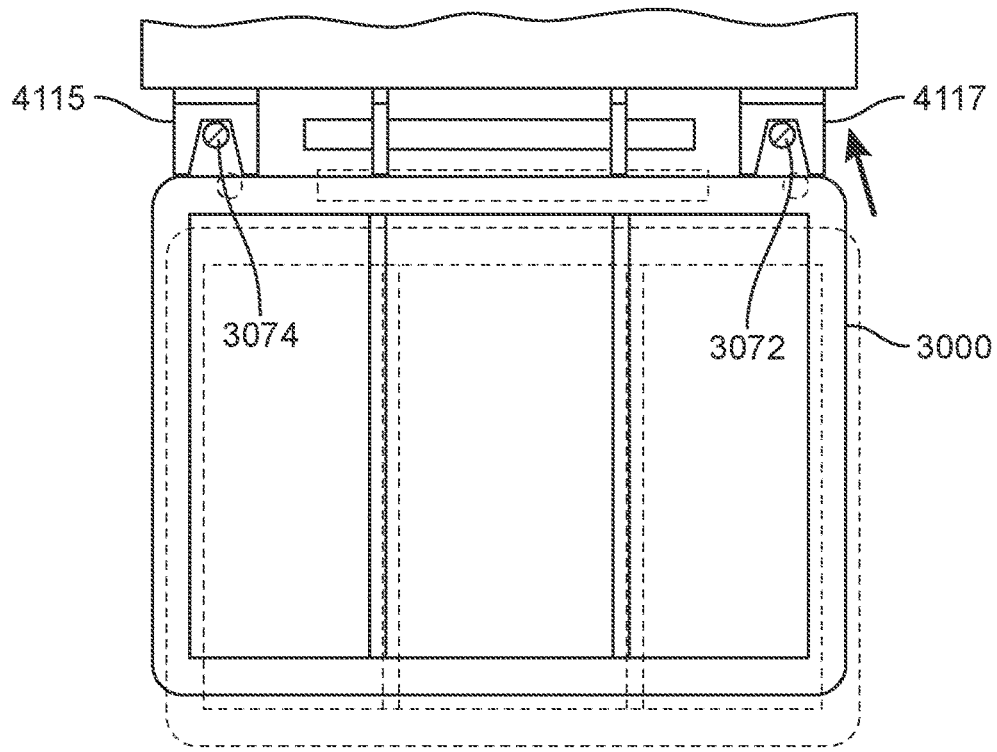

FIGS. 59-60 illustrate schematic views of a battery assembly being aligned with respect to the horizontal (specifically, widthwise) direction of vehicle 100. Specifically, FIGS. 59-60 illustrate a side schematic view of some components of vehicle 100, including fifth receiving member 4115 and seventh receiving member 4117 as they engage battery assembly 3000.

Initially, as seen in FIG. 59, battery assembly 3000 is misaligned with fifth receiving member 4115 and seventh receiving member 4117. Specifically, battery assembly 3000 is displaced horizontally by an offset 4310 in the vertical direction with respect to the desired alignment boundary 4300.

As first vertical mounting bar 3072 and second vertical mounting bar 3074 come into contact with seventh receiving member 4117 and fifth receiving member 4115, respectively, the motion of the bars are directed horizontally towards a central region of the receiving members. For example, as second vertical mounting bar 3074 is pressed against a sloped surface 4180 of fifth receiving member 4115, second vertical mounting bar 3074 may slide horizontally as it approaches central region 4182 of fifth receiving member 4115. Likewise, as first vertical mounting bar 3072 is pressed against a sloped surface 4184 of seventh receiving member 4117, first vertical mounting bar 3072 may slide horizontally as it approaches central region 4186 of seventh receiving member 4117.

In FIG. 60, fifth receiving member 4115 and seventh receiving member 4117 continue until battery assembly 3000 is properly aligned with respect to the horizontal position. At this point, locking mechanisms can close around first vertical mounting bar 3072 and second vertical mounting bar 3074, respectively, to fix battery assembly 3000 to the vehicle chassis. Alternatively, in some other embodiments, fifth receiving member 4115 and seventh receiving member 4117 may not incorporate locking mechanisms.

Although FIGS. 59-60 illustrate a process of autonomous alignment when battery assembly 3000 is displaced horizontally in a first direction (e.g., left direction) from the necessary final alignment position, it may be appreciated that a similar process occurs when battery assembly 3000 is displaced horizontally in a second direction (e.g., right direction) from the final alignment position.

As discussed above, alignment of a battery assembly occurs as horizontal and/or vertical bars on the battery assembly are pushed horizontally towards the vehicle by linkages that raise the battery assembly and pull it towards a set of receiving members. Any misalignment of the battery assembly in either the vertical or horizontal directions may be autonomously corrected by the sloped sidewalls of the receiving members, which act to direct the vertical and horizontal positions of the battery assembly towards a position of proper alignment. Proper alignment then ensures that the horizontal mounting bars (and/or vertical mounting bars) can be locked into place, thereby fixing the battery cage in place on the vehicle chassis.

In different embodiments, the tolerance in the vertical and horizontal positions can vary. That is, the degree to which a battery cage can be misaligned in the horizontal or vertical directions as it is brought closer to a set of receiving members can vary. Generally, the tolerance may be determined by various factors including the dimensions of each receiving member as well as the specific geometry of the sidewalls that are intended to guide mounting bars towards a centrally aligned position.

It may be appreciated that in some embodiments, one or more receiving members could be optional. In some other embodiments, for example, second set of receiving members 4030 could be replaced with an alignment member. In contrast to receiving members that may (optionally) include provisions for locking a bar in place, alignment members may only be configured to help with alignment but not locking.

Figure 61:
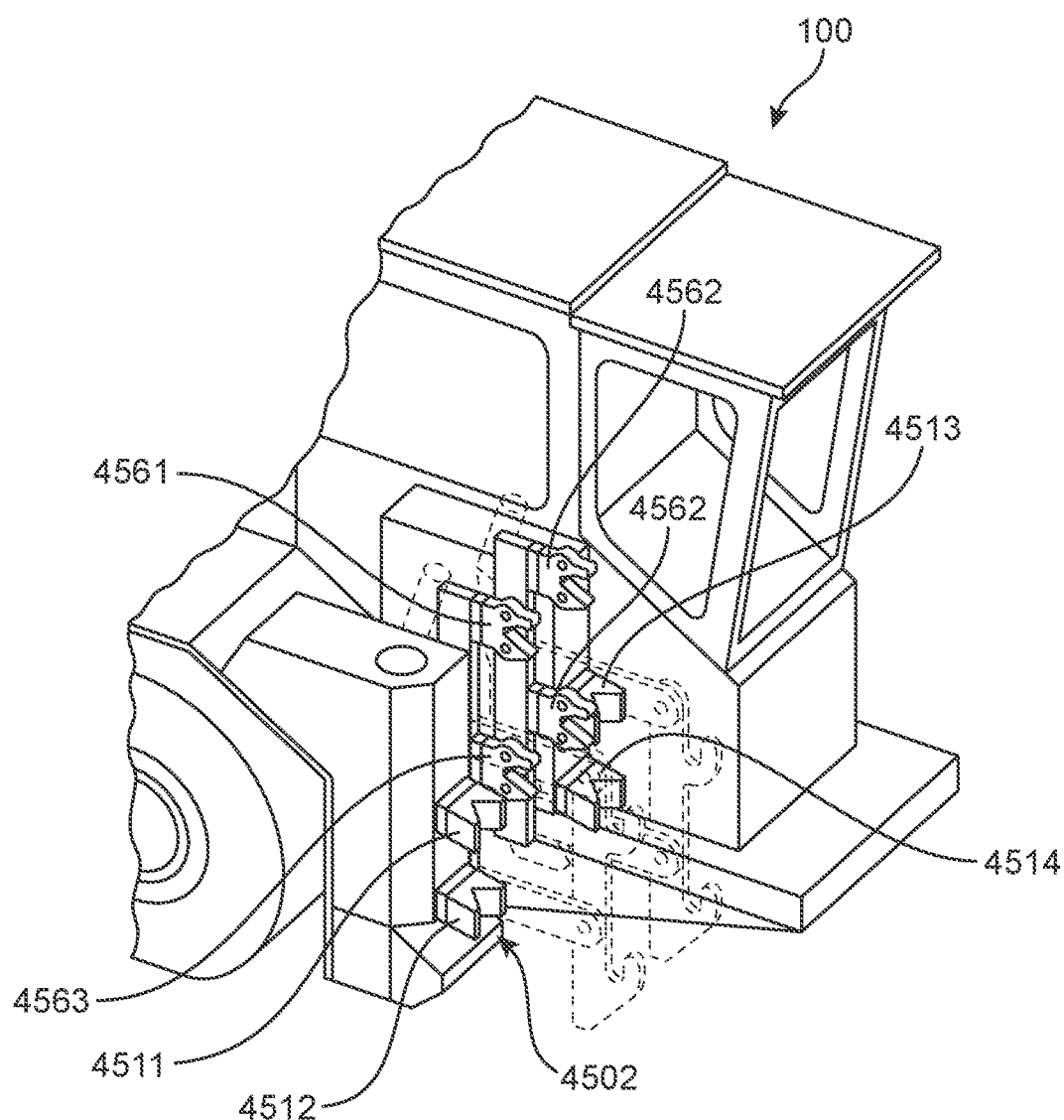
FIG. 61 is another embodiment of an alignment and locking system for a battery assembly, according to an embodiment.

FIG. 61 is an alternative embodiment of vehicle 100 that lacks receiving members for engaging vertically aligned mounting bars of a battery assembly. Instead, vehicle 100 includes a set of alignment members 4502 that are attached to the chassis of vehicle 100. Set of alignment members 4502 includes a first alignment member 4511, a second alignment member 4512, a third alignment member 4513 and a fourth alignment member 4514.

First alignment member 4511 comprises a block of material with a V-shaped cutout. This creates opposing sloped surfaces that meet at a central location. As with the sloped surfaces of the receiving members described above, the sloped surfaces of the alignment members act to push the vertical mounting bars into a centrally aligned position with respect to the horizontal direction. Second alignment member 4512, third alignment member 4513 and fourth alignment member 4514 are all seen to have similar geometries to first alignment member 4511.

In FIG. 61 a set of receiving members 4560 for securing horizontal mounting bars are also shown. Set of receiving members 4560 includes a first receiving member 4561, a second receiving member 4562, a third receiving member 4563 and a fourth receiving member 4564.

Set of receiving members 4560 may have a slightly different design from the receiving member shown in FIGS. 51-52. The receiving members shown here could be associated with any type of known locking mechanisms that could be used to the horizontal mounting bars on a battery assembly. In some cases, set of receiving members 4560 could include locking mechanisms that are hydraulically actuated.

Using this configuration, alignment members may be used to help align a battery assembly with respect to the horizontal direction as receiving members align a battery assembly with respect to the vertical direction. Moreover, the receiving members can include locking mechanisms for locking the battery assembly into place.

Both receiving members and alignment members can be seen to include convex openings. Each opening may be associated with a receiving direction. A receiving direction is associated with the orientation of an elongated member that may be received within the convex opening. For example, referring back to FIG. 51, the receiving direction of receiving member 4400 is a direction extending between notch 4424 and notch 4426 and which is parallel with mounting bar 4450.

As seen in FIG. 61, the alignment members (e.g., alignment member 4511 and alignment member 4512) and the receiving members (e.g., receiving member 4561 and receiving member 4562) have non-parallel receiving directions. Specifically, the receiving directions (i.e., the orientations of the convex openings) of alignment members and receiving members are seen to be approximately perpendicular to one another.

The present embodiments provide a mounting and dismounting system that not only places a battery assembly onto a vehicle, but integrates the battery cage with the chassis of the vehicle. This is accomplished by using a preloaded locking mechanism that grabs the battery cage once it has been lifted into a particular position by an actuatable assembly.

Figure 62:
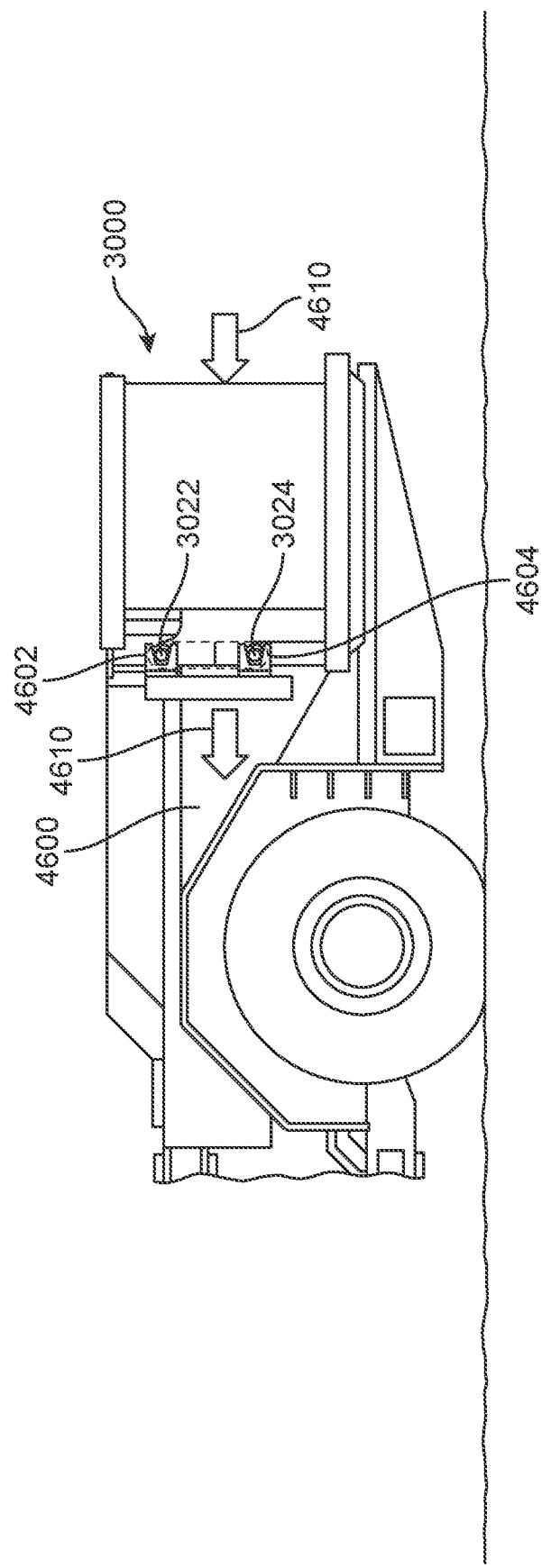
FIG. 62 is a schematic side view of a vehicle illustration the physical connection between a battery assembly and a vehicle chassis, according to an embodiment.

FIG. 62 is a schematic view of an embodiment of vehicle 100 with battery assembly 3000 mounted to a chassis 4600 of vehicle 100. Specifically, a first receiving member 4602 and a second receiving member 4604 are fixed to chassis 4600. Moreover, first receiving member 4602 and second receiving member 4604 are locked to upper horizontal mounting bar 3022 and lower horizontal mounting bar 3024, respectively. Although not shown in this side view, battery assembly 3000 may also be connected to chassis 4600 by way of additional receiving members that engage the horizontal mounting bars, and/or by way of additional receiving members (or alignment members) that engage first vertical mounting bar 3072 and/or second vertical mounting bar 3074 of battery assembly 3000.

By locking battery assembly 3000 in place with a set of receiving members, battery assembly 3000 may not move relative to chassis 4600. This helps to minimize any slack in the mechanical connection between battery assembly 3000 and chassis 4600 of vehicle 100 so as to achieve proper load transfer when any external forces are applied.

As an example, FIG. 62 illustrates an exemplary situation where a forward impact force 4610 is applied to front side 3009 of battery cage 3002. Because battery assembly 3000 has been fixed using a preloaded locking mechanism, the forces may be transferred from battery cage 3002, through receiving member 4602 and receiving member 4604 to chassis 4600 without any structural failure occurring at the point of attachment.

While various embodiments of the invention have been described, the description is intended to be exemplary, rather than limiting, and it will be apparent to those of ordinary skill in the art that many more embodiments and implementations are possible that are within the scope of the invention. Any element of any embodiment may be substituted for another element of any other embodiment or added to another embodiment except where specifically excluded. Accordingly, the invention is not to be restricted except in light of the attached claims and their equivalents. Also, various modifications and changes may be made within the scope of the attached claims.

The invention claimed is:

1. An electric vehicle, comprising:
   a battery assembly comprising a battery cage and at least one battery pack disposed inside the battery cage;
   a battery mounting and dismounting system disposed onboard the electric vehicle, wherein the battery mounting and dismounting system is configured to lift and lower the battery assembly;
   the battery mounting and dismounting system including an alignment and locking system configured to align the battery assembly into a predetermined position relative to the electric vehicle and to lock the battery assembly into place on the electric vehicle;
   the alignment and locking system comprising a plurality of receiving members disposed on the electric vehicle;
   the plurality of receiving members including:
      a first set of receiving members disposed on the electric vehicle with a common orientation such that each receiving member of the first set of receiving members is oriented with its lengthwise direction aligned with a vertical direction of the electric vehicle; and
      a second set of receiving members disposed on the electric vehicle with a common orientation such that each receiving member of the second set of receiving members is oriented with its lengthwise direction aligned with a horizontal direction of the electric vehicle;
   the battery cage further comprising at least one horizontal mounting bar aligned along a horizontal direction of the battery assembly and at least one vertical mounting bar aligned along a vertical direction of the battery assembly;
   wherein the first set of receiving members on the electric vehicle are configured to engage the at least one horizontal mounting bar on the battery cage; and
   wherein the second set of receiving members on the electric vehicle are configured to engage the at least one vertical mounting bar on the battery cage.

2. The electric vehicle according to claim 1, wherein the battery cage comprises:
   a set of horizontal mounting bars, including an upper horizontal mounting bar and a lower horizontal mounting bar, the lower horizontal mounting bar being disposed beneath the upper horizontal mounting bar in the vertical direction; and
   a set of vertical mounting bars, including a first vertical mounting bar and a second vertical mounting bar, the first vertical mounting bar being spaced apart from the second vertical mounting bar in the horizontal direction.

3. The electric vehicle according to claim 2, wherein the first vertical mounting bar and the second vertical mounting bar are disposed at opposite rearward corners of the battery cage.

4. The electric vehicle according to claim 2, wherein the first set of receiving members on the electric vehicle comprises an upper set of receiving members and a lower set of receiving members, the lower set of receiving members being disposed beneath the upper set of receiving members in the vertical direction.

5. The electric vehicle according to claim 4, wherein the upper set of receiving members are configured to engage the upper horizontal mounting bar of the battery cage; and
wherein the lower set of receiving members are configured to engage the lower horizontal mounting bar of the battery cage.

6. The electric vehicle according to claim 2, wherein the second set of receiving members on the electric vehicle comprises at least two receiving members configured to engage the first vertical mounting bar of the battery cage and at least two receiving members configured to engage the second vertical mounting bar of the battery cage.

7. The electric vehicle according to claim 1, wherein the battery assembly includes a first battery pack and a second battery pack;
the battery cage comprising an upper cage portion and a lower cage portion, wherein the upper cage portion is sized and dimensioned to receive the first battery pack and the lower cage portion is sized and dimensioned to receive the second battery pack; and
wherein the at least one vertical mounting bar on the battery cage extends from the upper cage portion to the lower cage portion.

8. The electric vehicle according to claim 1, wherein the battery mounting and dismounting system further comprises a first linkage assembly and a second linkage assembly spaced apart from the first linkage assembly, the first linkage assembly and the second linkage assembly being configured to engage the battery cage to lift and/or lower the battery assembly.

9. The electric vehicle according to claim 8, wherein the first linkage assembly and the second linkage assembly are configured to engage the at least one horizontal mounting bar of the battery cage.

10. The electric vehicle according to claim 8, wherein the first set of receiving members on the electric vehicle are disposed in between the first linkage assembly and the second linkage assembly.

11. The electric vehicle according to claim 8, wherein the second set of receiving members on the electric vehicle are disposed adjacent to outer facing sides of the first linkage assembly and the second linkage assembly.

12. A battery mounting and dismounting system disposed onboard an electric vehicle configured to lift and lower a battery assembly of the electric vehicle, comprising:
an alignment and locking system configured to align the battery assembly into a predetermined position relative to the electric vehicle and to lock the battery assembly into place on the electric vehicle;
the alignment and locking system comprising a plurality of receiving members disposed on the electric vehicle;
the plurality of receiving members including:
a first set of receiving members disposed on the electric vehicle with a common orientation such that each receiving member of the first set of receiving members is oriented with its lengthwise direction aligned with a vertical direction of the electric vehicle; and
a second set of receiving members disposed on the electric vehicle with a common orientation such that each receiving member of the second set of receiving members is oriented with its lengthwise direction aligned with a horizontal direction of the electric vehicle;
wherein the first set of receiving members on the electric vehicle are configured to engage at least one horizontal mounting bar on the battery assembly; and
wherein the second set of receiving members on the electric vehicle are configured to engage at least one vertical mounting bar on the battery assembly.

13. The battery mounting and dismounting system according to claim 12, wherein the first set of receiving members on the electric vehicle comprises an upper set of receiving members and a lower set of receiving members, the lower set of receiving members being disposed beneath the upper set of receiving members in the vertical direction.

14. The battery mounting and dismounting system according to claim 13, wherein the upper set of receiving members are configured to engage an upper horizontal mounting bar of the battery assembly; and
wherein the lower set of receiving members are configured to engage a lower horizontal mounting bar of the battery assembly.

15. The battery mounting and dismounting system according to claim 12, further comprising a first linkage assembly and a second linkage assembly spaced apart from the first linkage assembly, the first linkage assembly and the second linkage assembly being configured to engage the battery assembly to lift and/or lower the battery assembly.

16. The battery mounting and dismounting system according to claim 15, wherein the first linkage assembly and the second linkage assembly are configured to engage the at least one horizontal mounting bar of the battery assembly.

17. The battery mounting and dismounting system according to claim 15, wherein the first set of receiving members on the electric vehicle are disposed in between the first linkage assembly and the second linkage assembly.

18. The battery mounting and dismounting system according to claim 15, wherein the second set of receiving members on the electric vehicle are disposed adjacent to outer facing sides of the first linkage assembly and the second linkage assembly.

19. A battery assembly for an electric vehicle, comprising:
a battery cage; and
at least one battery pack disposed inside the battery cage;
the battery cage further comprising at least one horizontal mounting bar aligned along a horizontal direction of the battery assembly and at least one vertical mounting bar aligned along a vertical direction of the battery assembly;
wherein the at least one horizontal mounting bar is configured to be engaged by a first set of receiving members disposed on the electric vehicle, the first set of receiving members having a common orientation such that each receiving member of the first set of receiving members is oriented with its lengthwise direction aligned with a vertical direction of the electric vehicle; and
wherein the at least one vertical mounting bar is configured to be engaged by a second set of receiving members disposed on the electric vehicle, the second set of receiving members having with a common orientation such that each receiving member of the second set of receiving members is oriented with its lengthwise direction aligned with a horizontal direction of the electric vehicle.

20. The battery assembly according to claim 19, further comprising a first battery pack and a second battery pack;
the battery cage further comprising an upper cage portion and a lower cage portion, wherein the upper cage portion is sized and dimensioned to receive the first battery pack and the lower cage portion is sized and dimensioned to receive the second battery pack; and
wherein the at least one vertical mounting bar on the battery cage extends from the upper cage portion to the lower cage portion.

* * * * *